(12) United States Patent
Le et al.

(10) Patent No.: US 7,356,679 B1
(45) Date of Patent: Apr. 8, 2008

(54) COMPUTER IMAGE CAPTURE, CUSTOMIZATION AND DEPLOYMENT

(75) Inventors: Bich C. Le, San Jose, CA (US); Dilip Khandekar, San Jose, CA (US); Sirishkumar Raghuram, Maharashtra (IN)

(73) Assignee: VMware, Inc., Palo Alto, CA (US)

( * ) Notice: Subject to any disclaimer, the term of this patent is extended or adjusted under 35 U.S.C. 154(b) by 366 days.

(21) Appl. No.: 10/956,691

(22) Filed: Oct. 1, 2004

Related U.S. Application Data

(63) Continuation of application No. 10/611,815, filed on Jun. 30, 2003.

(60) Provisional application No. 60/462,445, filed on Apr. 11, 2003.

(51) Int. Cl.
*G06F 15/177* (2006.01)
(52) U.S. Cl. .......................... 713/1; 717/176
(58) Field of Classification Search ............... 713/1, 713/100; 717/176
See application file for complete search history.

(56) References Cited

U.S. PATENT DOCUMENTS

| | | | | |
|---|---|---|---|---|
| 5,832,214 A | * | 11/1998 | Kikinis | 726/19 |
| 5,842,024 A | * | 11/1998 | Choye et al. | 717/178 |
| 5,901,228 A | * | 5/1999 | Crawford | 705/34 |
| 6,804,774 B1 | * | 10/2004 | Larvoire et al. | 713/2 |
| 2003/0191911 A1 | * | 10/2003 | Kleinschnitz et al. | 711/154 |
| 2004/0034765 A1 | * | 2/2004 | James | 713/1 |

* cited by examiner

*Primary Examiner*—Thuan Du
(74) *Attorney, Agent, or Firm*—Jeffrey Pearce; Leonard Heyman

(57) ABSTRACT

A source image of the hardware and software configuration of a source computer, including the state of at least one source disk, is automatically captured. The source computer may remain unprepared and requires no program for facilitating computer cloning and reconfiguration. The source image is automatically analyzed and the hardware configuration of a destination computer is determined. The source image is modified as needed for either compatibility with the destination computer, or for customization, and after possible modification the source image is deployed on the destination computer. Either or both of the source and destination computers may be virtual machines.

12 Claims, 9 Drawing Sheets

COMPUTER IMAGE CAPTURE, CUSTOMIZATION AND DEPLOYMENT

CROSS-REFERENCE TO RELATED APPLICATIONS

This application is a continuation and claims priority of U.S. patent application Ser. No. 10/611,815, which was filed 30 Jun. 2003 and which in turn claimed priority of U.S. Provisional patent application Ser. No. 60/462,445, filed Apr. 11, 2003.

BACKGROUND OF THE INVENTION

1. Field of the Invention

This invention relates to the creation, manipulation and deployment of computer disk images.

2. Description of the Related Art

Disks and File Systems

A computer disk can be viewed as a linear list of data blocks called sectors. Most disks are used to store files and folders. A file's content is stored in one or more sectors, called data sectors. The mapping between a file and its data sectors is stored in special sectors called metadata. Metadata also stores file attributes (such as file name and access rights) and describe the structural relationship between files and folders. A disk's data and metadata sectors form a file system.

Metadata also keeps track of the location of free sectors. A free sector is neither used as data nor metadata. Its content is undefined until the sector becomes allocated as data or metadata for a new file or folder.

The specification of the layout and interpretation of metadata for a particular type of file system is called the file system format. There exist many file system formats; each has a distinct set of characteristics and limitations.

The process of creating a file system on an uninitialized or damaged disk is called formatting. This process creates metadata defining an empty file system. Once a disk is formatted, its file system can be populated with files and folders. In general, software applications create and access files through an operating system. The operating system forwards file requests to a file system driver, which is a software module capable of manipulating a file system's metadata. A file system driver is designed for a specific file system format and can generally run only on a specific operating system. Support for a given file system format on different operating systems generally requires multiple drivers, one for each operating system.

Some file system formats such as EXT2 are public, i.e., widely published and available for free. Anyone skilled in the art can examine a public file system format, and develop a driver or software tool to decode and manipulate any file system of that format. A file system format can also be proprietary, i.e., is owned by a single vendor and not publicly shared. In order to access files residing on a proprietary file system, software generally has to use the services of a driver developed by the format's owner. Some proprietary file system drivers exist only on specific operating systems; therefore, a software application may need to run on a specific operating system in order to access a proprietary file system. For example, the NTFS file system format is proprietary, and commercial NTFS drivers exist only on certain operating systems developed by Microsoft Corp., the owner of the format.

Disk Imaging

A disk image is a file that resides on a first computer and represents a snapshot of a second computer's disk. Image capture is the process of creating an image file from a computer's disk. A common disk imaging setup is to use two computers: a first computer with the disk being captured (the source disk), and a second computer containing the generated image file. In this setup, the disk imaging system generally comprises two software programs: an imaging client, running on the first computer, and an imaging server on the second computer. During capture, disk data is transferred from the client to the server over a network or a cable.

The reverse of the capture process is called deployment. During a deployment, a third computer's disk (the destination disk) is overwritten with data from an image file residing on the second computer. The data is transferred from the imaging server to an imaging client running on the third computer. The first and third computers can be the same.

A common use for disk imaging is backup and restore: A first computer is backed up by capturing an image of its disk, then the image is stored on a second computer. If the first computer's disk becomes damaged for any reason, it can be restored to its original state by deploying the image from the second computer back to the first computer. Disk imaging can also be used to clone a computer; an image of a first computer can thus be deployed to other computers.

Disk Image Formats

The internal format of an image file, that is, the way in which the file represents the state of a disk, is arbitrary and generally known only to the disk imaging system's vendor. Despite this, disk image formats can generally be classified into two types: sector-based and file-based.

Sector-Based Image Formats

A sector-based image format describes the state of a disk at the sector (or "block") level. The simplest of such formats, called a "flat" image, represents all sectors of the disk as a linear list of bytes in the image file. For example, a flat file of 512,000 bytes can represent a disk with 1000 sectors of 512 bytes.

An advantage of a sector-based image file is that it represents an exact copy of the source disk, regardless of the file system format used on the disk. When it is deployed to a destination disk, the destination disk will contain an exact copy of the original file system. A sector-based imaging system therefore guarantees faithful data recoverability and reproducibility without the need to decode any file system; in other words, it does not require a file system driver.

A first disadvantage of the sector-based approach is, when an image is deployed, the destination disk must be at least as large as the original disk since the file system metadata on the original disk may encode the disk's capacity and assume that it never changes. This metadata is captured into the image file and copied to the destination disk. If the destination disk is smaller than the source disk, some sectors that the metadata assume exist may not exist on the destination disk, resulting in an inconsistent file system. Furthermore, if the destination disk is larger than the source disk, the deployed file system may not be able to take advantage of the additional space, since its metadata would assume that the disk has a smaller capacity.

Another disadvantage of a sector-based format is its inefficiency. A disk may have a large number of free sectors, that is, sectors that are not used as data or metadata, and thus have no useful content. These sectors may be scattered all over the disk, and may be difficult to identify because they generally contain an undefined set of bytes. A free sector's content is undefined because the sector may have been used earlier as data or metadata, then released after a file or folder was deleted. Most file system drivers don't erase (i.e., fill with zeros) freed sectors. A sector-based image format is therefore inefficient because it may include a disk's unused sectors.

Sparse Files

A combination of two technologies—sparse files and disk scrubbing—can solve the inefficiency problem. A sparse image file, similarly to a flat image file, is a sector-level representation of a complete disk. When a sparse image is first created, it represents a disk of a fixed capacity and filled with zeros, i.e., all sectors contain bytes with value zero (or any other predetermined null value). All sectors are said to be initially unallocated. A sparse file does not store the actual contents of unallocated sectors, since their content is known; it needs to store only information about which sectors are unallocated. For example, a sparse file may use a bit vector to keep track of which sectors are unallocated, with the bit values 0 and 1 representing the unallocated and allocated states, respectively. A newly created image file could thus represent an empty disk of 512 sectors by using 512 bits, or 512/8=64 bytes.

When a sector at a particular offset is written with non-zero contents for the first time, the image file marks the sector offset as allocated in the bit vector and creates one sector's worth of data in the file to hold the sector's new contents. This causes the image file to grow by at least one sector; it may need to grow by slightly more than one sector because additional information may be needed in order to keep track of the sector's location within the file. The actual size of a sparse image file may thus be smaller than the capacity of the disk that it represents if a large proportion of the disk's sectors remain unallocated.

When a source disk is captured into an image file, using a sparse format can greatly reduce the size of the file if free sectors in source disk were filled with zeroes, since the imaging system would only need to mark those sectors as unallocated in the file instead of copying their actual contents. As explained earlier, free sectors cannot be assumed to contain zeroes, since a free sector may previously have been allocated as a data or metadata sector, and subsequently freed but not explicitly erased with zeroes.

A common solution to this problem is to run a software tool generally known as scrubber on the source disk prior to the capture operation. The typical scrubbing tool is an application that runs on the operating system of the source computer. Its purpose is to erase free sectors with zeroes. The operating system does not usually allow applications to write directly to sectors, and even if it did, the application wouldn't know which sectors are free; only the file system driver has that knowledge.

The scrubber achieves its goal by creating a temporary file and then growing it by filling it with zeroes until the file system runs out of free disk space. The tool then deletes the file. This algorithm causes the file system driver to convert sectors that were free prior to the scrub operation to data sectors filled with zeroes. When the temporary file is deleted, the zeroed data sectors become free sectors, but their contents do not change.

Subsequently, during the image capture operation, the disk imaging system discards sectors filled with zeroes and does not store them in the sparse image file. Only the useful data is copied, thus keeping the image file's size to a minimum.

In practice, however, few imaging systems employ the combination of scrubbing and sparse files, because it is generally unreasonable to require a user to run the scrubbing tool on the source computer. First, the tool must generally be run manually, making the overall disk imaging process difficult to automate from start to finish. Second, by using up all free disk space, the tool may negatively interfere with other applications running on the operating system.

In summary, sector-based disk image formats are subject to two main limitations: the capacity matching problem, where the destination disk of deploy operation must be as large or larger than the source disk used to create the image, and the efficiency problem, where the image file may contain useless sectors, which unnecessarily increases its size and the time it takes to capture or deploy.

File-Based Image Formats

Unlike sector-based disk image formats, file-based formats store only file and folder information, not sectors. During a capture operation, the imaging system uses a file system driver to decode a source disk's file system. This allows the imaging system to enumerate all existing files and folders, and then read their attributes and contents. All of this information is copied and stored into a single image file using an internal layout that is either publicly known, such as the ZIP or TAR format, or proprietary and thus only known to a particular imaging system vendor.

To deploy a file-based image to an uninitialized or damaged destination disk, a file system driver is first used to format the disk in order to create an empty file system on it. The imaging system then reads the file and folder information from the image and uses the file system driver to re-create those files and folders in the destination file system.

The file-based approach does not have the weaknesses affecting the sector-based approach. First, the source and destination disks can have different capacities, as long as the destination disk has enough capacity to hold all the file and folder content encoded in the image file. For example, if the source disk has a capacity of 10 Gigabytes, but only 4 Gigabytes worth of files and folders are stored on it, the image could be deployed to a 5 Gigabyte destination disk. Second, file-based images are efficient since, by definition, they store only useful information.

The biggest issue with the file-based approach is its reliance on a file system driver, both during capture and deployment operations. A challenge in designing a file-based imaging system is deciding which file system driver to use and how to integrate it into the imaging process. Furthermore, many file system formats exist, so that an imaging system may need to interoperate with more than one file system driver.

One natural choice is to use the file system driver included with the source computer's operating system. A computer's disk generally contains an operating system. Without an operating system, the computer could not function correctly. An operating system is a collection of programs and software modules that exist as files in a file system on the disk. One of those modules is a file system driver capable of decoding the disk's file system. When an operating system starts—a process called booting—the operating system generally loads the file system driver into memory before most other drivers and modules. The file system driver is critical because it allows the operating system to load other modules from the file system, and to expose files to software applications, which are generally loaded last.

Since the file system driver itself is a file on the file system, one may wonder how it could be extracted from the file system in the first place, when no driver is loaded. Every type of operating system has a different way of addressing this issue. One possible solution is to store the sector offset corresponding to the beginning of the contents of driver file in a special sector not used by the file system, such as a master boot record (MBR). When the operating system first loads, it could use the services of the computer's BIOS (basic input/output system) to read the sector offset from the special sector, then load the driver file's contents into memory, and then execute the driver's code in order to decode the entire file system.

In order to take advantage of the operating system's file system driver to perform a capture operation, the imaging client can be implemented as an application running on the source computer. When the source computer is powered on and its operating system has finished loading, the imaging system initiates the image capture operation by starting the imaging client. The client first connects to the imaging server over the network, and then uses the operating system's file API (application programming interface) to enumerate and read all existing files and folders, streaming their content over to the imaging server.

The Issue of Open Files

An issue that arises when running the imaging client on the operating system is that some files, such as operating system files, may be locked, i.e., inaccessible to applications, including the imaging client. Other files may be accessible but open by other applications, meaning their contents may be cached in memory and may change while the imaging client copies the files. The imaging system thus faces the risk of capturing an incomplete or corrupt set of files.

It is thus difficult to image, or backup, a disk's files while active programs are accessing a subset of those files. One existing solution to the open files problem is to make an application provide an API to the imaging or backup system. The imaging system would use the special API to copy files opened by the application, instead of using the operating system's standard file access API. The special API would be responsible for exposing the correct and up-to-date contents of open files to the imaging system. This solution has been commonly implemented for database applications. The main drawback of the solution is that it is not general: files opened by applications that do not expose a special backup API cannot be reliably copied.

Deploying to a New or Damaged Disk

The file-based imaging approach faces another issue. In a deployment operation, the destination computer's disk's content may be uninitialized or damaged. An existing operating system may thus not exist on the destination computer, which means the imaging client cannot run on it. Even if the destination computer had a functional operating system, the disk imaging software user may want to overwrite it with the operating system and files from the image; however, the existing operating system would not allow any application to overwrite existing operating system files.

Offline Disk Imaging

Offline disk imaging is a solution to the open files and the deployment issues described earlier. The idea is to run a secondary operating system on the source computer or destination computer during imaging operations. Before a capture operation, the imaging system shuts down the source computer, causing all software from its disk, including applications and the primary operating system, to unload from memory. The imaging system then reboots the source computer from the secondary operating system, which can be loaded from a floppy disk, a CD-ROM, or from the network using a protocol such as PXE (Preboot Execution Environment).

The secondary operating system is self-sufficient, i.e., it does not need to read any files from the disk attached to the computer, and operates using only the computer's memory and processor. The secondary operating system includes and loads the imaging client, which can then access the disk safely because no other programs are accessing it.

If the secondary operating system includes a driver capable of decoding the source disk's file system, the imaging client can use the operating system's file API to read the disk's files. Otherwise, the client itself must include its own driver or software module in order to access the file system.

In a deployment operation, the destination computer is shut down, and then rebooted from the secondary operating system, which includes the imaging client. The client then uses the secondary operating system's file system driver, or its own driver, to format the destination disk, thereby creating an empty file system. The client then reads the image file from the imaging server, and re-creates the appropriate files and folders on the destination file system.

When the deployment operation finishes, the secondary operating system shuts down the destination computer and reboots it from its disk. This time, the computer loads the operating system that was restored from the image.

Choice of Secondary Operating System

The secondary operating system chosen by an imaging system vendor has to meet strict size requirements, since it cannot rely on the computer's disk for storage—it must be capable of functioning using only the computer's memory. It must also be small enough to fit on the boot medium, i.e., a floppy disk, a CD, or a memory image downloaded from the network.

Another requirement the secondary operating system must generally meet is low licensing cost, since it is an additional software component that contributes to the overall cost of the product. Consequently, disk imaging system vendors tend to choose a low-cost or free (in terms of software licensing cost) operating system for the task. Typical choices include DOS (disk operating system) and Linux.

For these reasons, the chosen secondary operating system is usually not a general-purpose operating system, and is likely to be different from the operating system residing on the source computer's disk.

The Issue of Proprietary File System Formats

Offline disk imaging requires the secondary operating system or imaging client to supply a file system driver compatible with the source disk's file system format.

Proprietary file system formats pose a challenge to imaging system designers, since drivers compatible with a particular proprietary format may exist only on a limited set of operating systems and tend to be supplied by few vendors, generally one. If the source computer's disk is formatted with a proprietary file system, the secondary operating system may not have a compatible driver, making the capture operation impossible.

A disk imaging system vendor has three choices for solving this problem. The first choice is to license a special-purpose operating system from the owner of the file system format, assuming that such an operating system exists and it meets other requirements, such as footprint. The drawback of this approach is the imaging system vendor may have to pay a higher license cost for this operating system compared to other choices for operating system.

The second choice is to license the specification to the proprietary format from the owner, and then develop a custom driver for the chosen secondary operating system, or a driver to be embedded in the imaging client itself. This approach is also costly, since it includes both the cost of the license, and the cost of developing new software. The file system format owner may also choose not to allow any company to license the format, which would make this approach impossible.

The third choice is to attempt to reverse-engineer the proprietary format, or to use a free file system driver that is based on reverse engineering. For instance, the NTFS format is proprietary and NTFS drivers are commercially available only on operating systems made by Microsoft. An NTFS driver exists on Linux, a free operating system, and was developed by using both publicly available information and information collected from reverse engineering. Unfortunately, reverse engineering is inherently risky and unreliable, which explains why the Linux NTFS driver is still at an experimental stage and known to be unstable for certain file operations, such as writes.

Contemporary Disk Imaging Systems

Products such as Symantec Ghost and Powerquest DriveImage represent the current state of the art in disk imaging systems. They employ a file-based image format, allowing them not only to copy only the useful contents of disks but also to capture from and deploy to disks of different sizes. In order to work around the problem of open files, these systems use the offline imaging method. The secondary operating system used tends to be based on DOS or Linux, since those operating systems tend to be lightweight, low cost, and easily customizable for disk imaging tasks. The imaging client used is generally a custom-developed program designed to run on the chosen secondary operating system. For instance, Symantec Ghost uses DOS as the secondary operating system, and its imaging client, called GHOST.EXE, is a DOS program.

Modern disk imaging systems generally support multiple file system formats. For example, Symantec Ghost supports EXT2, FAT, FAT32, and NTFS, the latter two of which are proprietary. In order to access proprietary file systems, existing disk imaging systems include their own file system driver, or build the functionality into the imaging client itself. For instance, the GHOST.EXE client contains code to decode the four different types of file system formats supported by the product, including the proprietary ones.

Whether or not the code to access proprietary file systems was developed based on reverse engineering, or from information licensed from other companies, is information not publicly known. One fact is certain: supporting proprietary file system formats increases the cost of the developing disk imaging products and thus the cost of the product to end customers.

Disk Image Editing

Contemporary disk imaging software sometimes includes a tool to browse the file and folders contained within an image file. Symantec's Ghost Explorer application, for example, allows a user to view files in an image through a graphical user interface; the user can also extract a file from the image and copy it onto the computer's native file system, or take an existing file from the file system and insert it into the image.

The file-based image format used by the majority of contemporary imaging systems does not lend itself well to internal modifications after an image has been created. The reason for this is that most image formats used today favor compactness over flexibility by tightly packing file and folder contents from the source disk into the image file. Sections of the image file may also be compressed to reduce the file's size even further. Modifying the contents of a file-based image may involve deleting files and adding new ones, potentially creating holes in the file. This phenomenon is called "fragmentation."

Fragmentation increases file size and potentially reduces image deployment performance, since the imaging system may need to read multiple, non-contiguous areas of the image file in order to extract the correct sequence of files to expand onto the destination disk. To address this issue, a disk imaging product, such as Symantec Ghost, may provide a program to create a new image file from a modified and therefore fragmented image. Symantec Ghost calls this process "image recompilation." Once an image is recompiled from a modified one, the modified one can be discarded.

In summary, existing file-based disk image formats are not well suited for content editing. Contemporary imaging software products provide tools for casual editing of a small number of files. More substantial modifications may reduce an image's efficiency or performance, a problem sometimes alleviated by recompiling the image.

Disk Image Identification and Tagging

When a disk image is created, a user is required to give it a file name. This name usually identifies the contents of the source disk from which the image was captured. For example, it may contain words indicating the type of operating system, the computer name, etc. Multiple disk images are sometimes archived together on a disk or other storage medium, so that they can be used later for deployment to new or existing computers. When the number of images grows, managing this image library can become challenging. In particular, before a deployment operation, a user may want to search the image library for a disk image that satisfies specific requirements, such as an operating system type, an operating system version, and possibly a number of software applications.

If a disk imaging system included a program for assisting a user to search an image library, this program would have a difficult time performing an accurate search based solely on file names. The first reason is that file names are usually created by humans, and may be ambiguous or not accurately reflect the contents of an image. For example, an imaging containing a Windows 2000 operating system may be named "Bob's Windows 2000", or "Alice's Win2K computer."

Second, file names are inherently restricted in length and cannot convey much information beyond basic computer identification. A disk imaging system could easily augment images with a set of standard attributes, such as computer name, network address, and operating system type. However, these attributes would still need to be manually entered by a user, and are thus subject to human error.

Most importantly, there is an abundance of intricate information contained in a disk image that is not commonly exposed by contemporary disk imaging systems. Since a disk image's ultimate purpose is to be deployed to a computer, it is important for a disk imaging system administrator to reliably query the software configuration encapsulated in an image, in order to determine whether an image is the appropriate one for a specific deployment operation.

For instance, operating systems and software applications consist of a multitude of files, many of which need to be frequently updated in order to fix bugs and security issues.

Before deploying an image to a computer, a disk imaging system's administrator may want to know whether the software inside the image is up-to-date.

The software configuration of an image may also contain settings that reflect a particular hardware configuration. When an operating system is installed on a source computer, the operating system creates a configuration comprising data files and driver files, which is compatible only with the source computer's specific hardware configuration. If an image captured from the source computer is deployed onto a computer with a different hardware configuration, the operating system may fail to boot on the destination computer.

A disk imaging system's administrator thus has to keep track of which hardware configurations are compatible with which images. Today, this burden is largely the administrator's responsibility. When capturing a disk image, the administrator has to manually examine the source computer's hardware configuration, and tag the image with this information, either by giving it a specific name, attaching attributes to it, or by placing it in a folder with the appropriate name.

Image Deployment Issues

The hardware configuration issue described earlier underlines a well-known limitation of existing operating systems that affects disk imaging systems. When an operating system is installed on a computer's disk, it generally becomes dependent on that computer's hardware configuration. If the disk is moved to a second computer, or an image captured from that disk is deployed to a second computer, the operating system may fail to boot or function correctly on the second computer.

The root cause of this problem is a set of operating system files that are hardware-dependent and specifically configured for a particular type of hardware configuration. For example, in the Microsoft Windows 2000 operating system, the following files are hardware-dependent:

1) The operating system kernel, which forms the operating system's core program. There exist two versions of this file: one designed for uniprocessor (single processor) computers, and one for multiprocessor computers.

2) The hardware abstraction layer (HAL) driver. There exist multiple versions of this file, each one corresponding to a particular type of computer circuit board, sometimes called "chipset." For instance, there is a HAL for computers with a chipset supporting the Advanced Control and Power management Interface (ACPI), and one for computers without ACPI support.

3) The disk controller driver. The disk controller allows the operating system to access the disk and therefore files on the disk. In order to communicate with the disk controller, the operating system requires a driver that is compatible with the computer's disk controller.

4) Not only do the correct kernel and drivers need to be present, but they also have to be properly registered in one or more system configuration files. Windows 2000 uses a central configuration file called the "registry." The registry contains thousands of entries containing software and system configuration information. Some of those entries specify the list of hardware devices that were detected when the operating system was first installed, including the disk controller. Another registry entry specifies the correct driver for the disk controller.

A computer's processor, chipset and disk controller are essential to an operating system's booting process; they are therefore sometimes called "critical devices." When an operating system is installed on a computer, the installation process also installs a permutation of files and registry entries that is compatible with the computer's critical devices. When a Windows 2000 disk is moved or imaged to a different computer, the operating system may fail to boot if the previously installed permutation is not compatible with the destination computer's critical devices.

Existing Solutions to the Hardware Compatibility Issue

Some operating systems are designed or can be configured to start up on a diverse set of computer hardware configurations. For example, SysLinux, a variant of the Linux operating system, is capable of re-detecting a computer's hardware, including critical devices, on every boot. This allows it to select the correct kernel and drivers at run-time.

Other operating systems, such as Windows 2000, must boot using a specific kernel and HAL, which are identified by predefined names. A Windows 2000 file system may contain multiple versions of kernels and HALs, but only the ones named with the predefined names will be used to boot the operating system.

A common but inelegant solution to the hardware compatibility issue is to create one image file per family of similar computers. For instance, if a user wants to create an image of a computer running Windows 2000 and a custom application, and to be able to deploy this image on both uniprocessor and multiprocessor computers, he would have to manually install the software on two different source computers, one uniprocessor and the other multiprocessor. The user would then have to create two separate images, one for each computer type. At deployment time, the user must select the image that is compatible with the destination computer.

Another solution is to use additional software specifically designed to help the operating system cope with diverse hardware configurations. Microsoft Sysprep is an example of such a software tool. A user runs Sysprep on a Windows 2000 computer before capturing an image of that computer. Sysprep accepts a file specifying all of the possible disk controllers that a destination computer might use when the image is deployed in the future. The tool copies drivers for the specified devices to the file system, creates the corresponding registry entries, and finally shuts down the computer to prepare it for offline disk capture. When a destination computer deployed from a Sysprep'ed image starts, the operating system first detects the active disk controller, finds the matching entry that Sysprep created in the registry, and uses the entry to locate the correct driver. This solution works because multiple drivers can be present in the file system, but only the correct one is loaded.

The Sysprep approach has several limitations. First, it can handle changes only in the disk controller device. If the source and destination computer have different chipsets or processors, the operating system will not be able to start on the destination computer. The reason is for this is that the kernel and HAL are the first operating system files to load into memory, and if they don't match the hardware, the operating system can crash before it has a chance to detect other devices or consult the registry. Sysprep cannot simply copy multiple versions of the HAL and kernel into the file system, since the operating system will use only the ones that are hard-coded with the predefined names. In other words, at boot time, there may be no way to select the correct kernel or HAL based on the hardware configuration.

Second, a Sysprep'ed image is compatible only with the set of devices specified at the time Sysprep was executed on the source computer. When a new computer equipped with a new disk controller model is added to an organization, it may not be compatible with existing disk images.

Third, running Sysprep on a computer before capturing its image is a manual and error-prone operation that adds overhead and complexity to the overall disk imaging process. Some contemporary disk imaging products, such as Symantec Ghost Enterprise, include software to automate parts of the Sysprep process. However, they require a user to install special software on a computer before it can be Sysprep'ed and captured.

Image Customization

An image is often used to make multiple clones of a base computer. The approach is to capture an image from the base computer's disk, and then deploy the same image to multiple destination computers. Before the initial image is captured, the base computer is configured with an operating system and common set of software applications that are required on all clones. Any computer deployed from this image would inherit the same set of software.

Computer cloning faces a well-known issue: a clone generally requires a small set of network parameters to be reset to values unique to the clone in order to function correctly on a network shared with the base computer and other clones. Those parameters are generally stored on disk, and therefore in the image. They may include a globally unique security ID, a computer name, and a network address. Two computers running with identical parameters may conflict with each other on a network.

When a clone is deployed from an image, it inherits the source computer's parameters. In order to avoid network conflicts, the parameters must be set to new values that are unique to the clone.

The Sysprep tool discussed earlier provides a limited system parameter customization capability. When a source computer is prepared with Sysprep before image capture, the tool copies a small program, called setup program, to the file system, and configures the operating system to run that setup program the next time the operating system boots. The tool also copies a data file containing instructions for the setup program. The tool then shuts down the operating system in preparation for an image capture operation.

The resulting image represents a snapshot of the source computer just after running Sysprep but before the next system boot. The data file contains new system parameter values to set on the next system boot. When a destination computer deployed from the image starts for the first time, the setup program reads the parameters from the data file, and changes the computer's parameters based on those values.

In order to set up each clone with a different set of parameters, a disk imaging system may use the image editing functionality described earlier to modify the contents of the data file in an image just before deploying it. The modifications can be used to change any of the system parameters. The new values to use can be provided by a user or be generated automatically by the imaging system using predefined rules.

Virtualized Computer Systems

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer. Depending on how it is implemented, virtualization also provides greater security since it can isolate potentially unstable or unsafe software so that it cannot adversely affect the hardware state or system files.

See FIG. 1. As is well known in the field of computer science, a virtual machine (VM) is a software abstraction—a "virtualization"—of an actual physical computer system. A virtual machine 500 is installed as a "guest" on a "host" hardware platform 100. Two configurations are in general use—a "hosted" configuration, illustrated in FIG. 1, in which an existing, general-purpose operating system (OS) forms a "host" OS 220 that is used to perform certain I/O operations; and a non-hosted configuration, illustrated in FIG. 2, in which a kernel customized to support virtual computers takes the place of the conventional operating system. The main components of these two configurations are outlined briefly below. This invention works with either configuration.

As FIG. 1 shows, the hardware platform 100 includes one or more processors (CPUs) 110, system memory 112 (usually high-speed RAM), and at least one persistent, mass storage device, which will typically be a disk 114. The hardware 100 will also include other conventional mechanisms such as one or more conventional network connection device(s) 172 (such as a network adapter or network interface card—"NIC") for transfer of data between the various components of the system and a bus or network.

System software 200 includes the host operating system 220, which will include drivers 222 as needed for various connected devices 400. The user's monitor and input devices such as a keyboard, mouse, trackball, touchpad, etc., are usually also included among the devices for obvious purposes. The host operating system (OS) 220 may be any known OS and will therefore have all typical components.

Each VM 500 will have both virtual system hardware 501 and guest system software 502. The virtual system hardware typically includes at least one virtual CPU 510, virtual system memory 512, at least one virtual disk 514, and one or more virtual devices 540. Note that a disk—virtual or physical—is also a "device," but is usually considered separately because of its essential role. All of the virtual hardware components of the VM may be implemented in software using known techniques to emulate the corresponding physical components. The guest system software includes a guest operating system 520 (which may simply be a copy of a conventional operating system), and drivers 522 as needed for the various virtual devices 540; in particular, a driver VDSK 524 will be included to manage access to the virtual disk 514.

If the VM is properly designed, then it will not be apparent to the user that any applications 503 running within the VM are running indirectly, that is, via the guest OS and virtual processor. Applications 503 running within the VM will act just as they would if run on a "real" computer, except for a decrease in running speed that will be noticeable only in exceptionally time-critical applications. Executable files will be accessed by the guest OS 520 from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory 112 and storage devices 114. A common term for this interface is a "virtual machine monitor" (VMM), shown as component 600. A VMM is usually a thin piece of software that runs directly on top of a host, or directly on the hardware, and virtualizes resources of the physical host machine. The interface exported to the VM is then the same as the hardware interface of the machine (or at least of some machine), so that the guest OS cannot determine the presence of the VMM.

Although the VM (and thus the user of applications running in the VM) cannot usually detect the presence of the VMM, the VMM and the VM may be viewed as together forming a single virtual computer. They are shown in FIG. 1 as separate components for the sake of clarity. There may be several VM/VMM pairs (virtual computers) running on a common host; a single VM/VMM pair is shown in FIG. 1 for simplicity.

Moreover, the various virtualized hardware components such as the virtual CPU(s) 510, the virtual memory 512, the virtual disk 514, and the virtual device(s) 540 are shown as being part of the VM 500 for the sake of conceptual simplicity—in actual implementations these "components" are usually constructs or emulations exported to the VM by the VMM, for example, as emulators 640. One advantage of such an arrangement is that the VMM may be set up to expose generic devices, which facilitates VM migration and hardware platform-independence.

The configuration illustrated in FIG. 1 is used in the Workstation products of VMware, Inc., of Palo Alto, Calif. In this configuration, the VMM 600 is co-resident at system level with the host operating system 220 such that both the VMM and the host OS can independently modify the state of the host processor. However, the VMM calls into the host OS (symbolized by the dashed, double-ended arrow) via a special one of the drivers 222 and a dedicated one of the user-level applications 300 to have the host OS perform certain I/O operations of behalf of the VM. The virtual computer in this configuration is thus hosted in that it runs on an existing host hardware platform together with an existing host OS. A hosted virtualization system of the type illustrated in FIG. 1 is described in U.S. Pat. No. 6,496,847 (Bugnion, et al., "System and Method for Virtualizing Computer Systems," 17 Dec. 2002), which is incorporated here by reference.

In other implementations, a dedicated kernel takes the place of and performs the conventional functions of the host OS, and virtual computers run on the kernel. FIG. 2 illustrates such a configuration, with a kernel 800 that serves as the system software for several VM/VMM pairs 200/300, . . . , 200n/300n. Compared with a system in which VMMs run directly on the hardware platform, use of a kernel offers improved performance for I/O operations and facilitates provision of services that extend across multiple VMs (for example, for resource management).

Compared with the hosted deployment, a kernel may offer greater performance because it can be co-developed with the VMM and be optimized for the characteristics of a workload consisting of VMMs. The ESX Server product of VMware, Inc., has such a configuration. A kernel-based virtualization system of the type illustrated in FIG. 2 is described in U.S. Pat. No. 6,961,941 ("Computer Configuration for Resource Management in Systems Including a Virtual Machine"), which issued on Nov. 1, 2005 and which is also incorporated here by reference.

Virtual Disks

As mentioned above a virtual machine monitor exposes a set of hardware devices, or virtual devices, to the guest. Those devices include a virtual disk controller and a virtual disk. A virtual disk usually exposes the same abstraction as a real disk, that is, a linear list of sectors; however, a VMM may choose to implement virtual disks as regular files on the host. Since a virtual disk file represents the sector-by-sector contents of a disk, it is by definition a type of sector-based image file.

Sparse Virtual Disks

A VMM may implement a virtual disk using a sparse, sector-based image format. This design can keep virtual disk files small if the amount of data written to the disk is smaller than the disk's capacity. For instance, when a user creates a virtual machine, he is usually also allowed to specify the capacity of the virtual disk. The VMM then defines this disk to be filled entirely with sectors containing all zeroes. A newly created sparse virtual disk file is thus small in size, regardless of its capacity. When the user runs the virtual machine and installs software in it, including a guest operating system, the virtual disk file will grow in size, but only to the extent needed to hold the file system metadata and data generated by the guest.

Copy-on-Write and Undoable Disks

Most existing virtual machine products, such as those sold by VMware, Inc., of Palo Alto, Calif., employ the copy-on-write technique to allow a virtual machine to modify its virtual disk without actually modifying its virtual disk file. When copy-on-write is enabled for a virtual disk, modifications to the file are stored in a separate file, sometimes called a redo log. A redo log specifies which sector locations in the original disk were written and contains the modified contents for those locations. A redo log, combined with the original virtual disk it is derived from, represents a second, logical disk whose contents are defined as the original disk's contents with the exception of the modified sectors specified in the redo log. Copy-on-write enables a virtual machine user to discard changes to a virtual disk in case the changes are temporary or contain accidental modifications to files.

Redo logs may also be "chained" as a sequence of "delta" disks, each of which records writes to the virtual disk since a most recent preceding checkpoint. The first such delta disk thus records changes to the initial state of the virtual disk; the second delta disk records writes after the first delta disk is checkpointed; and so on. The virtual disk can then be "committed" to any checkpointed state by incorporating into it the writes recorded in all delta disks up to and including the chosen checkpoint.

Virtual Machines and Disk Imaging Software

A powered-off (i.e., inactive) virtual machine generally comprises a configuration file that describes the VM's set of hardware devices, such as memory size and input/output ports, and a virtual disk file. Those two files define a complete computer, and can be moved or copied from one host computer to another. Virtual machines can thus be viewed as mobile computers, totally encapsulated and represented by a set of files.

Virtual disks and conventional disk images are similar in that they encapsulate the state of a computer's disk. Cloning a virtual machine, however, is generally much easier than the equivalent image deployment operation on physical computers. In order to clone a virtual machine, a user needs simply to make copies of its configuration and virtual disk files, and place them on the host computer of choice. To power on and run the cloned virtual machine, all that the host computer needs is to have the appropriate VMM software installed.

Deployment Issues

Virtual machine cloning is subject to the same network parameter customization issue that affects disk imaging of physical computers. A virtual machine cloned from a base virtual machine may conflict with the base machine if its network parameters aren't reset to new and unique values.

Virtual machine cloning generally does not suffer from the hardware compatibility issue, since VMM software usually exposes a stable set of virtual hardware devices. In other words, the virtual hardware visible to a cloned VM is identical to that of the base VM as long as the virtual machine configuration file—in addition to the virtual disk file—is copied during the cloning process.

The hardware compatibility issue does arise, however, when a physical computer needs to be converted into a virtual machine, and vice-versa. This leads to a discussion of the physical/virtual interoperability problem.

Physical and Virtual Interoperability

As virtual machine software grows in popularity, information technology (IT) professionals increasingly work in a computing environment involving both physical computers and virtual machines. In particular, there is a need to easily convert physical computers to virtual computers, and vice-versa. Server consolidation is a context in which this conversion capability is particularly desirable. The idea behind server consolidation is to take multiple server computers and run them as virtual machines on a single physical computer. The benefits of server consolidation include reduced hardware costs, since only one physical computer is needed, and possibly reduced management costs, since the servers run on a centralized platform.

In order to implement server consolidation, an IT professional may want to migrate multiple existing physical server computers into virtual machines hosted on a single, more powerful physical computer. Migration of an existing server is usually more attractive than re-creating an equivalent computer inside a virtual machine from scratch, since an existing server already has a functioning software stack that was previously configured, tuned, and validated for the intended business mission.

Unfortunately, just like a real computer, a virtual machine exposes a specific set of critical devices, including processor, chipset, and disk controller. Those virtual devices don't have to—and usually don't—match the host computer's hardware. Consequently, physical-to-virtual (P2V) migration is subject to the same hardware compatibility issues that plague disk imaging systems.

One possible approach for making virtual machines easier to migrate to is to enhance a VMM to expose virtual hardware that more closely resembles that of a typical physical computer. However, implementing a new virtual device in software can require an expensive engineering effort. It can also be somewhat wasteful, since some features of a physical hardware device, such as the advanced power management capabilities of an ACPI chipset, may not be meaningful or useful in the context of a virtual machine.

Virtual-to-physical (V2P) migration is another form of conversion that an IT professional may want to perform. A common scenario that illustrates this is the development and test environment. Virtual machines are a popular platform for developing and testing software applications because they provide the following benefits: the ability to roll back a test computer's state by using undoable disks; the ability to test software on multiple operating systems running in different virtual machines; and the ability to simulate a network of multiple machines using a single physical computer, using a VMM's virtual network capabilities.

Once a complete software stack comprising an operating system and application is tested and validated in a virtual machine, an IT professional may choose to move the stack into production by deploying it onto a physical computer to achieve maximum performance.

Running Disk Imaging Software Inside a Virtual Machine

In order to solve the conversion and hardware compatibility problem between physical and virtual machines, it is possible to run a combination of existing tools such as Sysprep and disk imaging software within virtual machines. For example, in order to convert a physical computer into a virtual machine, a user might first run Sysprep on the physical computer, shut it down, capture an image from the computer, and temporarily store the image on a second computer running the disk imaging server software. The user then creates a new virtual machine with an empty virtual disk, and then powers it on from a secondary operating system loaded from a virtual floppy disk or CD-ROM; this causes the disk imaging client to get loaded into the virtual machine's memory. The imaging server then deploys the image to the client, which has the side effect of populating the virtual machine's virtual disk. Finally, when the image deployment process finishes, the virtual machine can restart from its own virtual disk, thereby loading its own operating system.

When the client writes to what appears like a physical disk, it issues sector-level I/O requests to this disk. The virtual machine monitor that controls the virtual machine intercepts those requests and translates them to reads and writes to the appropriate data areas within the virtual disk file.

SUMMARY OF PRIOR ART

Disk imaging technology enables backup and rapid deployment of computers. A disk image is an ordinary file that represents a snapshot of a disk's contents. Image file formats fall into two broad types: sector-based, and file-based. A sector-based image format represents a disk at the lowest possible layer: the sector level. A sector-based format can faithfully back up and restore a disk's exact contents without the need to interpret file systems. Sector-based formats suffer from two limitations: the disk capacity matching problem and the storage inefficiency problem.

Contemporary disk imaging products generally use a file-based image format, one that is optimized for storing file and folder contents. A file-based imaging system must be capable of decoding file systems in order to extract and store the useful contents of a disk.

Many modern disk imaging systems use the offline imaging method to solve the open files problem. In offline imaging, a computer that is the source or destination of an imaging operation must first be booted into a secondary operating system. During deployment, the secondary operating system and an imaging client module collaborate to format the destination disk with an empty file system, and then copy files from the image to the disk.

Support for a proprietary file system format increases the development cost of a file-based disk imaging system because the appropriate file system driver may be difficult to develop or expensive to license.

In existing disk imaging systems, the burden of naming, tagging, and organizing disk images is largely left to users. A user usually identifies an image's contents and purpose based solely on the image's file name. Since names are short and human-defined, they are ambiguous, incomplete, and may not accurately reflect an image's contents.

Disk imaging is often used as a cloning technology for rapid computer deployment. Image-based computer cloning faces two issues. First, there is the hardware compatibility issue. A disk image may contain a set of operating system drivers and configuration files that rely on a particular set of hardware devices. If the image is deployed onto a computer with different hardware, the operating system may fail to load.

A first solution is to generate multiple variants of the same image, one for each family of computer hardware. This has the drawback of increasing the number of images a user would have to maintain, and thus the overall management complexity. A second solution is to run a special tool in a source computer before image capture. This tool prepares the operating system to boot on a more diverse set of computers by pre-installing drivers and creating appropriate configuration file entries. This solution has multiple drawbacks. First, a user has to run additional software on the source computer to prepare it. Second, the set of all possible destination computer hardware configurations has to be known at preparation time. New computers and new hardware devices are frequently introduced into an organization, and may be incompatible with images captured from older computers.

Virtual disks are similar to disk images in that they encapsulate a disk's state. A mixed environment comprising both physical and virtual machines is a difficult one to manage because an IT administrator has to maintain both disk images for physical computers, and virtual disks for virtual machines. Cloning virtual machines doesn't usually require disk imaging software, since a virtual machine is encapsulated by a virtual disk and a set of configuration files, which can be freely duplicated and copied.

Migration between physical and virtual machines, however, is a difficult and time-consuming task. First, conventional disk images and virtual disks tend to differ in the way they internally represent disk contents. Consequently, converting a disk image to a virtual disk usually requires running disk imaging software inside of a virtual machine. Second, the set of hardware devices exposed by a virtual machine is generally different, and often simpler, than real physical computers. This increases the risk of a hardware incompatibility problem when deploying an existing image to a virtual machine, or when capturing an image from a virtual machine and then deploying it onto a physical computer.

The prior art thus provides several different solutions to the problem of creating disk images, all of which suffer from limitations of their own. What is needed is a solution that makes disk imaging possible but without these limitations, or least such that they are less acute. This invention provides such a solution.

SUMMARY OF THE INVENTION

The invention provides method and related system implementation for configuring a computer. A source image of the hardware and software configuration of a source computer, including the state of at least one source disk, is automatically captured. The source computer may remain unprepared and requires no program for facilitating computer cloning and reconfiguration. The source image is automatically analyzed and the hardware configuration of a destination computer is determined. The source image is modified as needed and is then deployed on the destination computer.

The hardware configuration of the destination computer may be determined automatically. One way to do this according to the invention comprises automatically determining a unique identifier of the destination computer; and automatically retrieving hardware configuration information for the destination computer from a database entry corresponding to the unique identifier.

As one alternative, a configuration collection program may be automatically downloaded and run, before the steps of modifying and deploying the source image.

According to one aspect of the invention, modification of the source image comprises adapting the source image for compatibility with the destination computer. For a given destination computer, the presence of all files necessary for image modification and deployment of the source image are determined and any missing files are then located, obtained and installed.

Configuration and identification information may be pre-stored in a database for a group of eligible destination computers; in which case the step of determining the presence of all files necessary for deployment by for a given destination computer includes querying the database to locate and obtain the missing files. The missing files may be cached locally, in which case missing files are located and obtained from the cache when subsequently needed.

The invention also supports image customization. According to this aspect of the invention, the step of modifying the source image comprises customizing the source image before deploying the image on the destination computer. The source image may be modified according to customization parameters stored in a database before the image is deployed on the destination computer; or according to user-specified parameters that are automatically generated by applying at least one of a set of pre-stored customization rules.

Either or both of the source and destination computers may be virtual machines. Where the source computer is a virtual machine that has a virtual disk, the source image can be captured by copying the virtual disk.

In applications where the destination computer is a virtual machine, the step of deploying the possibly modified source image on the destination computer may include loading the possibly modified source image as a virtual disk of the destination computer. The destination computer may initially be provided without its own virtual disk, in which case the source image may be deployed on the destination computer by attaching the possibly modified source image as the destination computer's virtual disk.

DETAILED DESCRIPTION

Figure 1:
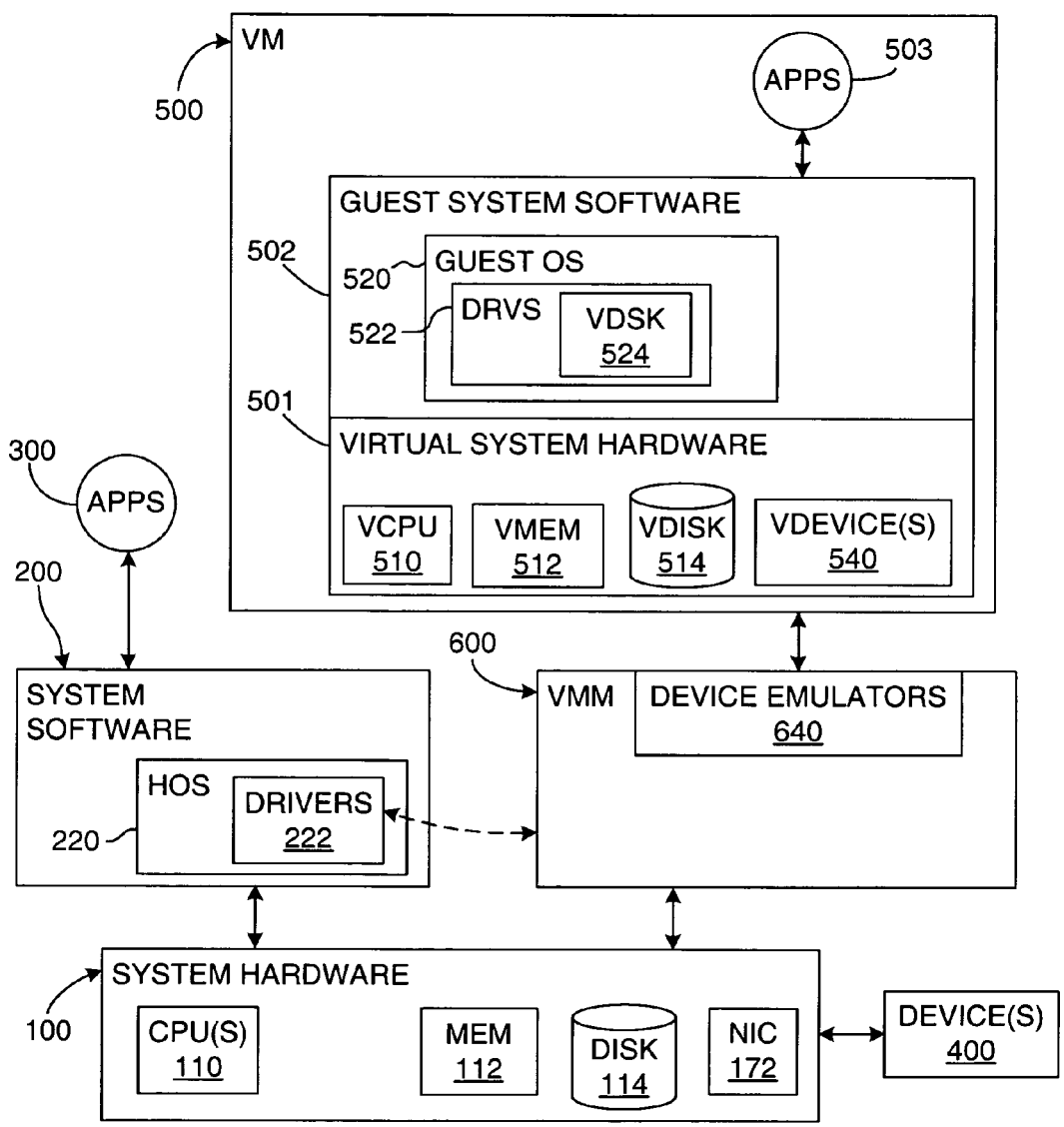
FIG. 1 illustrates the main components of a hosted virtual computer.

In broadest terms, the invention is a system for creating, manipulating, and deploying computer disk images. The system introduces several novel contributions to the field of computer disk imaging. These contributions are discussed in detail below, but are mentioned here by way of an overview. Moreover, in the discussion of the various features of the invention, some of the features of prior art solutions are reviewed so as to make it easier to contrast the invention with them.

First, the invention employs a unified image file format for both physical computers and virtual machines. Employing virtual machine disks as a common image format reduces administration costs by reducing the number of files to manage, and provides the ability to migrate entire software stacks between physical computers and virtual machines with little or no user intervention.

The invention's second novel contribution is its ability to automatically search, classify, tag, and organize images based on their internal contents, and in particular the system configuration of the software stack enclosed within the image. In contrast, existing solutions treat images as opaque boxes, requiring users to classify images by file name or with textual annotations, which leads to an imprecise and ambiguous way of organizing images.

Third, the invention correctly and automatically solves the hardware migration problem that has plagued existing disk imaging systems. The problem arises from the fact that operating system software installs hardware-dependent drivers and configuration settings on a computer's disk. When the disk or an image of the disk is moved to another computer, the software may malfunction on the new computer because the underlying hardware configuration has changed. The invention solves the hardware migration problem by analyzing an image's system configuration, comparing it against the hardware configuration of a destination computer or virtual machine, and then making the necessary driver and configuration changes within the image itself to allow the software to boot and function on the destination hardware, all of this without requiring the image to contain software specifically designed to facilitate the migration.

A scaled-down, special purpose embodiment of the invention can exploit this hardware migration capability to provide a reliable physical-to-virtual (P2V) computer migration service. This utility first captures a virtual disk image from the physical computer, then reconfigures the software within the virtual disk to enable it to boot in a virtual machine. The utility makes no modifications to the physical computer, and is therefore safe and unintrusive. This utility can also be configured to perform migrations between dissimilar virtual machines (V2V conversion), or to migrate virtual machines to physical computers (V2P).

A key feature of this P2V utility is that it operates on an image of an unmodified physical computer; in other words, the physical computer's disk state is never modified for the purpose of P2V conversion. Existing P2V solutions, on the other hand, may require installing additional software on the physical computer, or altering its configuration before capturing an image of it.

A fourth novel contribution is in the area of image customization, and management of computers deployed from images. Existing disk imaging systems generally require users to prepare images, i.e., install additional software inside of computers before capturing images from them. Symantec Ghost and Microsoft ADS (automated deployment services) are examples of such existing systems. The additional software, which generally consists of one or more agent programs, customizes a computer after it is deployed from an image, and allows a central server to remotely monitor and manage the computer.

Moreover, in the specific case of Microsoft's ADS, the image must be equipped or prepared with at least two software components: Microsoft Sysprep, and the Microsoft Deployment Agent. This approach is intrusive because it requires users to install additional software that does not directly serve their interests; more fundamentally, it binds an image to a specific type and generation of agent software, which could render the image obsolete when newer generations of the software becomes available.

The invention, on the other hand, keeps the customization and management software separate from images. The invention automatically inserts the necessary software into a copy of the image just before deployment, thereby equipping the deployed image with the most optimal and up-to-date set of management software. Moreover, the invention is also able to upgrade the management software; in other words, even if the image already contains mgmt software, the invention can overwrite it, replace it, upgrade it, etc.

In essence, the invention isolates the "business" function of a software stack from hardware dependencies and the software mechanisms needed to manage the stack. This allows it to restrict images to their intrinsic, useful content, from users' perspective. This approach reduces the number of images users have to manage, and ensures that they never become obsolete when new generations of hardware or management software are introduced.

Yet another novelty is the ability to automatically compare images against each other, and to produce delta files describing file differences between two images. Deltas can be viewed, stored, and can be applied to existing images in order to create new ones. This allows the invention to be configured as an image or virtual machine factory. Based on a set of core template images, and a set of deltas, the image factory can create custom, pre-configured and read-to-deploy images or virtual machines.

The invention is a disk imaging system that employs a single, unified image file format supporting both physical and virtual machines; the unified image file format is preferably the sparse virtual disk. Using virtual disks as universal images, as in the preferred embodiment of the invention, provides many benefits, especially in a heterogeneous computing environment consisting of both physical and virtual machines. The invention can use any image file format, however, although the sparse, sector-based image format is preferred because it allows for easy loop-back mounting (see below). Moreover, once a format is chosen, even if it does not start out as a virtual disk format, a virtual machine product can be adapted using known methods so as to treat it and use it as a virtual disk.

One Image Format

Using virtual disks as images allows physical and virtual machines to be converted between each other directly, without the need for a second, intermediate image file format. When a physical computer's disk is captured and stored as a virtual disk file, and the disk contains an operating system, the file can immediately be used as a virtual machine's primary disk, allowing the virtual machine to boot from the operating system. A virtual disk can also be used as a regular disk image for physical computers, i.e., it can be archived, cataloged, then later deployed to one or multiple physical computers for backup/restore or cloning purposes. By reducing the number of image files, a unified image format greatly simplifies image management and reduces disk space requirements.

Selecting virtual disks as a common image file format is not an obvious choice, since virtual disks use a sector-based format, and this type of format is known to have issues when used as a disk image format, as the discussion above on prior art explains. Not surprisingly, no contemporary disk imaging system uses virtual disks as image files. The invention addresses and overcomes the traditional shortcomings of sector-based image files using the mechanisms described below in the section entitled "Overcoming Traditional Limitations of Sector-Based Image Formats." A description of those mechanisms first requires an understanding of how the invention accesses and modifies a virtual disk's file contents.

Simplified Image Content Editing

An important advantage of a virtual disk, and in general of all sector-based image files, is that its file contents are easily accessible to standard file manipulation software tools that are unaware of virtual disks or disk images. As explained in the discussion on prior art, contemporary disk imaging systems generally require a user to use a specialized tool to access and modify the contents of a disk image file. For example, the Symantec Ghost imaging system requires a user to use an application called Ghost Explorer to transfer files between the image and the host operating system's file system. Virtual disks, in contrast, lend themselves well to a mechanism called loop-back mounting, which enables a user to directly access files from the virtual disk using standard system commands, tools, or applications.

Loop-back mounting is the process of taking a file and presenting it as a physical disk to the operating system. The operating system is fooled into detecting what appears to be another physical disk, causing file system drivers within the operating system to attempt to detect and mount the file system(s), if present, residing on the disk. A special loop-back driver, belonging to a family of drivers called storage class drivers, provides the loop-back mechanism by presenting the abstraction of a disk to the operating system. Whenever the operating system accesses a sector of the abstracted disk, the loop-back disk driver translates the sector request into a file access request to the file. The mapping between sector locations and their corresponding contents within the file are defined by the image's internal format. A loop-back driver can access the file using a direct kernel-mode call, as does the known Filedisk driver, or by forwarding the request to a user-level program, which in turns accesses the file using a system call, which is a method used, for example, by the known Proxy driver.

Loop-back mounting of a file requires the file's internal format to expose a sector-level abstraction of a disk, since the operating system, and more precisely its file system drivers, always access a disk using a sector interface. A virtual disk, by definition, always exposes a sector-level interface; therefore it is a natural match for loop-back mounting.

The invention includes a loop-back driver, combined with a user-level program, called the "adapter," to mount virtual disks as real disks. Once a virtual disk is loop-back mounted, the operating system scans the disk for any recognized file system formats. If the disk contains a file system recognized by any of a set of file system drivers registered with the operating system, the appropriate driver will mount the file system and expose it to all software hosted by the operating system. Since the file system mounted from a virtual disk is no different from a file system mounted from a physical disk, any user-level program using standard system calls can read and write files residing on the virtual disk.

While loop-back technology in and of itself is not novel, the invention employs the technology to make virtual disks a viable file format for disk imaging. Furthermore, the invention exploits this image content editing flexibility to achieve functionality not available in conventional imaging systems. The novel functionality spans two major areas: image analysis/classification, and image customization for deployment and hardware migration.

Overcoming Limitations of Sector-Based Image Formats

A virtual disk typically implements a sector-based image file format. When used in the context of disk imaging, sector-based files face two traditional problems: capacity matching and inefficient storage of free sectors. In order to solve those problems, the invention uses a virtual disk not as a sector-by-sector replica of a source disk, but rather as a different disk with a different sector-by-sector content and layout, but containing a file system equivalent to the one on the source disk. Two file systems on two separate disks are said to be equivalent if their file system format is identical, they contain the same files and folders, the file contents and attributes are identical, and the structural relationship between files and folders is also identical. In other words, two equivalent file systems may have a different physical layout on disk, but they contain the same information.

During an image capture process, a disk imaging system based on the file system equivalence approach copies files—not sectors—from the source disk to the destination image. This eliminates the capacity matching problem, since the source and destination disks can have different capacities, as long as the destination is large enough to hold all of the source's files.

The efficiency problem is also eliminated as follows: Before the capture process begins, the imaging server creates a destination image representing a disk containing all zeroes. Since the image is actually a sparse virtual disk file, its initial size is extremely small (almost zero, in fact), regardless of the chosen disk capacity. During the capture process, a file system driver or a file system encoder module creates the necessary data and metadata sectors on the destination disk to represent a new file system that is equivalent to the source file system. Given that only useful sectors are created during the process, the destination virtual disk's final size is minimal and optimal, since sectors that were not written during the process still contain all zeroes, and therefore aren't represented in the final file.

The following section on disk imaging operations describes in more detail how the invention achieves file system equivalence.

Disk Imaging Operations

In order to create a file system on a destination disk that is equivalent to the one residing on the source disk, the invention must 1) decode the source file system to read its properties and files; and 2) create and populate a file system of the same format on the destination image; in other words, encode the destination file system.

Review of Existing Disk Imaging Methods

Most existing imaging systems embed one or more file system decoders in the imaging client, allowing the client to decode multiple file system formats. This allows the client to read files from a supported source file system, and transmit their contents over the network to an imaging server. The imaging server then compacts and stores the file contents and properties into the destination image, typically using a proprietary file-based image format.

Figure 3:
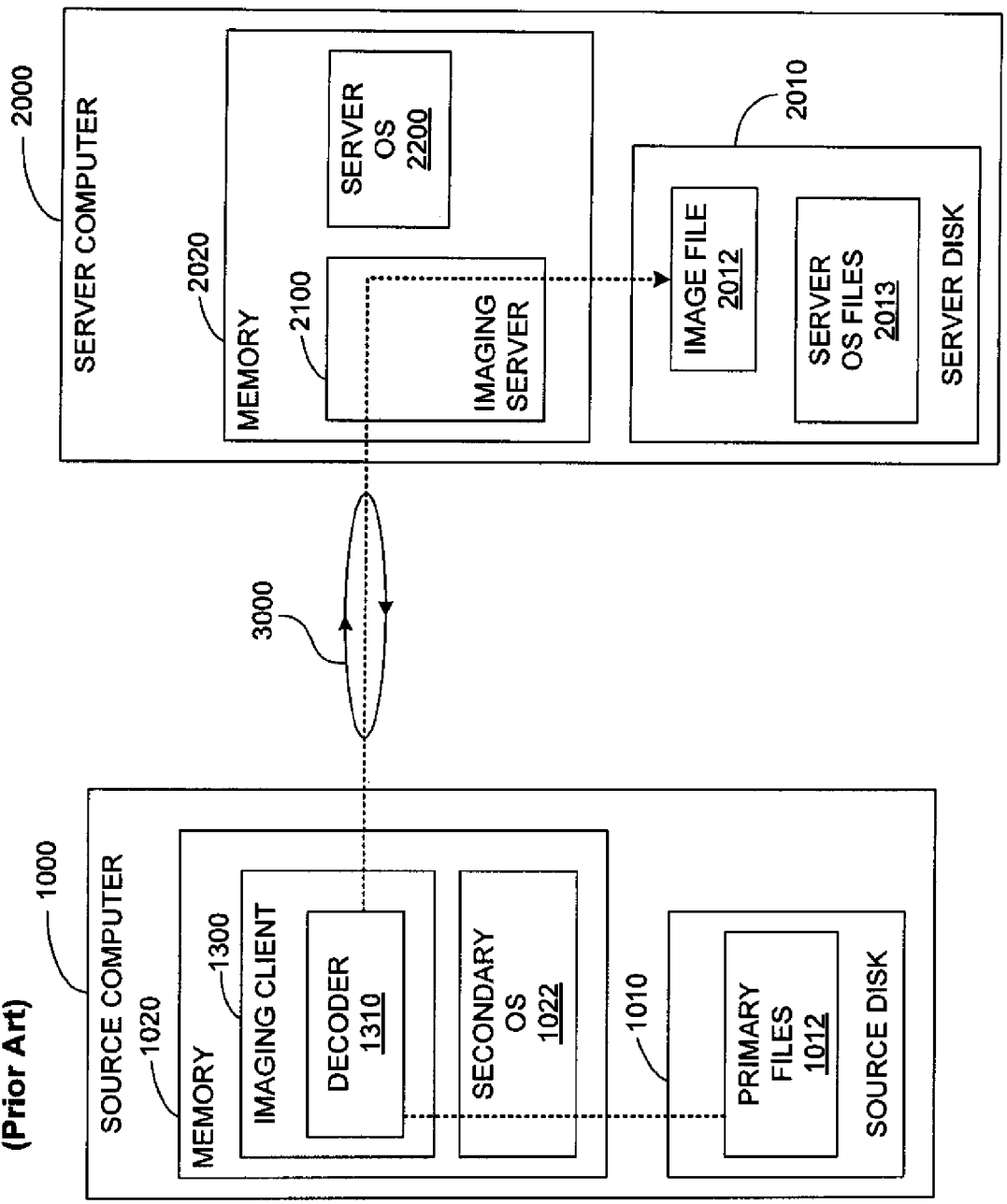
FIG. 3 illustrates how disk imaging is done in the prior art.

FIG. 3 illustrates this process as practiced in the prior art. A source computer 1000 is equipped with a source disk 1010 containing a set of primary files 1012, including the operating system's files and other files (including application files, data files, etc.). Under normal conditions, the computer boots from this disk when it is powered on; in other words, the computer loads the primary operating system into memory and runs it. During an image capture operation, the source disk 1010 represents the source disk, and the disk imaging system reboots the computer from an alternate medium, such as a floppy disk, CD, or memory image downloaded over the network using a mechanism like PXE (Preboot Execution Environment).

The reboot process loads an alternate set of software comprising a secondary operating system 1022 (again, such as a floppy disk, CD, or downloaded memory image) and an imaging client 1300 into memory 1020. The imaging client 1300 connects to an imaging server 2100 in a server computer 2000 over a network 3000, accesses the primary disk's 1010 sectors through an API provided by the secondary operating system 1022, decodes the sectors using a conventional file system decoder 1310, and transmits the disk information and file contents to the imaging server 2100. The imaging server 2100 is an application hosted by a server operating system 2200 running on the server computer 2000.

As shown in FIG. 3, as with any other running OS, the files 2013 making up the server OS file are stored on the server's primary disk 2010, but will be at least partly loaded in the memory 2020 of the server computer 2000 when the server OS is running. The imaging server 2100 then compacts the transmitted data into an image file 2012 residing on one of the server computer's disks 2010. The internal layout of the image file may be proprietary to the imaging software vendor.

The first drawback of the approach illustrated in FIG. 3 is that it adds complexity to the imaging client, since the client must contain the code and logic required for the decoding (decoder 1310). As pointed out above in the discussion on prior art, the secondary operating system 1022 used by offline disk imaging systems generally runs in an environment with restricted memory resources, so that any added complexity in the client can complicate its design or impact its performance.

The second drawback has also been previously discussed: If a source file system uses a proprietary format, it is challenging for the imaging software vendor to include the appropriate decoder or driver 1310. This is partly because such a software module may not exist for the selected secondary operating system and partly because developing a custom one for inclusion with the client can be costly—it requires either a reverse-engineering effort or paying a license fee to the file system format owner in order access the technical information needed for the developing the module.

Disk Imaging According to the Invention

Figure 4:
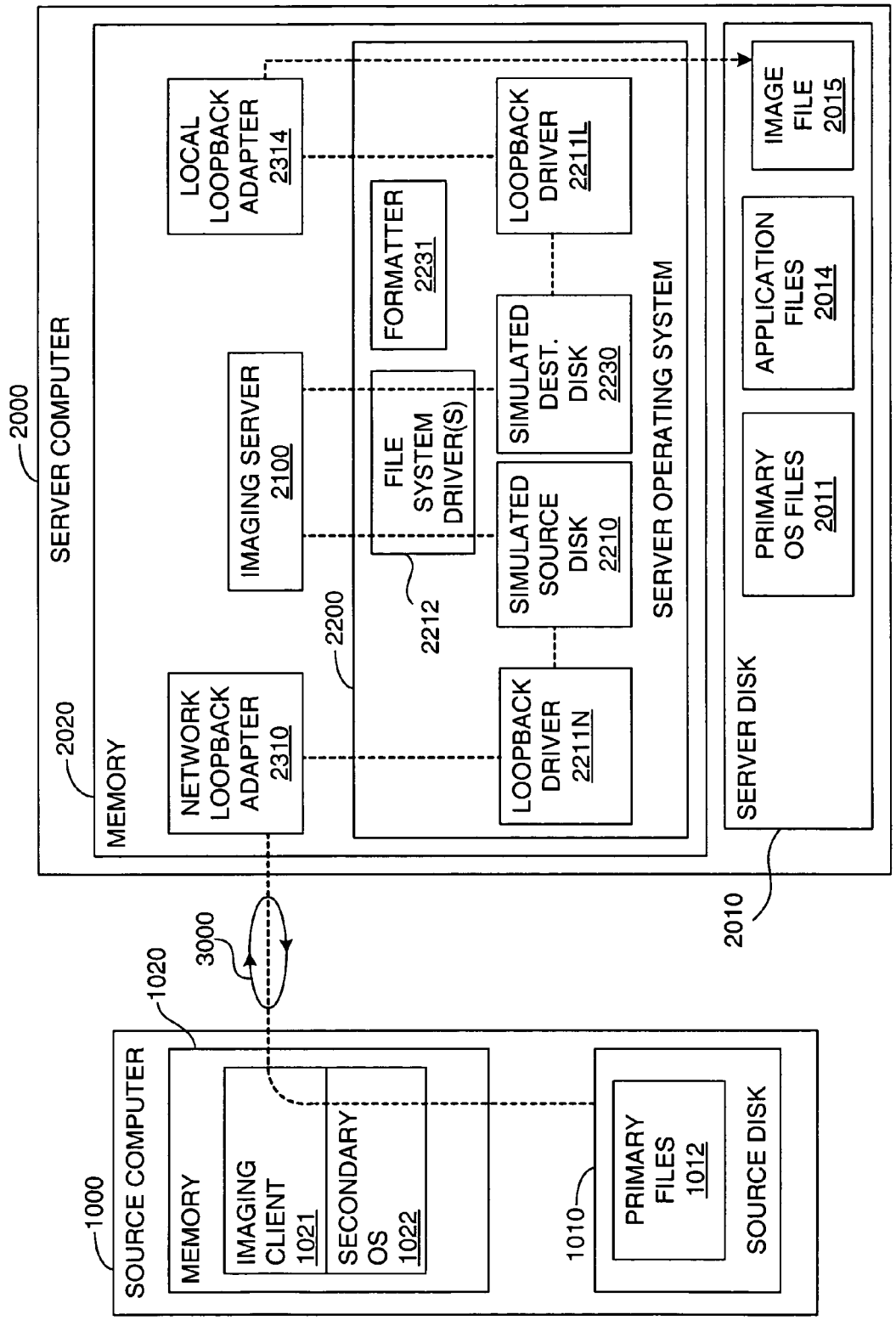
FIG. 4 shows the main components of a mechanism according to the invention for capturing disk images.

The invention's approach to image capture is illustrated in FIG. 4. Using the loop-back mounting method, the imaging server 2101 makes the source computer's source disk 1010 (i.e., the source disk) appear as a local disk from the server operating system's 2200 perspective; this local disk is referred to as "simulated source disk" 2210.

A loop-back driver 2211N presents (simulates plug-in of) the simulated source disk to the server operating system 2200, causing it to detect the disk and instruct each of a set of installed and registered file system drivers 2212 to inspect the disk to find any file system that it recognizes. Note that the simulated source disk will appear to the server OS 2200 as any other new disk device, such as a Firewire or USB external hard disk that a user can hot-plug into a running computer. To the server OS, the simulated source disk will thus look like an actual physical device, and the OS will try to send IO requests to it.

In general, whenever a disk is presented to file system drivers, the OS first determines the partitions of the disk from a data header stored on the disk (typically the first sector, called master boot record, or MBR). Each partition is a subrange of sectors. The OS then presents every partition to the registered file system drivers, allowing them to inspect the partition and detect a file system on the partition that they recognize. The detection and decoding of a file system generally requires reading a small number of sectors, not the entire partition.

If any (note that more than one may be present) file system is detected, the corresponding file system driver will present the file system to applications through a drive letter or a directory. When applications access files, the file system driver will access only the necessary sectors to satisfy the application's request. The imaging server 2101 itself is an application, and has the right to read all of the files from the file system, causing the file system driver to read all the useful sectors of the disk on behalf of the application.

In other words, when the source disk 1010 is mounted, the appropriate file system driver detects and decodes the source file system(s) on behalf of applications. The imaging server 2100 is one such application, and thus gets to "see" the source disk's files, albeit only their high-level attributes and contents. The imaging server 2100 will not know exactly what sectors on the source disk actually make up those files. One advantage of the invention is that it is not necessary for the imaging server 2100 to know this in order for an image of the source disk to be created with a (or the) file system(s) equivalent to the file system(s) of the source disk.

When one of the file system drivers accesses a sector from the simulated source disk, the loop-back driver 2211N intercepts this I/O request (for the sector) and forwards it to a user-level program called an "adapter" 2310, which is a network loop-back adapter that translates sector requests to network requests and sends them to an imaging client 1021.

The adapter for the simulated source disk 2210 forwards the request over the network 3000 to the imaging client 1021, which, as with the prior art imaging client 1300 (FIG. 3), is loaded in the memory 1020—not the disk 1010—of the source computer 1000. The imaging client 1021 then accesses the requested sector on the actual source disk 1010, through the secondary operating system 1022. Note that the imaging client 1021 in the invention contains no decoder, since its only function is to read and write sectors, and to communicate their contents over the network. Note further that whatever information the file system driver 2212 uses to access a sector on the simulated source disk 2210 can also be used to access the corresponding sector on the "real," source disk 1010, since the one is just an image of the other.

During the image capture procedure, the source computer 1000 will preferably not be allowed to run any application other than the imaging client 1021 itself. To accomplish this, before a capture operation is begun, the source computer's primary software stack is shut down, and the source computer is rebooted into the secondary software stack consisting of the secondary OS 1022 and the imaging client 1021. During capture, the imaging client 1021 is therefore the only program accessing the source disk 1010 (through the services of the secondary OS 1022). Since the imaging client 1021 operates on behalf of the current file system driver 2212 running on the server computer 2000, the net result is the file system driver is the sole owner and controller of the source disk during a capture operation. There is therefore no coherence problem, that is, no risk that a source application will change anything on the source disk in the midst of the capture operation.

Because the secondary software stack is loaded into memory 1020, the capture operation according to the invention allows the source disk to remain in an unmodified state (no special imaging software need be loaded on it at any time) and therefore remain reliably stable throughout the capture operation. Moreover, no special preparation (such as is needed when using Microsoft Sysprep) of the source disk is required.

The communication between the adapter 2310 and the imaging client 1021 requires a protocol for sending sector-level requests and responses over a network transport, such as TCP or UDP. This can be a custom-designed private protocol known only to the disk imaging vendor, or it can be a published protocol, such as iSCSI (Internet SCSI) and NBD (network block device). Such protocols were generally developed for purposes other than disk imaging. For example, iSCSI was designed to connect centrally managed disks to distributed, diskless computers, and usually requires the computers to be equipped with an iSCSI adapter card. NBD is an experimental protocol designed to equip a computer with a logical disk that consists of multiple network disks providing redundancy or additional performance, using a standard such as RAID. Regardless of their original purpose, these known protocols fundamentally achieve the same thing: transfer disk requests and contents over a standard network transport, such as TCP, and the invention can leverage these protocols by implementing them in the imaging client 1021 and the adapter 2310.

If a file system on the simulated source disk is recognized by one of the server operating system's 2200 registered file system drivers 2212, then it is mounted and exposed to all software running on the server 2000. (More than one file system may be present on the source disk and be detected by the drivers.) This allows the imaging server 2101 to retrieve information about the source disk, and most importantly, to read its files and directories; this takes care of the decoding side of the image capture problem.

By using the server OS's 2200 file API (such as ReadFile and WriteFile in a Windows environment), the imaging server thus indirectly causes the file system driver(s) to decode the metadata of the source files 1012, and read the contents of the source files themselves, which has the side effect that the file system drivers read useful sectors from the source disk. Those reads are serviced by the loopback driver 2211N and then the imaging client 1021.

The remaining issue is how to populate the destination image. Recall that the invention preferably uses sparse virtual disks as images. A virtual disk—which itself is preferably implemented as a single file, as explained above—represents sectors, not files, so in order for it to hold a destination file system equivalent to the source file system, the virtual disk must be formatted and populated by a file system encoder that understands the format of the source file system. This encoder is the same file system driver 2212 used to decode the source file system.

The invention first creates the destination image as a virtual disk with a capacity identical or larger than the source disk. A newly created virtual disk's sectors are preferably all initialized to contain zeroes. The initial file is therefore very small regardless of the chosen capacity, since the file containing the virtual disk preferably uses a sparse format. In order to encode a new file system on the image, the invention (in particular, the imaging server or a component such as one of the file system drivers, or some other operating system component) mounts the destination image in loop-back mode, thereby making the image (the virtual disk) appear as a simulated local destination disk 2230. The destination disk 2230 is uninitialized, and therefore contains no file systems initially.

When the server operating system 2200 or a file system driver 2212 accesses a sector on the simulated destination disk 2230, a second instance of the loop-back driver 2211L intercepts the access and forwards it to a second instance of the adapter program 2314. The adapter 2314 translates the sector-level access to an access to the image file 2015, and reads or writes the appropriate data area in the image 2015, i.e., the virtual disk.

The capture process can then proceed as follows: The imaging server 2101 uses the operating system's disk management API to partition the destination disk 2230, and then uses a conventional disk formatting utility 2231 to create a file system of the same format as the source file system.

As is known in the art of system-level programming, a physical disk can be "partitioned," i.e., divided, into several slices, or logical disks. Each partition is usually a contiguous range of sectors and a partition can contain a file system if it is formatted. A disk can thus contain multiple partitions, and therefore, file systems. Each file system can be of a different type. For instance, a disk containing four partitions can have one FAT, two NTFS, and one EXT2 (Linux) file system. If the source disk 1010 contains multiple file systems, the imaging system inspects the location and size of each of the source partitions. It then re-creates similar partitions with roughly the same size and locations on the simulated destination disk 2230, then formats each of the destination partitions with the same file system type as its counterpart on the source disk. Partitioning and formatting are performed by using the server OS's API or disk utilities. Once the destination file systems are created, they are ready to be populated with files copied from the source.

For example, on the Windows 2000 operating system, the imaging server 2101 can use a system call named DeviceIoControl( ) and a flag named IOCTL_DISK_SET_LAYOUT to partition the destination disk. Once the disk 2230 is partitioned, each partition can be individually formatted using a formatting module 2231 such as the Windows 2000 format utility; this creates an empty file system with the correct file system format on the destination disk 2230.

Finally, the imaging server 2101 can populate the image 2015 by copying files and directories from the source file system(s) to their corresponding destination file system(s).

Note that the imaging server 2100 copies files from the source file system to the destination file system, but in an indirect way: The driver 2211L (also the driver 2211N) and adapters 2310, 2314 work at the sector level, which is how actual disk I/O is performed. These components do not know where useful sectors are, and they do not know how to create a file system. However, they work on behalf of the file system driver 2212, which does know exactly how sectors are organized on a disk (source or destination/virtual) for the purpose of representing files. The local adapter 2314 therefore stores those sectors into the image file 2015 such that the stored sectors consist of both metadata and file contents, which, together, form a file system with contents equivalent to that found in the source disk.

When the file copy phase completes, the imaging server 2101 dismounts the two simulated disks 2210, 2230, causing the operating system to think they have been unplugged from the server computer. The imaging server 2101 then unloads the two adapters 2310, 2314 and the two loop-back driver instances 2211N, 2211L from memory 2020.

The final virtual disk file thus contains a file system equivalent to the one residing on the source disk. By creating and populating new files on the destination disk (the virtual disk file) using the same OS API, the imaging server 2100 indirectly causes the file system driver to create new metadata and new sectors on the destination disk, which causes sectors to be written on the destination disk, which the loopback driver 2211L and local adapter 2314 translate into data writes within the destination virtual disk file.

The adapters 2310, 2314 and the two loop-back driver instances 2211N, 2211L are of course modules of computer code (instructions and data as needed) that may be stored on the server computer's primary disk 2010 and loaded into the memory 2020 for execution when needed. Skilled programmers will know how to create these program modules given this description of their function and cooperation. The file system driver(s) 2212 are assumed to be a feature of the existing operating system, whose primary files 2011 are also normally stored on the server disk 2010, along with other application files 2014, and are loaded into memory when the server computer is booted. The simulated disks 2210, 2230 are simply memory or disk regions created for temporary use as described above.

Image Deployment

Figure 5:
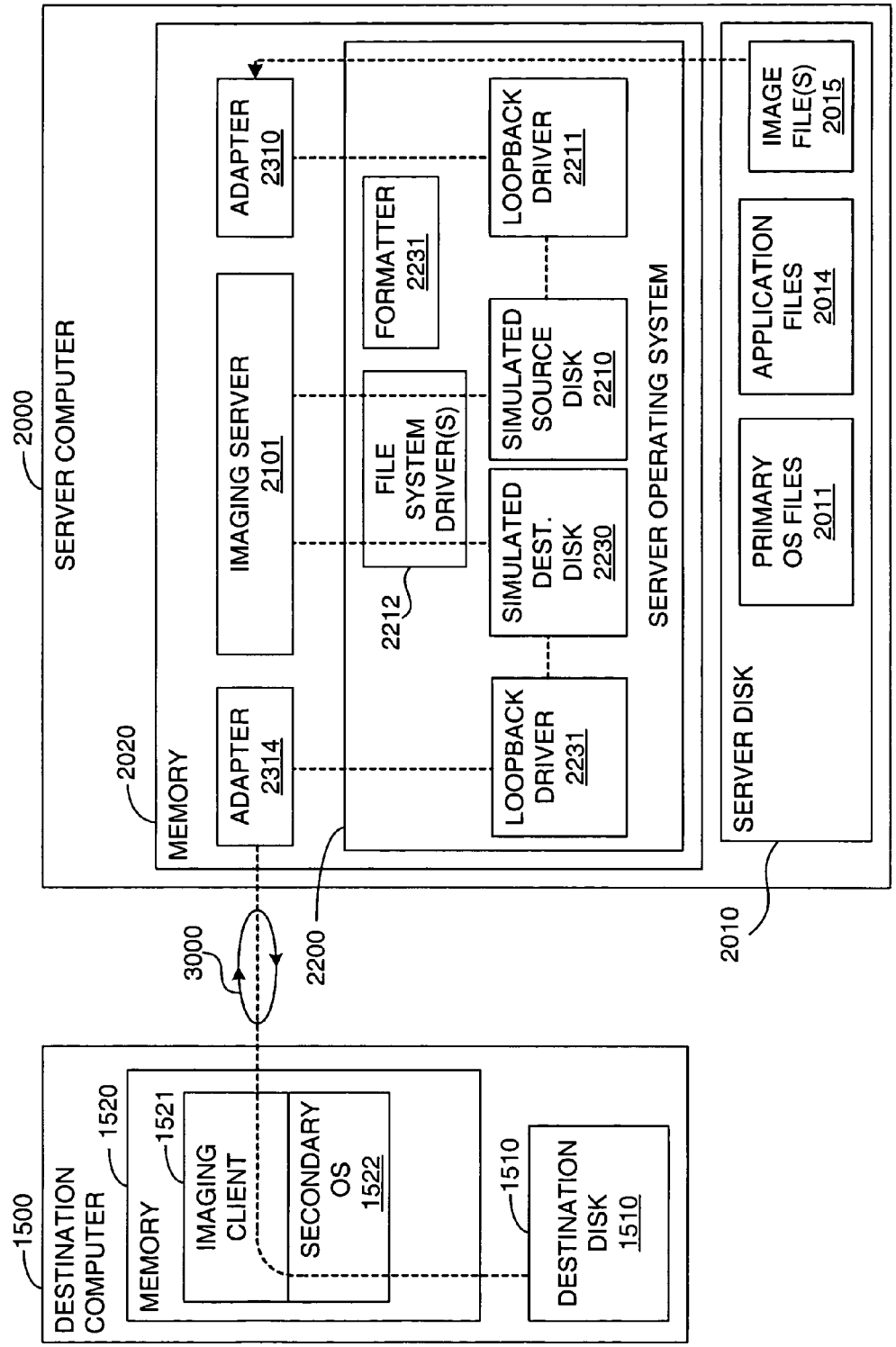
FIG. 5 shows the main components of a mechanism according to the invention for deploying disk images.

The invention's image deployment process is illustrated in FIG. 5 and is symmetrical to the novel image capture process described above. First, the user selects a stored disk image 2015 (more than one may of course be stored) using any conventional method. The imaging server 2101 then mounts the user-selected image in loop-back mode in order to present it as a simulated source disk 2210 to the server operating system 2200. The adapters 2310, 2314 and the file system drivers 2212 will perform the same functions as for image capture, but in the reverse direction.

The destination computer 1500 reboots and loads into its memory 1520 a secondary operating system 1522 with the imaging client 1521. The imaging server 2101 then mounts the destination computer's disk 1510 in loop-back mode, and presents it as a simulated destination disk 2230 to the server operating system 2200. Next, the imaging server leverages the server operating system's APIs and utilities to partition, then format, the destination disk 2230, destroying whatever partitions, file systems, data, etc., that was previously present on it. Finally, the imaging server copies files and directories from the source file system to the destination file system, dismounts the two simulated disks 2210, 2230, and reboots the destination computer 1500 to allow it to load the new operating system deployed from the image 2015.

Discussion

The invention's approach to disk imaging provides several advantages over existing methods. The first observation is that the imaging software does not need to include a file system decoder, since the one provided by the server operating system is used to perform the decoding. This significantly simplifies the imaging client component and reduces its memory footprint. Not only does this reduce the imaging software vendor's development costs, it also allows the imaging client to run on extremely lightweight secondary operating systems.

A second significant advantage is in the handling of the proprietary file systems. As explained earlier, in order to support a proprietary file system format, a disk imaging software vendor that employs existing methods must either reverse engineer the format, or pay a license fee to access the technical information required for developing the decoder.

The invention is not subject to this problem if the operating system selected for hosting the imaging server includes a file system driver that understands the proprietary format. File system formats that are directly supported by a server operating system are referred to as native formats. For instance, if an imaging server were designed to run on a Microsoft operating system, such as Windows 2000 or Windows XP, it would be able to decode any file system using one of Microsoft's file system formats, including NTFS, FAT32, and FAT, all of which are proprietary.

In the case that a source disk uses a non-native file system format, i.e., one that is not understood by the operating system hosting the imaging server, a disk imaging software vendor employing the invention's methods has several choices, depending on whether the file system format is proprietary. If the format is public, i.e., non-proprietary, the vendor can develop its own custom file system driver and register it with the operating system when the imaging server software is installed.

If the non-native file system format is proprietary, it is most likely owned by a third-party vendor different from the one who developed the server operating system. If this third-party vendor provided a commercial file system driver for that format and for the selected server operating system, the imaging software vendor could license the right to distribute a copy of that driver with the imaging software, and register the driver at installation time. The licensing cost for distributing a binary version of a program, such as a driver, is generally much lower then the licensing cost for accessing technical information, such as a file system format specification or the source code of a program.

If there exists no commercial file system driver for a non-native and proprietary file system format, then the imaging vendor can either choose not to support the format or to support the format by developing a custom driver based on licensed technical information or on reverse-engineered information.

Another important advantage derived from the invention's approach to disk imaging is that by accessing file systems through a driver, not only can the imaging server 2101 perform image capture and deploy operations, it can also make arbitrary changes to an image's file contents. Since a file system driver 2212 exposes a file system's files and directories to all software running on the server operating system, the imaging server can leverage a wealth of file manipulation tools included with the operating system 2200 to perform an arbitrarily complex analysis or manipulation of files within an image. This capability is enables functionality not available in existing disk imaging systems. The functionality falls into the areas of configuration analysis, image reconfiguration, and image customization, all of which are discussed in detail in the following sections.

Alternate Image Capture and Deployment Methods

The invention does not require the image capture to employ the loop-back based method described above. If the disk imaging software understands the file system format of a source computer's disk, it can include a file system decoder in the imaging client and a file system encoder in the imaging server, allowing it to stream file data (instead of sector data) directly over the network, and populate the destination image directly from the data. This is the traditional disk image capture method used in the prior art.

The invention, however, employs the loop-back mechanism for other image manipulation tasks, such as content analysis, reconfiguration, P2V, V2P, delta images, and customization, as subsequent paragraphs will explain. It is thus particularly convenient and therefore preferred for the invention to leverage this same mechanism for image capture and deployment operations as well; as mentioned earlier, this approach provides significant benefits, such as simplifying the disk imaging client by not requiring it to include a file system decoder (such as decoder 1310 in FIG. 3), and allowing the imaging software to handle certain proprietary file systems despite not knowing their internal format.

The features of the invention relating to image manipulation may therefore be implemented so as to be completely independent of the disk imaging (capture and deployment) aspects of the invention described above. Indeed, if all that is desired is to implement the image manipulation features of the invention, then it would be possible to use any image capture mechanism, including those found in the prior art.

Simplified Image Management Using Static Configuration Analysis

As explained in the discussion on prior art, a disk image is a snapshot of a computer's disk state. This state comprises files and programs, and may contain the operating system itself. The disk state of a computer contains an abundance of information not only about the software and data residing on the disk, but also the computer's hardware characteristics. This information is generally called the computer's system configuration and can contain the following components: software configuration, hardware configuration, and information pertaining to both hardware and software, called binding information.

Software Configuration

The exact software configuration of a computer can be determined by analyzing the files residing on an image of the computer's disk, since programs are stored as files and their settings are also stored in files. File inspection can reveal not only the number and type of programs installed, but also their versions. Detecting the versions of the files that make up a software program or module is essential for determining whether the software is up-to-date. Users often update their software program files regularly in order to acquire bug fixes, especially security fixes, and potentially new functionality. The operating system itself is a set of program and configuration files; therefore a file analysis of a disk image containing an operating system can determine the operating system type, version, and settings.

Hardware Configuration

Surprisingly, inspecting the files of a disk image captured from a source computer can reveal information about the computer's hardware configuration. This information can be determined even without access to the source computer's hardware. The reason is simple: when an operating system is installed on a computer, it generally creates a database of hardware devices that it detects, and stores that database in a set of files on the computer's primary disk (i.e., the one containing the operating system). For example, the Windows 2000 operating system stores information about detected devices in a registry file; this information includes each device's model number, vendor identifier, serial number, and even what bus slot or port the device is plugged into.

A computer's critical devices, such as the chipset and processor, can also be determined by inspecting the files the operating system chose to install. For instance, the Windows 2000 operating system requires a key program file, called kernel, to be installed on disk. This file is identified with a predefined name, e.g., "ntoskrnl.exe". There exist at least two variants of this file: one designed for uniprocessor computers, and one designed for multiprocessors. The two variants are stored as distinct files with different names on the operating system's installation medium (such as a CD or service pack). When Windows 2000 is installed on a computer, the installer copies the kernel variant appropriate for the computer's type to the disk, and renames the file to the predefined name. A configuration analysis tool could thus perform a byte-level comparison of the kernel installed in a disk image against the two known variants from the installation medium in order to determine whether the source computer is a multiprocessor or a uniprocessor.

Alternatively, the tool could use digital signatures, such as those computed using the well-known MD5 algorithm, to compare files, instead of doing byte-by-byte comparison. This approach would involve precomputing signatures for all known variants of the file and storing the signatures in a database file or embedding them in the tool program itself. At analysis time, the tool would need to compute only the installed file's signature, then compare against the known signatures.

It may not be obvious why extracting a hardware configuration from an image would be useful. After all, users generally care only about a computer's software and data files, since software solves business problems and data files contain information. A computer's hardware's only purpose is to support software and store data. Knowledge of the number and specific type of devices associated with a computer may thus seem unnecessary in the context of disk imaging, especially considering that a disk image should ideally be deployable onto any computer, regardless of the source computer's hardware configuration.

As explained above, however, a disk image unfortunately has dependencies on the source computer's hardware configuration, which is an undesirable consequence of how most operating systems are designed and configured. This may cause software, especially the operating system itself, to malfunction if the image is deployed onto a computer with a different hardware configuration.

The invention uses the hardware configuration from an image to alleviate the above problem in two ways. First, the invention can automatically check at deployment time whether a selected destination computer has a hardware configuration compatible with the configuration extracted from the image and disallow the operation in case of incompatibility. Second, when a user queries the imaging system for a set of destination computers eligible for deployment from a specified image, the invention can use the image's hardware configuration to constrain the eligible set to those computers compatible with the configuration.

The invention is also capable of modifying an image's contents at deployment time in order to make it compatible with a destination computer's hardware configuration. Knowledge of the image's existing hardware configuration helps the imaging system determine the minimal set of changes required to make an image compatible with a particular destination hardware configuration. The section Simplified Hardware Migration Using Image Customization below discusses this in more detail.

Binding Information

Finally, a computer's configuration can contain information about how a hardware device is programmed, or used, by software. For example, a network interface card (NIC), generally identified by a unique hardware address (e.g., an Ethernet MAC address), can be assigned software attributes including a set of network protocols, a set of protocol settings, such as IP and default gateway address, and possibly a software identifier, such as "eth0". This hardware-to-software mapping information is sometimes called a "binding." Binding configuration is essential in ensuring that a computer deployed from an image will function correctly on a network.

For instance, consider a source computer acting as a security firewall between two networks. The computer may have two NICs: one with software identifier "eth0", connected to the public network, and another with identifier "eth1" and connected to a private network. Suppose the computer's firewall program is configured to receive packets from "eth0", to filter them, and to forward a subset of those packets to "eth1". Also suppose that the physical NICs mapped to "eth0" and "eth1" are a 3COM 3c509B with hardware address 00-01-02-03-04-05, and an Intel Pro100 with hardware address 10-11-12-13-14-15, respectively.

A user may want to clone the firewall computer in order to secure another network pair. More precisely, the user might capture an image of the firewall computer, and then deploy it onto another computer connected to two networks NetA and NetB using two NICs named NICa and NICb, respectively. Assume that the user's intention is to filter content from NetA to NetB. The two destination NICs are likely to have different hardware addresses from their counterpart NICs in the original firewall computer, since they are physically distinct. If the image were deployed to the destination computer without modifications, the firewall software may not function correctly, since there is no guarantee that the operating system will map NICa to the "eth0" identifier and map NICb to "eth1". This problem usually stems from the fact that the operating system deployed on the destination computer will detect the new NIC for the first time and create a new binding for it. This binding's attributes may get initialized with undesired or unpredictable values.

A disk imaging system capable of accessing and manipulating an image's binding configuration can solve this problem; the disk imaging system according to the invention has this capability. First, it can determine the number of NIC bindings and each binding's settings. With knowledge of the destination computer's hardware configuration, detected either automatically, using known routines, or from user input, the imaging system could adapt the image's bindings to the destination computer's network hardware. In the current example, the imaging system could modify the 3COM 3c509B-to-"eth0" binding to become NICa-to-"eth0". The exact change needed depends on the operating system and how the binding is stored on disk; this could be achieved, for example, by replacing the 3Com NIC's hardware address with NICa's hardware address in the binding file. Once the image is modified and deployed, the operating system running on the destination computer will correctly map NICa to "eth0", allowing the firewall software to read packets from the correct network.

The above example describes a scenario in which a destination physical computer with the necessary hardware (at least two NICs, in this case) is known to exist, allowing a deployment operation from a specific image to succeed. The ability to extract and manipulate binding information is even more useful and powerful when the destination computer is a virtual machine. Given that a virtual machine's hardware is implemented in software, its hardware configuration is generally defined in a file that the virtual machine monitor reads before powering on the virtual machine. This file defines, among other things, the number of NICs to assign to the virtual machine. Adding or removing a virtual NIC is thus a simple matter of editing of few lines in a virtual machine configuration file.

As a disk imaging system that supports virtual machines and is capable of manipulating binding information, the invention can create a custom-made virtual machine on the fly that meets the binding requirements of a selected image. For instance, when asked to deploy a particular image to a new virtual machine, the invention can read the image's binding information, and then create a virtual machine with the required number of NICs. In addition, the invention can reconfigure the bindings in the deployed virtual disk to adapt them to the hardware characteristics of the virtual NICs, as explained earlier.

Static Vs. Dynamic Configuration Analysis and Manipulation

Configuration extraction by analyzing a computer's files is not new and has been implemented in various ways in the prior art. What distinguishes the invention from the prior art is its ability to extract the configuration from image files, whereas existing configuration analysis software operates on a live computer, i.e., one that is powered-on and running an active operating system. The existing approach generally requires running an analysis application, usually a user-level program, on top of a live computer's operating system; this approach is called dynamic configuration extraction.

One of the invention's novel contributions is static configuration extraction and manipulation, that is, extracting system configuration from a static image file, analyzing it, and optionally modifying the configuration in an automated way. While the dynamic extraction approach provides benefits under certain usage scenarios, such as the ability to determine a live computer's configuration without the need to power it off, the static extraction approach offers significant advantages in the context of a disk imaging framework.

While some existing disk imaging systems allow a user to inspect the file contents through a specialized utility (such as Symantec's Ghost Explorer) or an image loop-back mounting utility similar to Microsoft's imgmount, none of those systems automatically extracts and analyzes derives the image's internal system configuration for the purpose of automatic image organization, searching, or pre-deployment reconfiguration.

Recall that a disk imaging system serves two primary purposes: backup/restore, and computer cloning. Desirable characteristics for a disk imaging system typically include minimizing resource consumption, non-intrusiveness, providing a framework for easily organizing and managing images, reducing human intervention and error (i.e., automation), and flexibility. Previous paragraphs have already explained the importance of system configuration extraction and manipulation in a disk imaging system. The following discussion compares a hypothetical contemporary disk imaging system, referred to as the "reference system," which uses dynamic extraction, against the invention, which uses the static extraction approach.

Loop-Back Mounting

The preferred embodiment of the aspect of the invention that relates to disk image capture and deployment uses the known loop-back mounting mechanism. The preferred loop-back mechanism may be provided in different ways. For example, skilled system-level programmers will know how to design and implement the loop-back drivers used in the preferred embodiment of the invention. Alternatively, if a loop-back capability is provided by the server OS itself, then the invention may use it instead. For example, the Microsoft ADS provides the imgmount tool to loop-back-mount Microsoft Windows' own image files (called .sdi files). The invention could thus leverage the imgmount tool to add image manipulation capabilities to Microsoft ADS that ADS does not provide. For example, the imgmount tool allows a user to view files and folders of the file system contained in the image file, but ADS does not provide such novel features of this invention such as automatic image content analysis, P2V/V2P, or automatic management software insertion or upgrade capability (described below).

Image Capture

The discussion on prior art previously explained that static disk imaging is the safest image capture method because it shuts down all software residing on a disk and reboots the source computer before capturing an image from that disk. Both the reference system and the invention employ offline disk imaging, although the reference system uses dynamic extraction and the invention is able to use static extraction techniques.

Since it is a dynamic extraction solution, the reference system is incapable of extracting configuration information from the final image; it must therefore do it before the capture operation by running a special program on the source computer, before rebooting the computer. Reliance on this program, generally known as an "agent," leads to several issues. First, the agent has to be installed on the source computer beforehand. This leads to an increased management burden on users, since all of an organization's computers considered for image capture must have this agent installed. It is also intrusive: A computer administrator may be reluctant to install additional software on a business-critical computer for the sole purpose of allowing a disk imaging system to extract the computer's configuration information. In the world of computer management, restricting the number of programs installed on a computer generally leads to better system stability and reduced exposure to software bugs, viruses, and security vulnerabilities.

The second issue affecting the agent is the problem of open files. Recall that on a live computer with an active operating system, user-level programs may be forbidden from accessing certain files. Even if the agent were allowed to open a file, the contents of the file might not be up-to-date if another program is simultaneously accessing it. The agent thus faces the risk of extracting incomplete or inaccurate configuration information.

The invention's static configuration extraction method does not suffer from the above problems. First, it is not intrusive: since no agent is required, the source computer's disk is never modified. Moreover, the configuration is extracted by reading a stable copy of the source computer's files after the computer's operating system was shutdown, resulting in accurate and consistent configuration information.

Image Organization

A user of a disk imaging system may need to store and organize a potentially large number of images. It is natural to organize images by content or system configuration. For instance, all images containing the same operating system type could be stored in the same folder or on the same storage server. Images might further be classified by hardware configuration; for instance, images captured from uniprocessor computers might be kept separate from those captured from multiprocessor systems. A system that organizes images by system configuration can also provide advanced search capabilities. For instance, before deploying an image to a multiprocessor computer, a user might want to query the system for all images compatible with multiprocessor hardware.

Many contemporary disk imaging systems rely on an image's file name or user-defined attributes to describe its contents or configuration. As pointed out in the discussion on prior art, relying on user-defined names or attributes for image tagging is ambiguous and error-prone. As a result, a recent trend in disk imaging systems is to provide automated mechanisms for determining an image's configuration, and to classify images based on that information.

As noted above, existing disk imaging systems that also support system configuration analysis employ dynamic configuration extraction, which implies that they use an agent to compute the source computer's configuration before capturing an image. This solution is the one illustrated in FIG. 3. The agent then sends the information over to the imaging server 2100, which stores it in memory or in a file. Once the image is captured and stored on the imaging server computer, the imaging server must associate the previously collected configuration with the final image file 2015. If the configuration is stored as a file, the imaging server must associate the file with the image by creating a folder and by placing both files in the folder, or by storing the association in a separate database. Another possibility is to embed the information inside the image file. This could be achieved, for example, by enhancing the image file's internal format to accommodate an additional data section for storing configuration information.

The above approach is subject to several issues. First, keeping an image's configuration information in a file separate from the image file itself increases the probability of the two files becoming unsynchronized. If, for example, a user modifies the file contents of an image file, she may intentionally or accidentally modify the image's system configuration without the disk imaging system's knowledge; the associated configuration information file may thus become out-of-date.

The second issue stems from the different types and detail levels of system configuration information. Some information, such as the operating system version, can be extracted quickly by inspecting a small set of program or data files. Other information, such as the complete list of installed software components, including their versions and patch levels, or the complete hardware configuration, may require a more complex and time-consuming analysis. A disk imaging system that extracts system configuration information at image capture time thus faces a dilemma: extract all possible configuration data up front for a high run-time cost, or extract only minimal information, with the risk that specific configuration information needed later, after image creation, may not be available.

Those issues do not affect the invention, since it extracts information directly from image files. In other words, configuration information is always derived from an image, but it never needs to be stored separately and thus can never get out-of-date. Note that the imaging system is also free to cache the information locally in memory or temporary files for quicker access.

Another advantage the invention has over the prior art is the ability to extract only the configuration information needed for a particular task. The disk imaging system could use this on-demand extraction capability to quickly classify and catalog images based on high-level configuration information such as operating system type and version, and then extract more detailed information later in order to satisfy more complex operations such user-defined search queries and pre-deployment image reconfigurations.

Summary of Invention's Contributions to Image Management

The invention is the first disk imaging system to perform system configuration extraction directly from image files. This static extraction method has many advantages over the prior art. First, no additional software needs to be installed on a source computer prior to image capture—the system is non-intrusive. Since the source computer's disk is never modified before or during the capture process, information technology administrators and users are more likely to accept and embrace this type of imaging system.

Second, configuration information is always derived from the current contents of an image file, and therefore can never get out of date. By eliminating redundant information and the need for separate files, this capability ensures the data integrity of image files and their associated information.

The invention takes advantage of on-demand configuration to compute the minimal and optimal set of information needed to perform a selected task. A significant feature that this capability enables is the automatic analysis, classification, and cataloging of unprepared, unmodified images based on arbitrary system configuration parameters. The invention can thus take random images from various sources, and automatically organize them in a useful way for users. The classification is unambiguous, since it is based on an exact analysis of configuration information contained in image files, not user-defined names or tags. On-demand configuration extraction also provides users with flexible and powerful image search functionality, based on user-specified criteria.

Simplified Hardware Migration Using Image Reconfiguration

The discussion of the prior art above introduced two important issues in image deployment: hardware compatibility and customization of clones. While solutions to both exist, they are incomplete and subject to constraints. The invention simplifies or eliminates those difficulties, while providing new functionality and flexibility that is difficult to achieve with existing mechanisms.

Review of the Hardware Migration Problem

As explained above, when software—especially the operating system—is installed on a computer, it becomes customized and dependent upon the underlying hardware. The dependencies are reflected in the choice of program files installed and a number of configuration settings stored in data files.

In order for an operating system to boot correctly on a particular computer, its installed programs, drivers, and system configuration files must match or must be compatible with the computer's hardware configuration. Once again, the Windows 2000 operating system is a good illustration of those concepts. The components critical in the Windows 2000 boot process are the kernel, the HAL (hardware abstraction layer) module, a disk driver, and a set of configuration settings stored in a data file called the registry. The next discussion reviews the Windows 2000 boot process and the resulting hardware migration issues.

There are multiple variants of the kernel and the HAL, each one specific to a particular type of hardware component. There exist at least four variants of the Windows 2000 kernel: one designed for multiprocessor computers, one for uniprocessor computers, one for multiprocessor computers with Physical Address Extensions (PAE), and one for uniprocessors with PAE. Similarly, there exist at least two variants of the HAL: one for ACPI-capable chipsets and one for non-ACPI-capable chipsets. An installed Windows 2000 must have one file designated as the active kernel and another designated as the active HAL. By convention, those files are identified with predefined and hard-coded names. The Windows 2000 boot process relies on the active kernel and HAL to be named "ntoskrnl.exe" and "hal.dll", respectively. Other variants of the kernel and HAL may exist on the file system, but they must be assigned different names (a file system requires file names to be unique within a folder), and as such they are ignored during the boot process. In other words, Windows 2000 does not have the ability to select a particular variant of the kernel or HAL at boot time; it must load the files with the predefined names.

Once the active kernel and HAL are loaded into memory, the operating system loads a set of critical drivers into memory. The set is specified by configuration settings in the registry file. One of the critical drivers is the disk driver, because it allows the operating system to access the computer's disk in order to complete the boot process. As described in the discussion on prior art, the boot process generally uses the computer's BIOS to load the kernel, the HAL, the registry file, and the critical drivers from disk into memory. This solves the chicken-and-egg problem of reading disk data before the appropriate disk driver is activated. Note, however, that a BIOS generally has limited functionality and performance, and is thus used to load only a small set of files during the boot process before the operating system can take over.

Unlike the kernel and the HAL, Windows 2000 can load multiple, distinct disk drivers, since the registry can specify an arbitrary, but usually small (for reduced memory consumption), set of critical drivers to be loaded at boot time. Each disk driver has a different file name. If one of the drivers supports the disk on which the operating system resides, the operating system can successfully mount the disk's file system, allowing it to load the hundreds of remaining system and application files in order to complete the boot process.

In summary, in order for Windows 2000 to boot correctly on a computer, four conditions must be met: the active kernel must be compatible with the computer's processor configuration; the active HAL must be compatible with the computer's chipset; a disk driver compatible with the operating system's primary disk must exist on the file system; and the driver must be registered in the registry file.

A disk image captured from a source computer contains an active kernel, an active HAL, drivers, and a registry, and thus encodes the operating system's dependencies on the source hardware. After the image is deployed to a destination computer, the operating system will not boot successfully on the new computer unless the four requirements stated above are satisfied.

The System Preparation Method and its Shortcomings

A common solution to the hardware migration problem that the prior art provides is called "system preparation." As an illustration, a tool called SysPrep can prepare a Windows 2000 computer for image capture. To reduce the odds of hardware incompatibility issues during future deployments of the image, SysPrep can populate the source computer with additional disk drivers and the corresponding registry entries. A user specifies the list of additional drivers and registry keys to the tool using a file.

There are several issues with the system preparation solution. First, a user must have the foresight to prepare a computer before capturing its image in order to make the image easier to deploy onto diverse hardware platforms; this adds an administrative burden on the user or administrator. Managed images would fall into two broad categories: those that are prepared and those that aren't. Take, for instance, an image captured from a source computer purely for backup purposes. Such an image is intended to be restored back onto the same computer in order to recover from accidental disk data corruption. There is therefore no apparent need for preparing it for future deployment onto other computers. However, if the source computer is stolen or irreparably damaged, its administrator may not be able to find a replacement computer that has the exact same hardware configuration. This situation is especially common if the damaged computer were an old, obsolete model no longer in production. If no compatible computer can be found, the backup image may become useless, potentially resulting in data loss or requiring time-consuming work to recover the image's data.

Second, as the discussion on prior art explains, system preparation forces a user to predict and specify all possible destination hardware configurations at preparation time. Since new computer hardware is constantly produced and introduced into the market, it is impossible for an IT administrator to build prepared images that are guaranteed to be compatible with future generations of computers. Many disk images may thus become obsolete over time, forcing the administrator to periodically prepare a computer with an up-to-date set of hardware configurations and substituting the resulting image for obsolete ones.

Third, system preparation handles only one of the three dimensions of the device compatibility problem. In the case of the SysPrep tool for Windows 2000, a prepared image can be deployed to multiple computers that use different disk controllers; however, it cannot be deployed to a computer with a processor or chipset configuration different from the source computer's. The explanation is that Windows 2000 can select among multiple disk drivers at run-time and choose the one compatible with the underlying computer's disk controller, as long as the driver is registered in the registry; however, as described earlier, Windows 2000 must boot from one pre-selected active kernel and one pre-selected active HAL; in other words, a Windows 2000 image can support only one exact combination of a particular processor configuration and a particular chipset. Since there at least four variants of the Windows 2000 kernel and two variants of the HAL, in order to support the widest variety of destination computers an administrator would have to create eight different versions of the same image, each captured from a distinct computer with the required hardware configuration permutation.

The fourth weakness affecting system preparation is the poor handling of hardware differences in devices that are not critical to the boot process, but important to the destination computer's functionality. NIC bindings are the most common example: a user may have to manually reconfigure a deployed computers NIC bindings to ensure that it operates correctly on the network.

Hardware Migration According to the Invention

As previously described, the invention can extract configuration information from unmodified disk images for identification, classification, archival, and advanced search purposes. It is also capable of modifying an image's configuration—a process called "reconfiguration"—in order to resolve deploy-time issues. One of those issues is precisely the hardware compatibility problem. The following discussion describes in detail the components and mechanisms the invention uses to address the general hardware migration problem. Next, the special cases of physical-to-virtual (P2V) and virtual-to-physical (V2P) migration will be described.

The invention's overall solution to the problem can be stated as follows: just before an image is deployed, the disk imaging system analyzes the image's system configuration, then looks up or determines the destination computer's hardware configuration, and then determines the necessary configuration changes to the image to make it compatible with the destination hardware. The configuration changes may involve modifying specific entries in data files, installing or replacing program files, or a combination of both.

The invention does not require an image to be prepared. It can thus solve the hardware migration problem for a wide range of existing images, even those originally created without the hardware migration issue in mind, such as backup images.

Destination Configuration Lookup

A destination computer's hardware configuration can be determined by using one of several mechanisms provided by the existing art. The first approach is to require all eligible destination computers to be pre-registered in a database managed by the disk imaging system. Several existing disk imaging systems and computer management software frameworks implement this approach. When a computer is first registered, its hardware configuration is stored in the database along with the computer's identification information. It is common to identify a computer by the universally unique hardware address of one of its NICs; for example, a computer connected to the network through an Ethernet NIC can be identified by the NIC's Ethernet MAC (media access control) address.

A computer can be registered automatically when it is added to the network. For example, the PXE (pre-boot execution environment) standard specifies a mechanism for automatically initializing a new, bare-metal computer when it first appears on the network. The term "bare-metal" signifies that the computer's hard disk contains uninitialized data, and therefore is not bootable. Assuming that the computer is configured to boot from the PXE mechanism (typically a user-settable option in the computer's BIOS setup software), it will search for a PXE server on the network after powering on. If a PXE server is present, the server can download an arbitrary program over the network into the computer's memory. The computer executes the program once it is downloaded.

Figure 6:
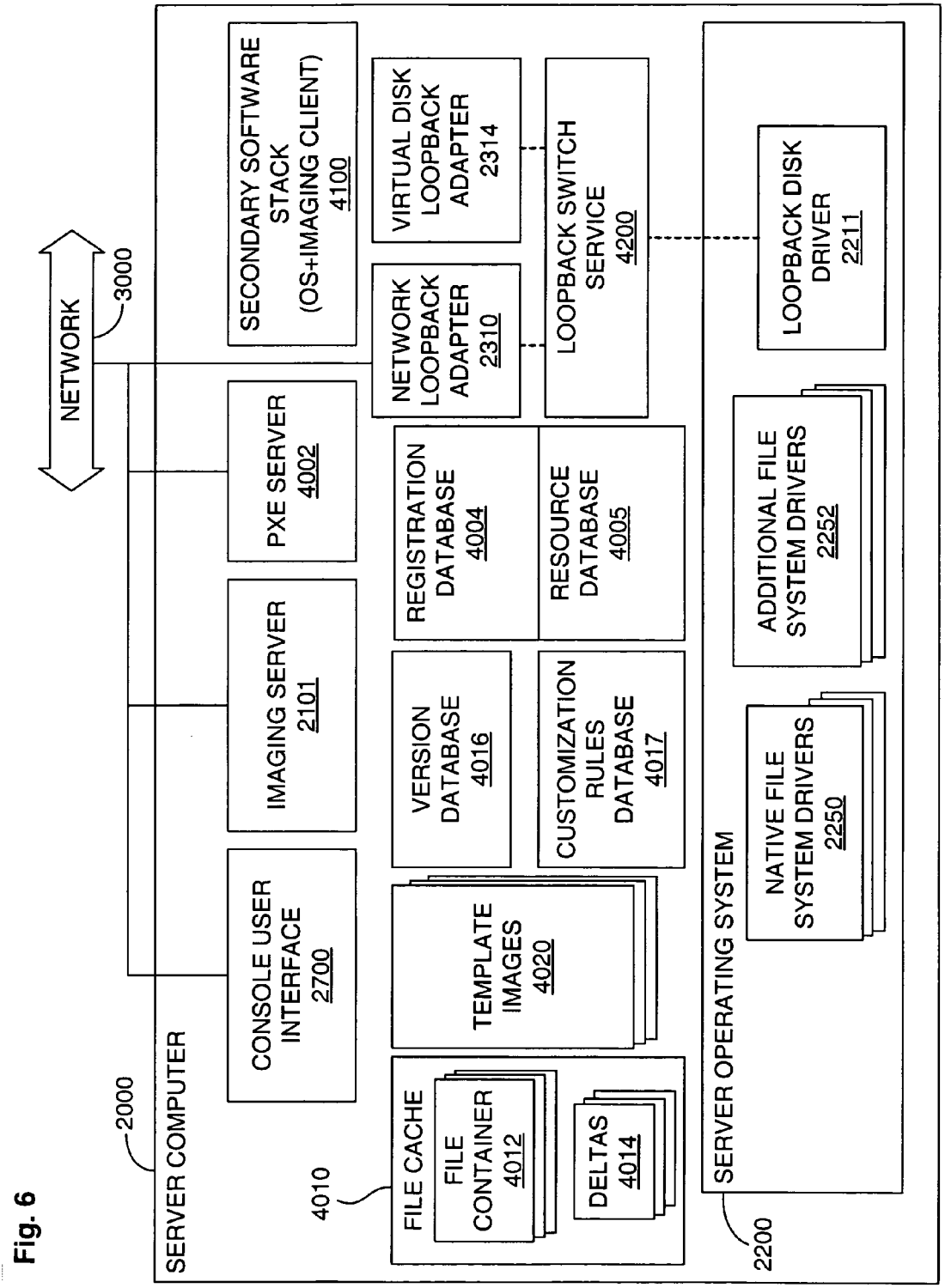
FIG. 6 is a block diagram of the various software modules and data structures used in a server computer to implement the various capture, deployment, reconfiguration, customization, and other novel features of the invention.

See FIG. 6. A disk imaging system can use the PXE mechanism to automatically register a computer by including a PXE server 4002. When a computer appears on the network, the disk imaging system's PXE server 4002 downloads a program specifically designed to analyze the computer's configuration and communicate it back to the imaging server. If the computer is already registered, i.e., its identifier is present in the imaging server's registration database 4004, the computer is left in a stand-by state, ready for future deployment operations; otherwise, the imaging server creates a new entry in the database 4004, the downloaded program then scans the computer's hardware configuration and sends the information to the server, and the server stores the information in the new database entry.

A computer can also be registered manually. A disk imaging system could, for example, provide users with a bootable CD-ROM containing a hardware configuration detection program. In order to register a new bare-metal computer, an administrator would boot the computer from the provided CD. The program then determines the computer's hardware configuration and generates a unique identifier for the computer, possibly based—once again—on one of the NICs' hardware address. The program could then send this information to the imaging server over the network, or save it on a removable medium, such as a floppy disk, allowing the administrator to walk over to the computer running the imaging server and manually register the computer using the saved information.

Computer and configuration pre-registration allows the invention to look up a destination computer's exact hardware configuration prior to an image deploy operation, based on the computer's identity. The invention also supports an alternative to the pre-registration approach: The imaging server could automatically determine a destination computer's hardware configuration by, for instance, downloading and running the configuration collection program using PXE (or other software with analogous functionality) just before a deploy operation. The advantage of this approach is that no registration database is needed. One shortcoming is the potential for lower deployment performance, due to the added overhead of the configuration analysis on every deploy operation. Another possible problem is the imaging server may not be prepared—or set up—to reconfigure the image to comply with the detected hardware configuration. As is described below, the reconfiguration process for a specific target configuration may require a specific set of files. If the imaging server encounters a hardware configuration that it has never detected before, it is possible for some required files to be missing. The pre-registration method, in contrast, allows the imaging server to determine at registration time whether a particular hardware configuration can be supported. At deployment time, the server can quickly query the database 4004 to check if reconfiguration for the selected destination computer is possible, and if not, locate and obtain the missing files.

It might be useful for the database to hold separate records for computers and hardware configurations. This could reduce the database's size requirements if multiple registered computers had the same hardware configuration; in this situation, each of the computer records would contain a link, or pointer, to a single hardware configuration record. Keeping separate records for configurations is also useful when the destination computer is a dynamically created virtual machine. Unlike a physical computer, a virtual machine can be created on the fly, and therefore may not be registered. The hardware configuration of a virtual machine is generally constant and known ahead of time and can thus be pre-registered. This allows the imaging server to determine the correct configuration changes to an image, if needed, before deploying it to a virtual machine. This is discussed in more detail in the section below entitled Physical to Virtual Conversion.

While the idea of keeping track of computer configurations using a database is not new in and of itself, the invention's novel contribution is to employ such a database for validating, authorizing and then executing disk image deployment operations.

Reconfiguration

The reconfiguration process modifies an image's system configuration to make it compatible with a selected destination hardware configuration. The specific reconfiguration operations are dependent on the type of operating system within the image, the operating system's patch level, and the destination hardware configuration.

The operating system type and patch level are components of an image's system configuration; they can thus be determined by using the static configuration extraction mechanism described earlier. Both can be determined by inspecting specific files or entries within files. For instance, most operating systems developed by Microsoft are identified by a registry entry called HKEY_LOCAL_MACHINE\Software\Microsoft\Windows NT\CurrentVersion; distinct values of this entry indicate whether the operating system is Windows NT, Windows 2000, or Windows XP.

A patch level indicates how up-to-date an operating system is with respect to bug fixes and/or functionality upgrades. An operating system vendor such as Microsoft periodically releases a set of patches, sometimes called "service packs," in order to provide bug fixes and possibly functionality upgrades for a specific operating system type. A patch contains updated versions of system files. Each system file has a version number; an updated file usually has a version higher than the one it replaces. A patch does not normally update all of an operating system's files but rather only the ones that need repair or upgrade. The term "patch level" generally describes the current file state of an operating system as a function of the most recently applied set of patches.

For a system file with multiple variants, such as the Windows 2000 HAL or kernel, a patch updates the file only if it contains an updated version for the currently installed variant of that file. To illustrate this concept, Table 1 shows hypothetical system file versions as a function of patch levels; patch level 0 represents the base operating system before any patches are installed; NTDLL.DLL is a system library used by applications and is not hardware-dependent. If the operating system is installed on a non-ACPI uniprocessor computer, upgrading to patch level 1 involves updating the kernel from version 500 to 501 and the system library NTDLL.DLL from version 700 to 701; however, the HAL is not updated, because there is no new version of the non-ACPI variant in patch level 1. If the computer were equipped with an ACPI chipset, the HAL would have been updated, since the original active HAL would have been the ACPI variant with version 400 and it would have been updated to version 401.

TABLE 1

|  | HAL.DLL (non-ACPI) | HAL.DLL (ACPI) | KERNEL.EXE (Uniprocessor) | KERNEL.EXE (Multiprocessor) | NTDLL.DLL |
|---|---|---|---|---|---|
| Patch level 0 | 300 | 400 | 500 | 600 | 700 |
| Patch level 1 | 300 | 401 | 501 | 601 | 701 |
| Patch level 2 | 300 | 402 | 501 | 602 | 701 |

In order to reconfigure an image to support a different hardware configuration, the invention first determines the image's current patch level by analyzing its system configuration. Some operating systems such as Windows 2000 record the latest patch level in a registry entry; the patch level can also be determined by inspecting the versions of installed system files.

The reconfiguration process replaces each hardware-dependent file with a substitute, which is the variant that is compatible with the destination hardware. This raises the issue: What is the correct version of the variant to use as the substitute? The correct version is the one that is the most up-to-date for the current patch level. In the running example, suppose that the image was captured from an operating system at patch level 1 installed on a multiprocessor computer with ACPI-capable chipset. The installed HAL would be the ACPI variant with version 401; the installed kernel would be the multiprocessor variant with version 60; and NTDLL.DLL, which is hardware-independent, would be at version 701. In order to reconfigure the files for a non-ACPI, uniprocessor destination computer, the invention first replaces the kernel with the uniprocessor variant with version 501. It should not use version 500, because that version corresponds to the older patch level 0 and would possibly lead to an unstable operating system because system files from the same patch level may have dependencies between each other. For instance, the installed NTDLL.DLL at version 701, which does not need to be replaced because it is hardware-independent, may depend on a feature or behavior available in versions 501 and 601 of the kernel, but not versions 500 and 600. The invention next replaces the ACPI HAL, version 401, with the non-ACPI HAL variant with version 300, since patch level 1 does not supply a new version of the non-ACPI HAL.

In addition to the HAL and the kernel, the invention also installs a disk driver compatible with the destination's disk controller and creates the corresponding entry in the registry. There may be multiple versions of the driver and so the invention substitutes the correct version based on the image's current patch level.

The invention's reconfiguration capability is not limited to devices that are critical to the boot process. It can also reconfigure an image to accept and set up a non-critical device, such as a NIC, that did not exist in the original source computer but that is present in the destination computer. While NIC set-up, especially binding set-up (refer to the discussion above on hardware configurations), is not critical to the boot process, it is essential to ensuring the destination computer's correct operation on a network. Reconfiguration of non-critical devices on Windows 2000 generally involves installing the associated driver, creating one or more registry entries and, in the case of NICs, creating or modifying binding settings in order to ensure the NIC is wired to the correct network and set up with the correct parameters (such as IP address).

File Cache

The invention's reconfiguration mechanism will usually require substitute files to be supplied from an external source, since the file variants or versions required for a particular reconfiguration on an image may not be present in the image. This is because when an operating system is installed on a computer from a distribution medium, such as a CD, only the variants required for the computer's hardware configuration are copied from the medium to the computer's disk. While base versions of all system file variants come from the original operating system distribution medium, updated versions typically come from patches and service packs that can be freely downloaded from the Internet.

In order to ensure that the appropriate files are present when needed for a particular reconfiguration, the invention preferably includes and manages a repository, called a "file cache," 4010 of operating system installation media, service packs and patches. This repository may be initially empty when the imaging server is first installed and configured on a server computer. When a destination computer or destination hardware configuration is first registered in the database 4004, the invention determines whether the cache 4010 contains the substitute files necessary for a reconfiguration operation targeted for that hardware configuration. If a required file is missing, the imaging server can request the user to supply the appropriate file container 4012, i.e., a CD, a service pack, or a patch, depending on the versions needed. The file container 4012 is then inserted into the cache 4010.

Alternatively, containers 4012 can be located and inserted into the cache at deployment time. An advantage of this approach is that the image's patch level is known at deployment time, allowing the reconfiguration mechanism to limit the set of required containers to a service pack or a set of patches specific to the image's patch level. In contrast, filling the cache at configuration registration time would involve locating and obtaining the union of all containers required for all possible patch levels and for all supported operating systems.

If a required substitute file is contained in a CD, the user has the option of converting the CD to an CD image file, typically using the ISO9660 standard. Existing CD software tools, such as Virtual CD, can "mount" a CD image to make it appear as a real CD to the operating system hosting the imaging server. Storing CDs as ISO9660 images in the cache 4010 allows the disk imaging server to automate the extraction of files from a CD at reconfiguration time; in contrast, not using images would a require a user to manually insert a CD into the server computer's physical drive whenever a reconfiguration operation needs it.

The invention can automatically locate and download missing patches and service packs, since they are available on the Internet; the mechanisms needed for automated downloading of patches and service packs are well known and are used by many common programs, such as anti-virus programs. Patches and service packs usually employ a well-known file archival format, such as the Microsoft Cabinet (CAB) standard. The imaging server can thus use publicly available software tools or libraries to automatically extract files from those containers.

It is common for the Internet location of a particular service pack or patch to change over time, since operating system vendors periodically reorganize their Internet pages. The invention provides two mechanisms for addressing this issue; first, if an operating system vendor publishes an internet-based patch locator service that exposes a well-known computer-to-computer messaging interface, such as SOAP (simple object access protocol), the imaging server could automatically obtain the current location for a desired patch using this service. If no such service exists, an imaging software vendor can publish and maintain its own locator service for patches provided by the operating system vendor. In this scenario, the imaging software vendor periodically monitors operating system vendors' patch locations and whenever a location changes, the imaging software vendor updates its own database of patch-to-location mappings. This database is exposed to all imaging servers from the same vendor using a computer-to-computer Internet interface. An imaging server is thus guaranteed to have access to the most current patch locations by always connecting to the imaging vendor's locator service.

Once a container is inserted into the file cache 4010, it remains in the cache for an arbitrary amount of time. On a subsequent computer or configuration registration operation, no further insertion is necessary if all of the required substitute files are present in containers 4012 already in the file cache. The imaging server 2101 implements the policy defining the conditions under which containers are deleted from the cache; control parameters of this policy, such as the maximum cache size, can be user-configurable.

Version Database

In order to determine the correct versions of substitute files to use in a reconfiguration operation, the invention needs to access a matrix similar to Table 1 from the prior example. Specifically, the reconfiguration process needs to know all versions of all variants of hardware-dependent system files for every existing patch level and for each supported operating system.

Fortunately, this information is generally available for free on the Internet, for most operating systems. For instance, the file version history for Windows 2000 patches is documented in numerous public pages on Microsoft's technical support web site. There even exists a global file in XML format—the Microsoft Security file mssecure.xml( )—that contains information for every Windows patch ever released. This information contains, among other things, the files updated by a patch and their respective versions.

The invention's imaging server component 2101, using mechanisms familiar to skilled programmers, can gather relevant version information from various Internet sources and then compile that information into a local database tailored for the reconfiguration process. Periodically, the Internet sources are consulted and the local database is updated in case new patches have been released. Alternatively, the imaging system's vendor can compile and maintain this database and make it available to all imaging systems from the same vendor through a public computer-to-computer service. A disk imaging system from that vendor would thus only need to periodically check for a new version of this database using the service and then download it into a locally cached copy if needed; this approach would reduce the disk imaging's complexity by not requiring it to perform the data gathering and compilation work.

Image Modification Using Copy-on-Write

Reconfiguring an image implies modifying its file contents. With any disk imaging system, images are archived in one or multiple user-specified locations, such as hard disks, networked disks, or CD-ROMs. When an image needs to be reconfigured prior to being deployed, it may not be acceptable or possible to modify the archived copy. For instance, an administrator may write-protect all archived images to protect them from accidental damage. Modification is also impossible if the image is stored on a read-only medium, such as a CD-ROM or DVD-ROM.

Even if modification of an archived image were possible and allowed, it may not be desirable. Suppose, for instance, that a user wishes to deploy a particular image to three destination computers, each with a different hardware configuration and thus requiring three distinct reconfiguration operations. If the image were allowed to be modified, the three reconfiguration operations would need to occur sequentially, since simultaneous modifications of the same set of files could lead to disastrous results.

The invention provides an elegant solution to the image modification problem. Given that its images are in fact virtual disks, the invention can safely reconfigure an image without modifying the virtual disk file by using the copy-on-write method. When copy-on-write is enabled for a virtual disk, modifications to the file are stored in a separate file, sometimes called redo log. A redo log specifies which sector locations in the original disk were written and contains the modified contents for those locations.

A redo log, combined with the original virtual disk it is derived from, represents a second, logical disk whose contents are defined as the original disk's contents with the exception of the modified sectors specified in the redo log. When the invention's imaging server component reconfigures an image, it puts the image in copy-on-write mode and then makes the necessary changes, resulting in the creation of a temporary redo log. The final contents of the resultant logical disk are then deployed to the destination computer. When deployment completes, the temporary redo log is deleted.

This approach also allows simultaneous reconfiguration operations on the same image, since a different redo log is created for each reconfiguration session, resulting in multiple logical disks that don't interfere with each other.

Direct Modification of Destination Disk

As an alternative to the coy-on-write technique described above for modifying images, the destination disk could also be modified directly: Instead of modifying a local copy of the image (through the redo-log mechanism) and then deploying the modified copy it to the destination physical disk, the alternative is to deploy the unmodified image to the destination disk. The destination disk could be either a physical disk or a virtual disk file, in cases where the destination computer is a virtual machine running on a virtual machine host. The destination disk can then be loop-back-mounted, using the procedures described above. This will make the destination disk appear as a simulated local disk on the server host, allowing the imaging server to modify the disk's files in order to reconfigure it.

Two different possibilities must be handled: 1) the destination disk is a physical disk directly attached to a destination computer; and 2) the destination disk is a virtual disk file residing on a file system of a destination virtual machine host computer. Case 2) is discussed below under the heading "Deploying a template image to a virtual machine."

In case 1), if the image is deployed by loop-back-mounting the destination disk (using an imaging client on the destination computer), which is the preferred embodiment, then the modifications for reconfiguration can be made directly on the destination files after they are copied from the source, but before closing the network connection. In this case, reconfiguration is a simple additional step in the overall deployment operation. If the image is deployed using a traditional disk imaging method that does not use loop-back-mounting, then a separate loop-back mount step is needed after the image is deployed.

Image States

In the invention's disk imaging framework, an image can be created using one of two methods. The first and most straightforward method is to use a virtual machine to create an image. This procedure comprises the following steps: 1) use virtual machine software to create a virtual machine with an empty virtual disk; 2) power on the virtual machine and then install an operating system and a desired set of software applications inside the virtual machine; 3) shutdown all software and then power off the virtual machine. When an operating system is installed in a virtual machine, an installer program first creates a file system on the virtual disk and then populates it with files. Once installation is complete and the virtual machine is powered off, the resulting virtual disk can be detached from the virtual machine and used as an image for archival and future deployment. Such an image is said to be a template image, one or more of which may be stored as files 4020 in the server computer.

A virtual disk that is attached to a virtual machine should not be treated as a template image, because if the virtual machine were powered on, software running inside of the virtual machine could modify the virtual disk, thereby making the image's contents unstable. For this reason, the invention calls an attached virtual disk an active image.

The second method for creating an image is to perform a capture operation from a physical machine's disk. It is common for the physical disk to have been previously populated with an operating system and a desired set of software (or else there would be no point in trying to capture an image from it). The virtual disk resulting from the capture operation represents a copy of the source computer's physical disk. Since the new virtual disk is not initially attached to a virtual machine, it is by definition a template image, ready for archival or for deployment to another physical machine, or to a virtual machine.

Deploying a Template Image to a Virtual Machine

A template image can be deployed to a virtual machine using this general procedure: 1) use conventional virtual machine software to create a virtual machine configuration file describing a new virtual machine with no virtual disk; 2) if reconfiguration is required, modify the template image using copy-on-write, producing a new logical image representing the modified image; 3) make a copy of the logical image, producing a new, full-size clone of the modified image; 4) attach the clone as a primary disk to the virtual machine; and 5) destroy the logical disk by deleting the redo log produced by the copy-on-write process. At the end of this procedure, the cloned image is attached to a virtual machine and therefore it is an active image.

The reconfiguration in step 2 is required if the template image was originally captured from a physical disk. It is not required if it came from a source virtual machine and both the source and destination virtual machines have the same hardware configuration.

The procedure is slightly different if the virtual machine is to be hosted on a physical computer different from the server computer hosting the imaging server. In this scenario, instead of making a local copy of the logical disk, the imaging server transfers the contents of the logical image over a network to the destination virtual machine host and then destroys the logical image.

Instead of using the copy-on-write technique, it would also be possible to make a full copy of the unmodified virtual disk. If the destination host is the same as the server host, then the copy will reside on the server host and be directly accessible by the imaging server. The imaging server then loop-back mounts the destination virtual disk, making it appear as a simulated destination disk, modifies its contents directly for reconfiguration purposes, then unmounts it.

If the destination host is another computer, then the destination file may be copied over the network to the destination host. Once copied, the imaging server loop-back mounts the destination virtual disk file using a network connection and the same network protocol used to communicate with the imaging client responsible for image capture/ deploy to or from a physical disk. The difference in this case is that a different imaging client will be used on the destination virtual machine host—this modified imaging client will communicate using the same network protocol as the standard imaging client 1021, but instead of accessing a physical disk, it translates the sector requests sent by the imaging server into file accesses within the destination virtual disk file. Once the destination disk appears as a simulated local disk, the imaging server can modify its contents for reconfiguration purposes, and then unmount the disk and close the network connection when it's finished. The general system implementation of such an alternative mechanism will employ substantially the same components and configuration as are described above in other contexts.

Physical to Virtual (P2V) Conversion

In a computing environment that includes both physical and virtual machines, a common need is to convert physical computers to virtual machines. This is capability is required, for example, to consolidate multiple existing physical computers into an equivalent set of virtual machines running on a single physical box. A physical-to-virtual (P2V) conversion of a physical computer is generally defined as migrating the physical computer's disk state, which includes its operating system, software applications and data, into a virtual disk, with minimal user intervention. The resulting virtual disk can be attached to a virtual machine, which can then boot the migrated operating system and run the migrated software, resulting in a system functionally equivalent to the physical computer. The migration comprises two steps: 1) the disk imaging step copies disk data from the physical disk to the virtual disk; and 2) the reconfiguration step reconfigures the migrated operating system to make it compatible with the virtual machine's hardware configuration.

Performing a P2V conversion using solutions available in the prior art is cumbersome, unreliable, time-consuming and error-prone. The first issue is that existing disk imaging systems do not directly support virtual disks as image files, partly because disk imaging and virtual machine software products have evolved independently and partly because many disk imaging systems may use a file-based image file format, as opposed to the sector-based format required by virtual machines. Consequently, in order to create and populate a virtual disk with contents from a physical disk, a user must manually create a virtual disk using virtual machine software and then attach it to a virtual machine and then run a disk imaging client software in the virtual machine. From the disk imaging software's perspective, the disk device visible from within the virtual computer appears similar to any real physical disk and can thus be initialized and populated using standard sector-level input/output operations; the virtual machine monitor then translates the sector operations into file operations as specified by the virtual disk's internal file format.

When using standard disk imaging software, the imaging step may therefore require the following actions; 1) run the disk imaging client on the physical computer, possibly after rebooting it (if the disk imaging system uses the offline disk imaging method); 2) execute a capture operation to create an image file on an intermediate computer hosting the imaging server; and 3) create a new virtual machine with an empty virtual disk, then run the imaging client in the virtual machine to deploy the image from the intermediate computer onto the virtual disk; when the deployment operation completes, power off the virtual machine and then archive or use the populated virtual disk. Some disk imaging products, such as Symantec Ghost, have the option of directly imaging from a source disk to a destination disk without creating an intermediate image file. If this option is available, action (2) can be eliminated and the disk data can be copied directly between two imaging clients, one running on the physical computer and one in the virtual machine. The above procedure requires many manual steps and is consequently time-consuming and difficult to automate.

The second issue is the difficulty of the reconfiguration process. In order for a migrated operating system to boot correctly in a virtual machine, the kernel, HAL, disk driver and registry may all need to be reconfigured, since a virtual machine's hardware configuration may be significantly different from a physical computer's. No existing software can safely perform all of the necessary reconfigurations. As explained on numerous occasions above, performing a system preparation on the physical computer can solve part of the problem, but not the general problem, since system preparation can only solve issues related to the disk driver. The other problem with system preparation is the fact that it requires modifying the physical computer by installing additional software on it, something that an IT administrator may find unacceptably intrusive and risky.

In order to complete parts of the reconfiguration process not handled by system preparation, a user may try to manually substitute system files such as the HAL and the kernel. Given that a migrated virtual disk may not be bootable in a virtual machine (that is why it needs reconfiguration in the first place), the only solution a user has for modifying the virtual disk's file contents is to attach it as a second virtual disk to an existing, already functional virtual machine, hereafter referred to as "helper" virtual machine. The helper virtual machine's first virtual disk contains a functional operating system capable of recognizing the file system on the second virtual disk. Once the second disk is attached and the helper virtual machine is powered on, the user can access and modify files residing on the second disk from within the helper virtual machine. Once the desired changes are made, the user shuts down the helper virtual machine and then detaches the reconfigured disk.

Not only is manual reconfiguration time-consuming, due to the helper virtual machine requirement and the need to configure it with an extra disk, but it is also extremely error-prone, leading to unpredictable results. For instance, a user may not know which file variants to substitute. Furthermore, even if the correct file variants are used, the user may mistakenly substitute the wrong file versions with respect to the migrated disk's current patch level, possibly leading to unstable operating system behavior in the destination virtual machine. Another disadvantage of using a helper virtual machine is its high cost in terms of processing power and memory consumption. Helper virtual machines thus place a heavy load on the computer hosting the imaging server, possibly interfering with other software running at the same time. This also makes it difficult to perform multiple simultaneous P2V conversions on a given imaging server computer.

In summary, the prior art does not provide a reliable or efficient mechanism for performing P2V conversions. The invention, on the other hand, naturally supports P2V conversion as a special case of the general hardware migration problem. First of all, the invention's choice of virtual disks as a universal image file format disk naturally takes care of the imaging step: Once a physical computer is rebooted and starts running the imaging client, the client can copy the computer's disk data directly to a virtual disk on the imaging server computer; there is no need to run a second client inside of a virtual machine in order to populate the virtual disk. Second, the invention's imaging server can mount a virtual disk in loop-back mode, thereby giving it direct access to the virtual disk's files through the server operating system, without the need for a helper virtual machine. Finally, if the virtual computer's hardware configuration is registered, the invention has the exact knowledge required to select the correct variants and versions of substitute files to use during the reconfiguration process.

The hardware configuration of virtual machines, unlike that of physical computers, typically does not change very often over time. This is in fact one of the key advantages of using virtual machines: By presenting a stable hardware platform to the software contained within it, a virtual machine is highly portable and mobile across multiple physical host computers with diverse hardware configurations. A virtual machine thus isolates its software from the variations in the underlying physical hardware.

On rare occasions, a vendor of virtual machine software may decide to change the virtual hardware configuration exposed by a new generation of products. The most common reason for changing the virtual hardware configuration is to upgrade it with more modern hardware features in order to enable new functionality for software running inside of virtual machines. The family of virtual machine software products from VMware, Inc., illustrates this: VMware Workstation, versions 3.2 and earlier, VMware GSX Server, versions 2.5 and earlier, and VMware ESX Server, versions 1.5.2 and earlier, despite being distinct products, all expose an identical virtual hardware configuration, one that is uniprocessor, uses a non-ACPI chipset and is equipped with a BusLogic SCSI disk controller. VMware Workstation 4.0 and VMware ESX Server 2.0 are products from a new generation that expose a new virtual hardware configuration that is equipped with multiprocessor capability, an ACPI-enabled chipset and a new LSI Logic SCSI disk controller. The multiprocessor upgrade allows software to take advantage of multiple physical processors for better performance and scalability and the ACPI upgrade provides advanced power management capabilities to the operating system running inside a virtual machine, such as the ability to automatically power off the virtual computer.

The invention can take advantage of the small number of virtual hardware configurations by including pre-registered configurations for known virtual machine products, saving users the need to register those configurations. For example, in order to support VMware virtual machines, the invention would need to include the hardware configurations corresponding to the two virtual machine generations mentioned above. When a user wishes to convert a physical computer to a VMware virtual machine, she would select either the Workstation 3.2/GSX Server 2.5/ESX Server 1.5.2 configuration, or the Workstation 4.0/ESX Server 2.0 configuration. In the future, when a new virtual machine generation is introduced, the associated hardware configuration can easily be registered in the database of disk imaging system according to the invention.

The idea of pre-registered virtual hardware configurations enables the development of a special-purpose P2V software tool that is a specialization of the general invention. This tool would be configured to perform P2V conversions exclusively, as opposed to being a general-purpose disk imaging system. There is no need for a deployment step, since the image capture process creates a virtual disk that is already in a format usable by a virtual machine. The tool would reconfigure the image immediately after it is created, allowing it to be used immediately in a virtual machine. Configurations for an arbitrary, predefined set of virtual machine types, or generations, would be preregistered within the tool, with optional support for registering new configurations. With this tool the disk imaging vendor would be able to sell a low-cost, simple-to-use product that targets the P2V segment of the market. Given the explanation of the other features of this invention, skilled programmers will be able to design such a tool.

To recapitulate, the invention's approach to solving the P2V problem presents significant advantages over the prior art. Since virtual disks are treated as image files, converting a physical disk to a virtual disk is a one-step process that does not require running disk imaging software inside of the virtual machine and does not involve an intermediate image file; this leads to a streamlined and easy-to-use imaging step for users. Furthermore, the invention's configuration registration database 4004, including its version database, and its ability to directly modify a virtual disk's files enable it to perform the reconfiguration step in a reliable and automated way, without user intervention and without the need for a helper virtual machine. The invention's reconfiguration mechanism handles all of the file changes required for solving the hardware migration problem; it handles not only disk drivers and registry entries, but also critical system files such as the HAL and kernel, whereas existing solutions, such as system preparation, only solve the disk driver aspect of the problem. Finally, the invention's P2V process is non-intrusive because it does not require a system preparation step on a source machine prior to conversion, implying that a source computer's disk state does not need to be modified for the sole purpose of P2V conversion; this makes the invention's approach to P2V much safer and attractive to users, compared to existing solutions.

Deploying a Template Image to a Physical Machine

The general procedure for deploying a template image to a physical computer on the network was described in detail earlier and can be summarized as follows: 1) identify the selected destination computer; 2) look up the destination hardware configuration from the database 4004; 3) optionally reconfigure the image using copy-on-write mode, producing a temporary logical disk representing the modified version of the image; 4) use the offline-disk imaging method described above to boot the destination computer from a secondary operating system running an imaging client; 5) deploy the logical disk to the destination computer's disk over the network; 6) delete the redo log used by the temporary logical disk; and 7) reboot the destination computer. At the end of the procedure, the destination computer's disk contains a copy of the image's disk contents. The destination computer can then boot independently from its deployed operating system. The reconfiguration step is required only if the destination computer has a hardware configuration incompatible with the template image's configuration.

As before (see the paragraph under the heading "Direct modification of destination disk"), it would instead be possible to deploy the unmodified image to the destination disk and then modify it directly for reconfiguration purposes. This would eliminate the need for the copy-on-write approach.

Virtual to Physical (V2P) Conversion

When a template image 4020 originally created from a virtual machine is deployed to a physical computer, this is a case of virtual-to-physical (V2P) conversion. V2P conversions are common in test-and-development environments. In this environment, virtual machines are used to develop and test software and business applications. The flexibility and resource efficiency of virtual machines generally make them an attractive platform for developing and validating software. The computing environment formed by an operating system, several layers of applications and their data is sometimes called a software stack. Once a software stack is fully tested in a virtual machine, an IT administrator may wish to deploy the stack onto a physical machine in order to productive it. A possible reason for choosing a physical computer over a virtual machine for running a production software stack is a performance advantage of physical hardware.

The invention naturally supports V2P conversions using the general image deployment framework. It doesn't matter whether a template image 4020 comes from a virtual machine or a physical computer—it undergoes the same process when deployed to a destination physical computer. This process may include a reconfiguration step if the destination hardware configuration is dissimilar to that of the source computer, physical or virtual.

Summary of Invention's Contributions to Solving the Hardware Migration Problem

The invention completely solves the hardware migration problem because it has the ability to make arbitrarily complex changes to an image's system configuration. By not requiring images to be system-prepared in order to qualify for hardware migration, the invention reduces the number of images to manage, thereby reducing management complexity. This property also contributes to users' perception of the invention as a safe and non-intrusive imaging system, since a source computer's disk state does not need to be modified for the sole purpose of imaging.

Three sources of information guide the invention's image reconfiguration process: the image's initial system configuration, determined using the static configuration extraction method; the destination computer's hardware configuration, looked up from a configuration or computer registration database or dynamically determined; and a version database containing information about system file variants, versions and patch levels. The invention locates substitute files needed for the reconfiguration process, for example, from the Internet, and caches them locally using the file cache 4010 for enhanced performance.

The configuration/computer registration database 4004 can be dynamically updated to support new hardware configurations. This protects existing images from obsolescence, since they can always be reconfigured to run on computer hardware that did not exist when the images were created. The version database 4016 can also be updated, allowing the reconfiguration process to keep current with patch releases by operating system vendors.

The invention's hardware migration framework naturally supports conversions between physical computers and virtual machines. In particular, the invention makes P2V conversions reliable and easy to automate when compared to prior solutions. Considering that virtual machine hardware configurations are few and tend to change very little over time, a vendor has the option to sell a simplified and restricted implementation of the invention as a low-cost, easy-to-use tool exclusively targeted at P2V conversions. This tool converts a physical disk to a virtual disk and then correctly reconfigures the virtual disk, all in one step. The resulting virtual disk can then be used as the basis for a virtual machine that is an exact clone of the physical computer.

Simplified Software Provisioning Using on-Demand Image Customization

The discussion on prior art introduced the second major issue pertaining to image deployment: the customization of clones. When an image is deployed to one or multiple computers, virtual or physical, the deployed computers become clones of the original source computer that produced the image. Cloning is useful for quickly provisioning a complete software stack consisting of an operating system and a common set of software. However, each clone generally requires some reconfiguration to make it unique and functional, especially when connected to a network shared with other clones. This reconfiguration process is similar to the reconfiguration process for solving the hardware migration problem. To distinguish the two, this type of reconfiguration is referred to below as a customization process.

Customization is commonly used to reconfigure a clone's network identity parameters. The parameters can include a globally unique computer ID (such as the one used by Windows NT/2000 systems), a computer name, network domain membership settings and network addresses and settings (such as IP addresses) for one or multiple NICs belonging to a clone.

Customization can also be used to install additional software. It is common to configure a template image with a core set of software applications that most clones are expected to need. Non-core applications, that is, those that might be needed by some clones but not others, are generally not placed in the template image in order to minimize the image's size; instead, they can be selectively installed on a per-clone basis, using customization.

The prior art's mechanisms for handling customization are similar to its approach for handling the hardware migration problem and thereby suffer from similar shortcomings. In order to qualify for deploy-time customization, existing solutions generally require an image to be system-prepared, i.e., a user must install specialized software on a source machine before capturing an image from that computer. For Windows 2000 operating systems, Sysprep is, once again, a commonly used tool to satisfy both reconfiguration and customization needs. A user must first run Sysprep on a source computer to prepare it and then capture an image of the machine. Sysprep installs a boot-time agent program on the computer's disk before shutting it down. The captured image thus contains the boot-time agent. When a clone computer deployed from this image boots for the first time, the agent searches for a customization parameters file named sysprep.ini, first on the computer's floppy drive and next on the computer's hard disk. The file contains values for configuration settings requiring customization. For example, the file could contain a new computer name, a domain name and a set of NIC parameters.

Providing the customization parameters file on a floppy disk is usually not a practical solution in large computing environments, since it requires a user to custom-edit the file with values relevant for a particular clone and then place the file on a floppy disk and then manually insert the disk into the clone's floppy drive after the image is deployed but before the computer reboots.

A better alternative is to read the file directly from the computer's primary hard disk. There is, however, a dilemma: Since the destination computer's hard disk is overwritten with the image's contents at deploy time, the file must be present in the image in order to exist on the final hard disk. This implies that all clones deployed from this image would inherit the same customization parameters file and would thus be configured with the same network identity settings when they boot for the first time after the deployment phase completes; there would thus be no customization at all.

In order to solve this problem, contemporary disk imaging systems attempt to modify the parameters file with settings unique for each deployed computer. There exist two approaches: 1) modify the file inside the image just before the image is deployed to a particular destination computer; and 2) modify the file on the destination disk after deployment completes, but before the boot-time agent runs.

Most existing disk imaging systems are incapable of implementing the first approach for two reasons. First, modifying an image may be impossible if it is write-protected, or stored on a read-only medium. The only work-around for this problem is to create a copy of the image and store it on a writable location, such as a temporary directory on the imaging server computer's hard disk. In practice, however, an image can be several hundreds of megabytes in size and making a local copy just for the purpose of modifying one file rarely makes sense. Second, even if image modification were allowed, it may negatively affect the image's efficiency: as the discussion on prior art explains, most existing disk imaging systems employ a file-based image format and modifying an image of that format leads to fragmentation, thereby making the image's internal data layout sub-optimal.

Existing disk imaging solutions therefore tend to implement the second approach: modify the customization parameters file not in the image, but on a destination hard disk after it is deployed from the image. In order to achieve this, they require the image and hence the source computer's hard disk, to contain a second agent program specific to the disk imaging system. The second agent remains dormant until the destination computer reboots after being deployed from the image; it is designed to run before the boot-time agent installed by Sysprep. When the second agent runs, it contacts the imaging server over the network, obtains the customization parameters specific to the destination computer and then writes the parameters into the parameters file residing on the deployed disk. In Microsoft's ADS framework, the second agent is called the Microsoft Deployment Agent. Finally, the boot-time agent runs and reconfigures the computer's network identity using the parameters specified in the file.

Shortcomings of Existing Image Customization Solutions

The image customization solution as described above has several shortcomings. From a user's perspective, the solution represents an additional administrative burden because it requires planning. Not only do source computers need to be prepared with a tool like Sysprep, but they also need to have an additional agent installed, the one provided by the disk imaging product. Some disk imaging systems, such as Ghost, simplify the preparation step slightly by providing an installation tool that performs both tasks: run the system preparation tool, thereby installing the boot-time agent and creating the parameters file and then install the additional imaging agent. An image that was created without cloning in mind, such as one used for backup purposes, can never take on a new role as a customizable image for producing clones.

The second shortcoming is that once an image is system-prepared and equipped with the additional agent, the customization capabilities available at deploy time are restricted to the capabilities of the installed agents and are difficult to upgrade. As an example, there have been multiple versions of the Sysprep tool, with each new version providing more powerful customization features than the previous version. Version 1.1, for instance, added disk driver reconfiguration capabilities. An image created with version 1.0 of the tool would thus not have the driver reconfiguration capability. In theory, it is possible for a user to use a disk image-editing utility, such as Symantec's Ghost Explorer, to manually upgrade individual files installed by such tools; however, this would be error-prone and again the modification may fragment the image. For this reason, in practice, users simply discard obsolete images and create new ones using newer versions of preparation and imaging tools, resulting in increased administrative overhead.

How the Invention Simplifies Customization

The invention treats image customization as no different from image reconfiguration. An image does not need to have any software pre-installed in order to qualify for deploy-time customization. The invention's automated image content modification framework allows arbitrarily complex changes to be made to an image prior to its deployment. The invention's images are sector-based virtual disks, therefore they aren't subject to fragmentation and can be easily modified with limited loss of internal data layout efficiency. This allows an image to be customized on the imaging server computer just before it is deployed. Additionally, with the copy-on-write method, write-protected images can be modified at will with virtually no storage overheads because modifications are small and are stored in temporary redo log files. This implies that if an image is already system-prepared with a tool similar to Sysprep, it can be customized without requiring an additional agent, since the imaging server can modify the customization parameters file inside the image before deploying the image.

The above-mentioned alternative (see the paragraph under the heading "Direct modification of destination disk"), to the copy-on-write technique may also be used in this context: the invention can also deploy the image and then modify the destination disk directly before rebooting the destination computer. This would allow the invention to install or upgrade any needed agent software, or perform the customizations, directly, without requiring any agent software.

Furthermore, an image does not need to be system-prepared at all to be customizable using the invention. If a user chooses to use the customization capabilities of a familiar system-preparation tool, such as Sysprep, the invention can automatically insert the tool's files (typically a boot-time agent, a customization parameters file and some registry entries to activate the boot-time agent at the next system reboot) into an unprepared image just prior to deployment. The tool simply needs to be registered with the invention's imaging server. A user can register a system preparation tool by specifying the location of the tool's package container, such as a Microsoft Cabinet file or a self-extracting archive; the imaging server then stores the location in its internal database.

When a user decides to deploy an image and specifies that the image is to be customized using the registered tool, the imaging server locates the container, extracts its files, deposits the files and registry entries into a modified copy of the image, modifies the network parameters file with values unique to the destination computer and then deploys the image. In other words, the invention can simultaneously prepare and customize an image at deployment time; this technique is referred to as on-demand customization.

On-demand customization is powerful because it allows plain, unprepared disk images to be deployed using the most advanced system preparation and customization tools available. When a newer version of a tool is released, a user can upgrade the imaging server's customization capabilities simply by registering the newer version. Since system preparation and customization software is kept separate from images, images can never become obsolete in terms of their deployment capabilities.

Rather than simply accept the customization parameters of a standard tool, it would instead, or in addition, also be possible to include a database 4017 of customization rules. The rules included will of course depend on the needs of a given implementation of the invention, and on the preferences of the user. The database 4017, and the manner in which its rules are applied, can be determined by skilled programmers using known methods.

Finally, since system preparation and customization tools essentially modify files to achieve their objectives, a disk imaging system that employs the invention's methods and mechanisms can completely subsume those tools by making all required changes itself at deployment time. This enables the development of a new generation of disk imaging system, one that can automatically handle all aspects of image reconfiguration and customization without peripheral tools and one that can be upgraded to perform arbitrarily complex and powerful transformations on images.

Advanced Configuration Management

The Simplified Image Management Using Static Configuration Analysis section above introduced the concept of a computer's software configuration. A computer's software configuration is an inventory of all software components installed on the computer; it can include the operating system type, the operating system's version and patch level, a list of installed applications, software settings such as registry entries, and the versions of all software program files.

Modern software programs are complex and can comprise hundreds, or even thousands of file components, such as executable files, libraries, drivers and plug-ins. Software vendors frequently upgrade components in order to fix bugs, security vulnerabilities and to provide added functionality to their software products. New versions of software components are generally made available to customers through patches. A patch is a general term for a program or package containing updated versions of files belonging to one or multiple software products. Patches can be distributed from Internet web pages, or on physical media such as CD-ROMs.

Configuration Management Tools in the Existing Art

Configuration management is an increasingly important field in the area of computer and software management. Configuration management generally describes the process of enumerating, analyzing and possibly updating or repairing a computer's software configuration. An important responsibility of configuration management tools is to report the versions of all components of a particular program, such as an operating system or an application and to determine whether the software is out-of-date or misconfigured.

A program file generally contains an internal sub-element called the "version" field. The first step in a configuration analysis of a program is to enumerate its components and then inspect the version of each component. The enumeration allows a configuration management tool to determine whether a component is missing, in order to detect potential software failures. For instance, if a word processing application is missing a spell-checking library, the application may initially appear to function correctly, but then subsequently fail when a user chooses to check a document's spelling.

Version analysis allows the tool to detect whether an application is up-to-date with respect to the latest bug fixes and security fixes for that application. The tool can achieve this by keeping track of each component's latest version, as published by the application's vendor and then comparing the published version against the installed version. Version analysis can also detect if the versions of installed components are consistent with each other. Consider, for example, an application comprising two components A and B, both initially at version 1. If for any reason A is upgraded to version 2, but B stays at version 1, the application may misbehave if version 2 of component A is incompatible with version 1 of component B.

In addition to alerting users of software misconfiguration issues or missing patch problems, some configuration tools have the ability to fix the problems. For example, a configuration management tool can offer an administrator the opportunity to upgrade a program to bring it up-to-date with respect to the most current patches, or to repair a misconfiguration problem.

Several existing configuration management systems allow an administrator to monitor and manage multiple computers running on a network. Such a framework generally includes a server software component running on a centralized server computer and a client, generally called agent, running on each managed computer. An agent monitors its computer's software configuration and then reports it to the server over the network. The server can thus maintain an inventory of managed computers and the software configuration of each managed computer. In addition to monitoring capabilities, the server can also update or repair a computer's software configuration through the computer's agent. It can also install new software applications using the agent.

Several existing configuration management systems also allow an administrator to register a reference computer with a standardized software configuration and then implement a policy that checks whether client computers comply with the standard configuration. The software can thus detect and report computers that diverge from the standard. It can also report the specific discrepancies between a divergent computer and the reference computer, such as missing files, unauthorized files, out-of-date versions and misconfigured registry entries. If a computer's configuration diverges from the reference, the software can update it by upgrading, repairing and installing files on the computer.

Configuration Management and Disk Imaging

Several existing configuration management frameworks include disk-imaging capabilities. Conversely, many disk imaging systems have evolved to include configuration management capabilities. Symantec's Ghost software, for instance, evolved from a pure disk imaging tool into a complete software suite capable of monitoring and controlling client computers deployed from images. The term "computer management system" is used here to describe generic software providing both configuration management and disk imaging functions.

A computer management system can use disk imaging to quickly provision a bare-metal computer on the network with a complete software stack consisting of an operating system and a set of core applications. The resulting cloned computer can then be further customized and personalized using the customization techniques described earlier. A single template image, or a small set of core template images, is used to create clones.

A computer management system generally consolidates the functions of the configuration management server and the disk imaging server into one combined server application. The configuration management agent and the disk imaging client, on the other hand, are usually kept separate because the disk imaging client is designed to run from within the secondary operating system used during offline disk imaging, whereas the configuration management agent is designed to run on the primary operating system of the software stacks being imaged.

A configuration management agent running on an actively managed computer can, however, initiate disk imaging tasks. For instance, if an administrator decides to capture an image from a managed computer, the configuration management server can send a message over the network to the agent running on the computer, instructing it to reboot the computer into a secondary operating system containing the imaging client in order to begin the capture operation. A managed computer can also be redeployed, that is, overwritten with a new image, using the same process. In this scenario, after the reboot, the imaging client overwrites the computer's hard disk with the contents of the deployed image and then reboots the computer again. After the second reboot, the computer runs a new software stack that may be completely different from the one installed before the first reboot. In order for the configuration management system to maintain control of the newly deployed software stack, the new stack—and therefore the image—must contain a pre-installed configuration management agent.

Configuration Deltas

When a configuration management tool compares a computer's software configuration against a reference configuration from another computer, or one described by a file, the tool can store a description of the configuration differences in a difference file generally known as a delta. In addition to a description of configuration changes, a delta file also contains the actual file and registry entry contents that make up the differences between the two configurations.

Configuration deltas are a popular mechanism for automating application installations. A user generally runs a program, called an installer, to install a software application. An application's installer is typically included with the application's distribution medium or package. An installer makes changes to a computer's file system in order to install, register and activate an application. The changes generally involve copying files from the distribution medium to the computer's file system and then modifying configuration files, such as creating registry entries. Since the installation of an application modifies a computer's software configuration, it can be expressed by a delta.

Several existing stand-alone utilities, such as Microsoft's SysDiff, take advantage of deltas to allow a user to automate the installation of an arbitrary application. Those tools are generally used as follows: a user first selects a model computer that does not contain the desired software application. The user then runs the tool once to take a snapshot of the computer's configuration. The user then installs a selected application by running its installer. Once installation finishes and the application is ready to be used, the user runs the tool again. This time, the tool takes a snapshot of the final state of the computer's configuration and then compares it against the initial snapshot, producing a difference file, i.e., a delta. Files and registry keys that did not exist initially but are present in the final state are included in the delta. The user can then archive the delta. The model computer used to create the delta can be discarded, or reused for a different purpose.

When the user wishes to install the application on another computer, he or she runs the tool in "playback" mode on that computer. When the tool runs in playback mode, it reads a user-selected delta file and applies the file and registry differences specified in the file to the computer. The tool thus applies a set of configuration changes that is equivalent to running the original application installer.

Delta technology is particularly valuable when included with computer management imaging systems, because it enables a form of image customization that can reduce the number of images an administrator has to manage. Consider, for example, an administrator creating disk images for multiple corporate departments, each with varying software needs. Suppose that each image had include at least an operating system and a combination of zero to three optional software applications hypothetically named A, B and C. Assuming that it is unacceptable for a deployed computer to include an application that is not needed for the target department (possibly due to software licensing issues), the administrator would have to create up to eight permutations (no applications, A, B, C, A+B, A+C, B+C, A+B+C) of the image to satisfy the varying needs of each department.

The administrator could use a delta-capable computer management system to reduce the management problem to exactly one image—one that contains just the operating system and the configuration management agent—and three separate delta files, one for each of the three applications. The administrator would then set up the management system to customize each deployed computer with only the applications appropriate for the computer's intended department. The computer management system would typically incorporate the delta technology as follows: when a computer deployed from the standardized image reboots for the first time, the configuration management agent runs and receives customization instructions from the server. Those instructions include a list of zero or more applications to install, depending on the computer's identity and department; the server then transmits the delta file contents for each of the specified applications and the agent applies the specified configuration changes. In summary, delta-based application installation technology would improve management efficiency from eight image files to four files (one image and three deltas) in this example.

The Invention's Contribution to Configuration Management

An important limitation of existing configuration management systems is their inability to extract, analyze or modify the configuration of disk images. In other words, in order to analyze the software configuration embedded within an image, a configuration management system must first deploy the image onto a computer, then boot the computer, then run a configuration management client on the computer in order to extract the information and then transfer the information back to the configuration management server.

The section Simplified Image Management Using Static Configuration Analysis previously underlined one of the invention's novelties: the ability to extract and analyze the system configuration of static images. Two novel functionalities enabled by this capability were discussed: 1) the automatic analysis, classification and organization of images, based on their derived configuration; and 2) simplified image reconfiguration for solving the hardware migration problem, guided by configuration information derived from an image being deployed.

The current section introduces additional functionalities enabled by static configuration extraction: the ability to compute configuration differences between images and to apply differences to existing images to create new ones.

Image Deltas

Since the invention can automatically extract configuration information from static images, it can easily compute the configuration differences between two images, producing a configuration delta. This document uses the term image delta to describe this type of delta. A set of image deltas is shown in FIG. 6 as the files 4014. An image delta is functionally equivalent to the configuration delta that existing configuration management tools can produce. The only difference is the way it is produced: An image delta is computed by taking the difference between two static images, whereas a configuration delta is produced by taking the difference between an initial and a final configuration state of a live computer. Existing configuration and computer management systems are incapable of producing image deltas.

Just like a configuration delta, an image delta can be viewed, edited and even applied to an image. This section discusses the benefits of image delta viewing and inspection. The following section, Image Factory, describes the novel functionality enabled by the ability to apply deltas to images.

A user can view the contents of an image delta in order to inspect the differences between two images. This image comparison ability is useful in several scenarios. Consider an IT group that manages a large number of disk images, many of them created by users from distinct corporate departments. Each image represents a permutation of an operating system, operating system patches, applications and application patches. A particular image's installed applications tend to be useful only to a particular department, such as an accounting application for computers belonging to a finance department. In order to reduce the number of images and thus support costs, the IT group may decide to enforce a policy that requires all supported images to have a particular operating system at a particular patch level, to have a set of required applications (such as a virus scanner) and to exclude a set of forbidden software (such as games).

Equipped with a disk imaging system employing the invention's mechanisms, an IT administrator could take advantage of the system's configuration extraction and image classification capabilities to sort images by their operating system and application configuration, in order to detect those that do not meet the support requirements.

It may be easier, however, for the administrator to create a reference image containing the supported operating system, operating system patches and required applications and then write a script that uses the invention's image delta capability to compute the differences of each image relative to the reference image. Once the deltas are stored in files, another script can process the files in order to identify images that differ in unsupported ways, such as lacking one of the required applications.

Image deltas are also valuable for troubleshooting a virtual machine imported from a physical computer through the P2V conversion process. A physical machine's operating system may contain software, such as third-party drivers, that misbehave when running on virtual hardware, possibly leading to system failures. One example is the Windows NT operating system and drivers designed for that operating system. Windows NT is not a plug-and-play operating system, which means that an installed driver may load even if the hardware device it controls is no longer present. A well-designed driver normally checks for the presence of its device and then deactivates itself if the device is not found. A poorly designed driver may assume that its device is always present and attempt to communicate with it, possibly crashing the operating system.

Since the invention treats virtual disks as images, a user can use the image delta capability to determine the software configuration differences between a malfunctioning imported virtual disk and a reference virtual disk produced by installing an identical operating system at the same patch level inside of a virtual machine. Driver files are typically registered using registry entries and therefore any registry and file differences revealed by the delta may indicate the presence of third-party drivers that are not needed in a virtual environment. The user can then deactivate those potentially harmful drivers by deleting their corresponding registry entries in the imported image.

Image Factory

One of the several novelties the invention introduces is the ability to apply an image delta directly to a static image, producing a new image. This stems from the invention's ability to make arbitrarily complex changes to static images, such as the ones required for image reconfiguration and customization.

Image delta application can be used to customize an image before it is deployed to a computer. This approach has several advantages over the traditional approach that relies on a configuration management agent to apply deltas to a computer after it has been deployed from an image. The first advantage is the ability to apply deltas directly to static images, without the need for a special agent to be installed in the image. As previously explained, requiring no additional disk-imaging or configuration management-specific software to be installed in images leads to a less intrusive and thus acceptable, computer management system from an administrator's perspective.

The second advantage over the agent-based approach is the ability to create ready-to-go, pre-packaged images that are already customized with additional applications. Recall that the agent-based approach to image deployment requires a post-reboot dialog between a computer management server and an agent running on the deployed computer. The server uses this communication to transfer customization instructions to the agent and the delta files to apply. Consider, however, a situation where there is no network between the server and destination computer. As an example, consider an IT administrator working at a company's headquarters and who wants to create a customized image built from one base operating system image and a set of applications stored as delta files. The final image is to be burned on a physical distribution medium, such as a CD-ROM and shipped overseas to a remote branch office that does not have a network connection to the headquarters. The lack of a shared network defeats the agent-based architecture, since the computer management server cannot transmit customization instructions and delta files to a disconnected remote computer deployed from the base image.

In contrast, the ability to apply deltas directly to a static image enables the invention to implement a form of on-demand "image factory." From a small number of base template images and (augmented) delta files, the invention can derive an almost infinite number of tailor-made, ready-to-use disk images. An image produced through this process is thus configured with custom network identity parameters and equipped with an arbitrary number of applications. Such images can be temporary, i.e., they exist just long enough for a deployment operation to complete, or they can be stamped onto a physical media for shipping.

Summary of Invention's Novel Contributions

The invention is the first computer management system to seamlessly blend physical computers and virtual machines. It achieves this first by employing virtual disks as a common image file format for all imaging tasks and secondly by automatically reconfiguring images to support dissimilar destination hardware configurations at deployment time.

The invention is also the first computer management system capable of extracting system configuration information from static images, allowing it to automatically classify, tag, organize and search images. Existing solutions, on the other hand, can extract this information only from live computers, using one or multiple agent software programs. In order to organize images, those systems either rely on user-defined image tags or attributes, which is ambiguous and error-prone, or they rely on a complex and intrusive configuration extraction process that involves running a pre-installed agent on a computer prior to capturing its image.

Similarly, the invention can apply arbitrarily complex manipulations and transformations to a static image's contents. Not only does this enable functionality such as reconfiguration for diverse hardware platforms, it also allows wide image customization freedom without the need for peripheral system preparation tools or computer customization agents.

By separating images from the tools that manipulate them, the invention allows users to focus on the useful contents of images, such as business applications and databases and frees them from the administrative burden traditionally required for making images suitable for deployment and customization.

An additional novel contribution is the ability to compare images against each other and to store image differences in delta files. Contemporary computer management systems do not have this capability; they can only compute the delta between a live computer and a reference computer or configuration description file. Image deltas are useful not only for comparing images, possibly for troubleshooting reasons, but also for manufacturing new images by applying deltas to existing template images. This enables the invention to produce pre-configured and pre-customized images that are ready to be shipped and deployed to remote, possibly disconnected, computing environments.

A specialized, special-purpose embodiment of the invention can serve as physical-to-migration (P2V) conversion tool. This tool imports an unmodified physical computer into a virtual disk image, analyzes its system configuration and then performs the necessary reconfiguration to allow a virtual machine to run from the image. In contrast, the prior art provides no reliable or un-intrusive way to convert physical computers to virtual machines, due to the challenges posed by the hardware migration problem.

The invention's reliance on a server computer's native file system drivers to decode and encode file systems during disk imaging operations significantly simplifies the imaging client component, leading to lower development cost for the computer management software vendor. Furthermore, the use of file system drivers increases the computer management system's chances of supporting proprietary file systems, since the system can decode and access any proprietary format that the server operating system natively supports.

EXEMPLIFYING EMBODIMENTS OF THE INVENTION

The following sections discuss two embodiments of the novel concepts and methods previously described. The first major section describes an embodiment of a universal computer management system that handles the interactions between images, physical computers and virtual machines.

The second major section describes a physical-to-virtual (P2V) conversion tool. The tool is a purpose-specific specialization of the general universal computer management system.

Universal Computer Management System

The invention provides a Universal Computer Management System (UCMS), which is an enhanced disk imaging system for both physical computers and virtual machines. In addition to disk image capture and deployment capabilities, the system also provides image organization, search, reconfiguration, customization, comparison and manufacturing functionality.

The UCMS manages a set of physical computers and virtual machines residing on a network. In order to be included in the managed set, a physical computer needs to be registered with the UCMS. In order to be included in the managed set, a virtual machine must reside on a physical computer, equipped with virtual machine software; this computer is called a virtual machine host and it must be registered with the UCMS in order for its virtual machines to be included in the managed set.

The core component of the UCMS is the UCMS server software 2101, which is installed on a server computer 2000. The UCMS server 2101 manages the files used by the UCMS, maintains several databases that keep track of the files and managed computers and coordinates all disk imaging tasks, such as capture, deployment, reconfiguration and customization.

During an image capture or deploy operation, a managed physical computer temporarily runs a secondary software stack 4100 consisting of a secondary operating system and an imaging client program. In contrast, a virtual machine involved in capture or deploy operation does not need to run the secondary stack, since an image file is already in a form suitable for direct use by a virtual machine; therefore, capturing or deploying a virtual machine simply involves copying files between the UCMS server computer and a virtual machine host computer.

Server Subcomponents

The subcomponents making up the UCMS server software are illustrated in FIG. 6. The software is installed on a server operating system 2200 running on a server computer 2000. A vendor could design the UCMS to run on multiple types of operating systems. In practice, the vendor will tend to design the UCMS server to run on an operating system that includes native file system drivers 2250 for the widest possible range of file system formats, especially proprietary formats; this helps maximize the number of file system formats supported during disk imaging operations. For instance, it is at present advantageous to design the UCMS to run on a Windows-class operating system, since the Windows family of operating systems is the only one that natively supports NTFS, a widely used proprietary file system format. In order to support additional file system formats that are not natively provided, the UCMS server may include and register additional file system drivers 2252.

The heart of the UCMS server is the imaging server 2101, which is a program that runs all the time; such a program is often called a service, or daemon. The imaging server service coordinates all UCMS operations and manages the resources involved in the operations, such as substitute system files, images and deltas.

Databases and Files

The imaging server uses multiple databases to provide permanent and stable storage for the data critical to the operation of the UCMS. Typically, a database management system (not shown) manages the databases and the actual data store files can reside on separate storage devices, such as network file servers.

The registration database 4004 keeps track of computers that are managed by the UCMS. They include physical computers, virtual machine hosts and the virtual machines present on each host. The database 4004 also contains the hardware configurations of each registered physical computer and virtual machine. Hardware configurations that are common to multiple computers are also registered as separate entries. In particular, the database keeps track of all virtual hardware configurations for all the virtual machine software products that it supports.

The database also associates a deployment state with every known computer. The deployment state can have one of the following values: unregistered, dormant, deployed and transitioning. A computer that was detected by the UCMS but not yet registered is set to the unregistered state. A computer is in the dormant state if the contents of its primary disk are undefined; such a computer cannot function until it is deployed from an image. A computer is in the deployed state if its disk is known to have been deployed from an image containing a valid software stack. A computer is in the transitioning state if it is the subject of an imaging capture or deployment operation. The section Physical Computer Control discusses the use of those states in greater detail.

The version database 4016 stores the history of the versions and variants of substitute system files required during image reconfiguration operations. The database 4016 maintains separate history and file information set for every operating system that the UCMS supports and can manage. For example, if the UCMS supports image deployments of software stacks containing either Windows 2000 or Linux, the version database would contains two sub-databases: one for critical Windows 2000 system files, such as the kernel, HAL and certain drivers and one for similar files belonging to the Linux operating system.

When the UCMS server product is installed on a server computer, an initial version database of file versions known at product release time is also installed. The database can be updated later in order to integrate information about new file versions (e.g., from operating system patches), or to support new operating systems. In the former case, the imaging server can periodically connect to multiple Internet servers in order to collect information about the latest patches and can update the version database in case a newly released patch contains new versions of one or more system files involved in a reconfiguration process.

The resource database 4005, which may be included as part of the registration database 4004, contains and tracks information concerning the locations of files used as raw materials in UCMS tasks, such as image reconfiguration and deployment. These files include the template image files 4020, the file containers 4012 from the file cache 4010 and any delta files 4014 produced by comparing images. The file containers 4012 and delta files 4014 are preferably actually stored in the file cache 4010, while the template images 4020 can be stored in one or multiple locations accessible by the imaging server; those locations can include a local disk or a networked file server.

The file cache 4010 stores the file containers 4012 that contain substitute system files used during hardware reconfiguration operations. When a new hardware configuration is registered, either by registering a new physical computer or by registering a new virtual hardware configuration, the imaging server 2101 consults both the version and the resource databases 4016, 4005 to determine whether the set of substitute files needed to reconfigure 3n image to support the new hardware configuration is present in the cache 4010. If some files are missing, the imaging server can prompt a user to download the containers containing the missing files from the Internet and into the cache, or it can choose to download them directly if it can automatically determine the Internet location of the required containers.

Loop-Back Subcomponents

See both FIG. 4 and FIG. 6. Before the UCMS can inspect or edit the contents of an image file or the contents of a remote physical disk, it performs a loop-back mount of that object, i.e., it maps the image or the disk to a simulated local disk. Recall the description of this process given above. When the simulated local disk appears and a file system driver recognizes a file system residing on the disk, the driver maps the file system onto a locally accessible directory path, allowing all software running on the operating system, including the imaging server, to access the file system.

The UCMS subcomponents participating in the loop-back mount process are a loop-back disk driver 2211 (which may comprise multiple instances of the same driver, such as the network and local loop-back drivers 2211N, 2211L in FIG. 4); a loop-back switch service 4200; two loop-back software modules, one called the "local (or 'virtual disk') loop-back adapter" 2314 and the other called the "network loop-back adapter" 2310; and optionally a set of additional file system drivers 2252 that understand file system formats not natively supported by the operating system.

The loop-back mounting procedure for an image or remote physical disk comprises the following steps: The imaging server 2101 first sends a mount request to the switch service 4200. The request contains information identifying the object to be mounted and the location of the object. If the object is an image file, its location is expressed as a file path; if the object is a remote physical disk, the location includes a network address identifying the remote computer and a name identifying the physical hard disk to mount (the computer may have more than one hard disk attached). An example of a possible remote disk name format could be: /dev/sda@192.168.0.138:7000; this string identifies the object as the disk named /dev/sda exposed by an imaging client listening to TCP port 7000 on the computer at IP address 192.168.0.138.

The switch service 4200 forwards the request to the local adapter 2314 if the object is an image file, or to the network adapter 2310 if the object is a remote disk. The appropriate adapter then attempts to open the object. If the object is a remote disk, the network adapter 2310 attempts to connect to an imaging client 1021 running on the source computer 1000 at the specified network address. If the object is successfully opened, then the local or network adapter returns a communication channel for the object to the switch service 4200.

The switch service 4200 then sends a request to the loop-back driver 2211N to create a simulated local disk object (the simulated source disk 2210) and to present it to the server operating system 2200. The driver 2211N then returns a communication channel for the simulated disk to the service 4200. The service 4200 then joins the channel from the driver to the channel from the adapter.

When the operating system or one of its file system drivers accesses a set of sectors belonging to the simulated disk, the loop-back driver 2211N receives the access and forwards it to the appropriate adapter through the joined channel. If the simulated disk is mapped to an image, the local (or "virtual disk") loop-back adapter 2314 translates the sector request into a file request and accesses the appropriate data area(s) representing the sectors within the virtual disk file, using a server operating system API. If the simulated disk is mapped to a remote physical disk (such as source disk 1010 of the source computer 1000), the network loop-back adapter 2310 forwards the access request over the network 3000 to the imaging client 1021; the client then performs the read or write access on the actual physical disk through a standard API provided by the secondary operating system running 1022 on the remote computer. In the case of a write access, the adapter transmits the written data to the client 1021; in the case of a read access, the client 1021 reads data from the physical disk 1010 and then transmits it to the adapter 2310, which finally forwards the data to the server operating system 2200 or file system driver.

Physical Computer Control Subcomponents

The UCMS server may optionally include the PXE server 4002 and an image file containing a UCMS secondary software stack 4100. The image file can be downloaded into the memory of a PXE-enabled physical computer during the reboot process required by a disk imaging task involving that computer. If a computer does not have a PXE-compliant NIC, the UCMS secondary software stack can be loaded from a CD instead. The following section, Physical Computer Control, explains this process in greater detail.

Physical Computer Control

Figure 7:
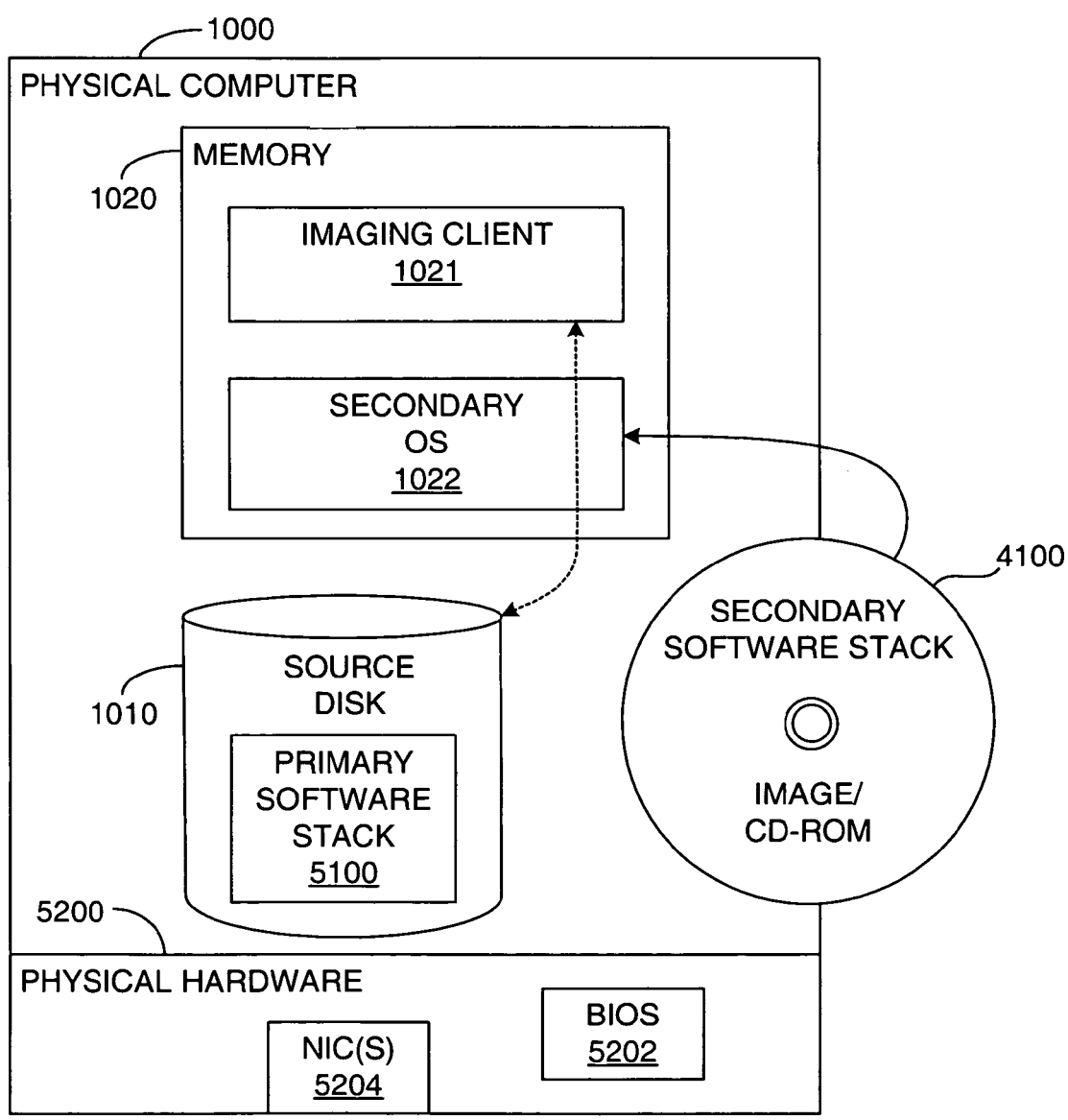
FIG. 7 shows the way in which a Universal Computer Management System according to the invention uses a secondary software stack in a source computer to image a disk.

See also FIG. 7, in which the source computer 1000—labeled the "physical computer"—is shown in somewhat more detail than in FIG. 4. The physical computer 1000 managed by the UCMS according to the invention must possess at least one source disk 1010. Under normal operation, the computer boots from this source disk 1010, i.e., loads the software stack residing on the source disk into memory 1020, and runs this software. During a disk imaging operation, however, the computer must reboot into the UCMS secondary software stack 4100 loaded from a secondary medium. Like most contemporary offline disk imaging systems, the UCMS secondary software stack 4100 according to the invention can be distributed in two forms: a CD (as illustrated in FIG. 7), which a user must manually insert into the computer's CD-ROM drive before the reboot, or a memory image downloaded from the imaging server 2101 directly into the computer's memory at boot time, using a preboot protocol such as PXE. The use of PXE is described in more detail in the discussion above on the imaging server.

First Reboot

There are several ways to boot or reboot a physical computer, depending on its current power state. If the computer is powered off, the act of powering on causes the computer to start the boot process. A user can manually power on a powered off computer. Software running on a second computer, such as the UCMS imaging server 2101 running on a server computer 2000, can also remotely power on the first computer by sending a signal over the network to the computer's NIC, using a protocol such as wake-on-LAN (WoL).

If the computer is already powered on and is running a functional primary software stack 5100, the loaded operating system (part of the primary software stack) must be instructed to reboot the machine. A user can do this manually through the operating system's user interface, or a software program can do this automatically through the operating system's API. If the software stack contains a UCMS agent (which may be designed and installed using known techniques), the UCMS imaging server 2101 can send a message to the agent, instructing it to automatically reboot the computer using the operating system API. The section Deployed Software Stack describes in greater detail the role of a UCMS agent and how it can be deposited into an image before deploying the image.

If the computer is powered on but in a dysfunctional state, such as a stuck state resulting from a severe software failure, rebooting the computer generally requires a user to press the computer's reset button.

When a computer boots or reboots normally, the BIOS, included as part of its physical hardware 5100, determines the device to boot from, i.e., the device that provides the software stack to be loaded into memory. A BIOS generally exposes a user-definable boot order, i.e., a precedence rule for finding the first valid boot device. A physical computer participating in the UCMS is preferably configured with the following boot order: 1) attempt to boot from the CD-ROM drive if it contains a bootable CD; 2) attempt to boot from a PXE memory image if the NIC can find a PXE server on the network; and 3) attempt to boot from the primary hard disk. This configuration allows physical computers to boot from their primary disk under normal conditions, while giving the UCMS or an individual user the ability to override the boot device by supplying a boot CD or a PXE memory image.

Rebooting from a CD

As mentioned earlier, user intervention is required if the UCMS provides the secondary stack 4100 on a CD. If the computer is already running a functional software stack 5100 loaded from the source disk 1010, the user must use the operating system's user interface to reboot the computer. If the computer is powered off, the user must power it on to begin the boot process.

Rebooting from a PXE Memory Image

If the UCMS server is equipped with a PXE server, it can provide the secondary software stack in the form of a memory image. When a managed computer undergoes the normal boot process, its BIOS 5202 attempts to find a PXE server on the network using its NIC. The PXE server automatically connects to the computer and downloads the secondary software stack 4100 into the computer's memory 1020. The computer 1000 then boots from the downloaded stack.

Standby State

Regardless of the boot method, after the secondary software stack 4100 provided by the UCMS finishes loading into memory 1020, the imaging client 1021 program eventually starts running. The client first analyzes the computer's hardware configuration, sends the configuration and the computer's identity information (especially the NIC's unique hardware address) to the imaging server 2101 and then awaits further instructions from the server.

If the imaging server 2101 does not find the computer's identity in the registration database 4004, it adds the computer to the list of discovered but unregistered computers and alerts the imaging server's administrator of the presence of the new computer. The computer is left powered-on, with the imaging client 1021 indefinitely awaiting further instructions. In this situation, the computer is said to be on standby.

If the computer is registered but its deployment state is dormant, it also remains on standby. A computer can become dormant when it is first registered. A previously deployed computer can also enter the dormant state if the UCMS administrator decides to re-use (i.e., redeploy) the computer in order to take on a new role.

If the computer is registered and in the deployed state, the server 2101 instructs the client 1021 to execute a code sequence (which skilled programmers will know how to design) causing the computer to reboot from its source disk 1010, thereby loading the primary software stack 5100 into memory 1020 and running it. This process removes the secondary software stack 4100, including the imaging client 1021, from the computer's memory. The code sequence is used to bypass the BIOS 5202 during the reboot. Note that if the client 1021 triggered a normal boot sequence instead, the BIOS 5202 would reboot the computer using the PXE method, possibly resulting in an infinite loop.

If the computer is registered and in the transitioning deployment state, this means it was rebooted for the purpose of initiating a disk imaging operation. In this situation, the imaging client receives an incoming connection request from the server computer's network loop-back adapter. Once the connection is made, the imaging client may have up to two network connections with the server computer 2000: one with the imaging server 2101 and one with the network loop-back adapter 2310. An implementation may consolidate the two connections into one by having the imaging server and adapter share a single connection, with the server relaying messages from the adapter over the shared connection.

Image Capture and Deployment Process

Once the connection with the network loop-back adapter 2310 is established, the imaging client 1021 awaits and services disk requests made by the loop-back adapter running on the server 2000. The protocol chosen for transmitting disk requests over a network connection is implementation-dependent. It could be a universally known protocol, such as iSCSI, or a custom-designed protocol that is proprietary to the UCMS's vendor. The chosen protocol should generally support the following types of requests.

One request type returns the list of physical disks attached to the physical computer and includes the properties of each disk, such as the disk type, capacity, manufacturer name and model number. A second request type selects one of those disks as the target for subsequent I/O operations. Finally, the remaining request types are I/O requests on the selected disk; an I/O request specifies a transfer direction (read/write) and a range of sectors. On a read request, the imaging client reads the requested range of sectors from the selected disk, then sends the data over the network to the remote loop-back adapter.

The imaging client 1021 thus exposes the selected disk to the server computer 2000 and allows the server's file system drivers 2250, 2252 to make arbitrary I/O accesses to the disk. During an image capture operation, the majority of accesses are reads, whereas during an image deploy operation they are mostly writes.

Alternate Image Capture and Deployment Method

The preferred mechanism for image capture and deployment is to make the remote physical disk 1010 appear as a local disk using the loop-back mounting mechanism described above However, the invention may also employ the traditional disk imaging approach from the prior art, that is, the method that relies on both the imaging client and imaging server to include a set of file system decoder/encoders. In this design, the imaging software performs all the file decoding, streaming, packing, and unpacking; the server operating system's file system drivers are never involved.

Even when the traditional approach is used, the loop-back components are still needed, since the invention uses them to extract and analyze system configuration from images for classification and search purposes, and to manipulate image contents for reconfiguration and customization purposes prior to deployment operations.

Second Reboot

When the disk imaging operation completes, the imaging server 2101 closes the connection between the imaging client 1021 and the network loop-back adapter 2310 and then sends a final message over the remaining connection to instruct the imaging client 1021 to reboot the computer from its source disk 1010. In the case where the primary disk has just been deployed from an image, the imaging server may set the computers deployment state to deployed in the registration database, which indicates that computer is operational and ready to assume its intended role.

Virtual Machine Control

The UCMS can manage virtual machines in addition to physical computers, using a common set of image files. An implementation of the UCMS may, but need not, include virtual machine technology. If a user requires virtual machine functionality, the UCMS can provide its own virtual machine software components, or interface with existing virtual machine products and integrate their virtual machines into the framework of managed computers. This modular design allows a vendor of UCMS software to provide multiple configurations of the product, each targeting a different set of users. This section discusses the requirements a virtual machine product must meet in order to integrate with the UCMS.

Figure 2:
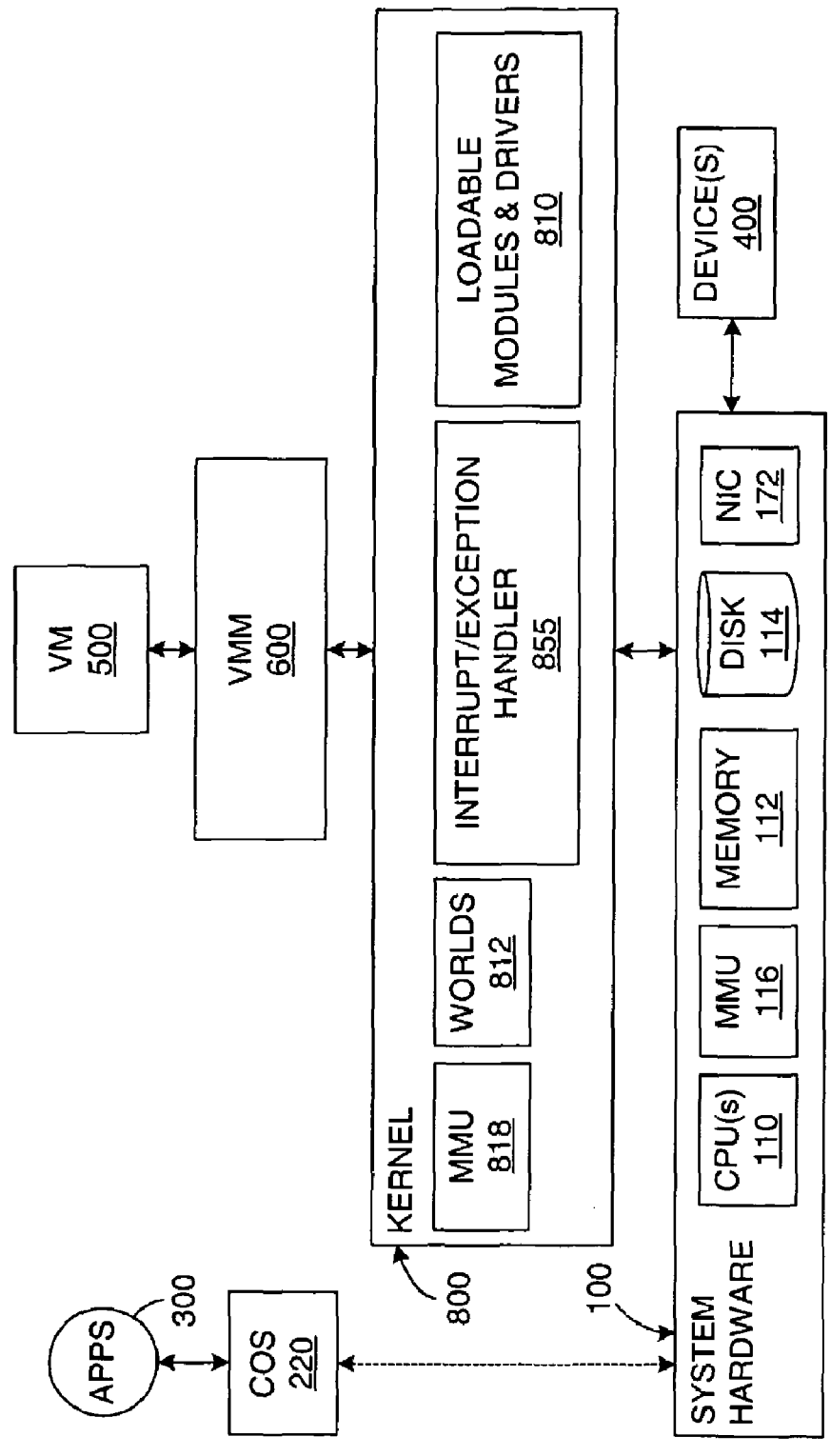
FIG. 2 illustrates the main components of a virtual computer running on a dedicated kernel.
Figure 8:
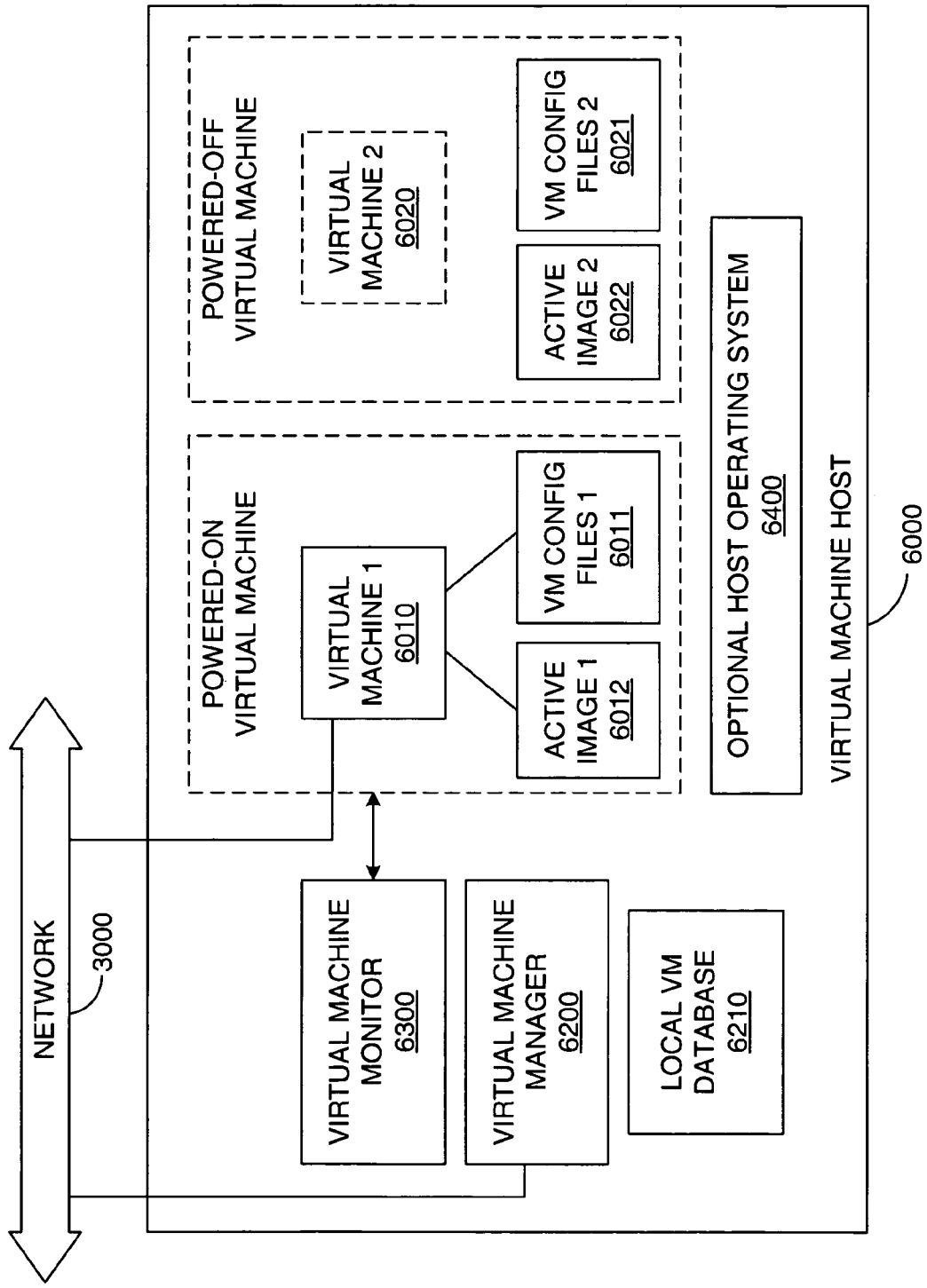
FIG. 8 illustrates the architecture of a typical virtual machine product as used in the invention, including certain files used by the Universal Computer Management System according to the invention.

The architecture of a typical virtual machine product as used in the invention is illustrated in FIG. 8. As explained in conjunction with FIGS. 1 and 2, one or multiple virtual machines are hosted on a physical host computer, commonly called a virtual machine host 6000. A virtual machine (VM) generally comprises one configuration file, which describes the virtual machine's run-time device configuration, such as memory size, and at least one virtual disk file, which is also an image file from the UCMS framework's perspective.

In FIG. 8, two virtual machines are shown, one of which (virtual machine 1, shown as component 6010) is illustrated as being powered on and the other of which (virtual machine 2, shown as component 6020) is illustrated as being powered off. The virtual machines 6010 and 6020 are shown as having respective configuration files 6011, 6021 and image files 6012, 6022. Any number of virtual machines may be loaded onto the host 6000, limited only by the capacity of the host.

The UCMS can uniquely identify a virtual machine on a particular host using one of two approaches. The first approach is to identify a virtual machine by the file path of its configuration file. For instance, the paths /vms/john/myWindows2000.cfg and /vms/mary/myWindows2000.cfg identify two distinct virtual machines, despite the configuration file names (myWindows2000.cfg) being identical.

The second approach is to give each virtual machine a globally unique ID, for example, a large random number. In this case, a virtual machine manager 6200 located in the host can use standard techniques to associate an ID with a virtual machine by storing the ID in the virtual machine's configuration file, or by storing a mapping between the ID and the configuration file in a local database.

When a virtual machine is powered on, a virtual machine monitor program 6300 controls it and manages the interactions between the software—commonly called "guest" software—running inside of the virtual machine and the host's physical resources, such as hardware devices. Some virtual machine products, such as VMware GSX Server and Connectix Virtual Server, access the host's physical resources through the services of an industry-standard host operating system 6400 such as Linux or Windows; other products, like VMware ESX Server, include a virtual machine monitor 6300 and system-level kernel capable of managing physical resources directly without the need for a host operating system.

The virtual machine manager 6200 is typically also responsible for creating, destroying and maintaining virtual machine files residing on the host 6000. It may use a local registration database file 6210 to keep track of the virtual machines hosted on the computer. In order to integrate with the UCMS, the virtual machine monitor 6300 must expose a network interface to the UCMS imaging server 2101 and this interface needs to expose a minimum set of required service functions.

The first function returns the set virtual machines registered on the host 6000 and the properties of each virtual machine, such as its current power state and the contents of its configuration file. The second function copies a virtual machine configuration file and a virtual disk from the UCMS server computer 2000 to the host 6000 and causes the virtual machine monitor to register the new virtual machine on the host. The third function performs a virtual machine copy in the reverse process, i.e., the function copies a virtual disk and description file from the host to the imaging server computer. The fourth function allows the UCMS to perform power operations on a virtual machine, such as power-on, power-off and reset.

Image Deployment Overview

When the UCMS according to the invention deploys an image to a virtual machine, a user of the UCMS, or the UCMS itself, specifies a destination virtual machine host 6000 and a destination virtual machine on that host identified either by a configuration file path or unique ID. If the destination virtual machine does not exist initially, then the imaging server interacts with the virtual machine manager 6200 in any known manner in order to copy the image and a virtual machine configuration file to the host. (Note that a VMM typically controls only active, powered-on virtual machines.) The copied image becomes the active image 6012, or virtual disk, for the newly created virtual machine. The imaging server 2101 also registers the virtual machine in its registration database 4004 and sets its deployment state to deployed.

If the destination virtual machine exists, i.e., a virtual machine with a duplicate configuration file path or ID exists on the host, then the virtual machine manager 6200 destroys the existing files and replaces them with the ones copied from the imaging server 2101.

Once a virtual machine is successfully deployed from a template image 4020, the virtual machine manager 6200 may optionally power it on (such as virtual machine 6010); this would mimic the results of a deployment to a physical computer, since a physical computer typically reboots and becomes operational once it has been deployed from an image. The imaging server, or the user that requested the deploy-to-virtual machine operation, may also choose to have the destination virtual machine remain powered off (such as virtual machine 6020), with the option of powering it on at a later time using the virtual machine manager's fourth interface function.

Image Capture Overview

A user may want to create a template image 4020 from a virtual machine's virtual disk. The process for capturing an image from a virtual machine is similar to the deployment case, with the main difference being that virtual machine files are copied from the virtual machine manager 6200 to the imaging server 2101. If the source (virtual) machine is currently powered on when the manager 6200 receives the image capture request, it first needs to be powered off to ensure that its virtual disk's contents are stable during the network copy process.

The virtual machine monitor can power off a running virtual machine through one of two methods: 1) if the virtual machine is running a software stack that contains a UCMS agent 7300, then the user (via the imaging server) or the imaging server itself can send a message to the UCMS agent, via the VM manager 6200 and the VMM 6300, to request the guest operating system to shut itself down and power-off the virtual machine hardware; and 2) if the UCMS agent is not present, out of service, or the software stack has experienced a failure, then the imaging server can instruct the VMM to forcefully power off the virtual machine.

During the copy phase, the imaging server 2101 temporarily sets the virtual machine's deployment state to transitioning in order to prevent a user from accidentally powering it on. The state is restored to its initial value once the capture operation completes.

When the copy phase completes, the resulting copy of the active image 6012, i.e., the source virtual machine's virtual disk file, becomes a template image 4020 on the UCMS server computer 2000, since it is not attached to any virtual machine.

Deployed Software Stack

Figure 9:
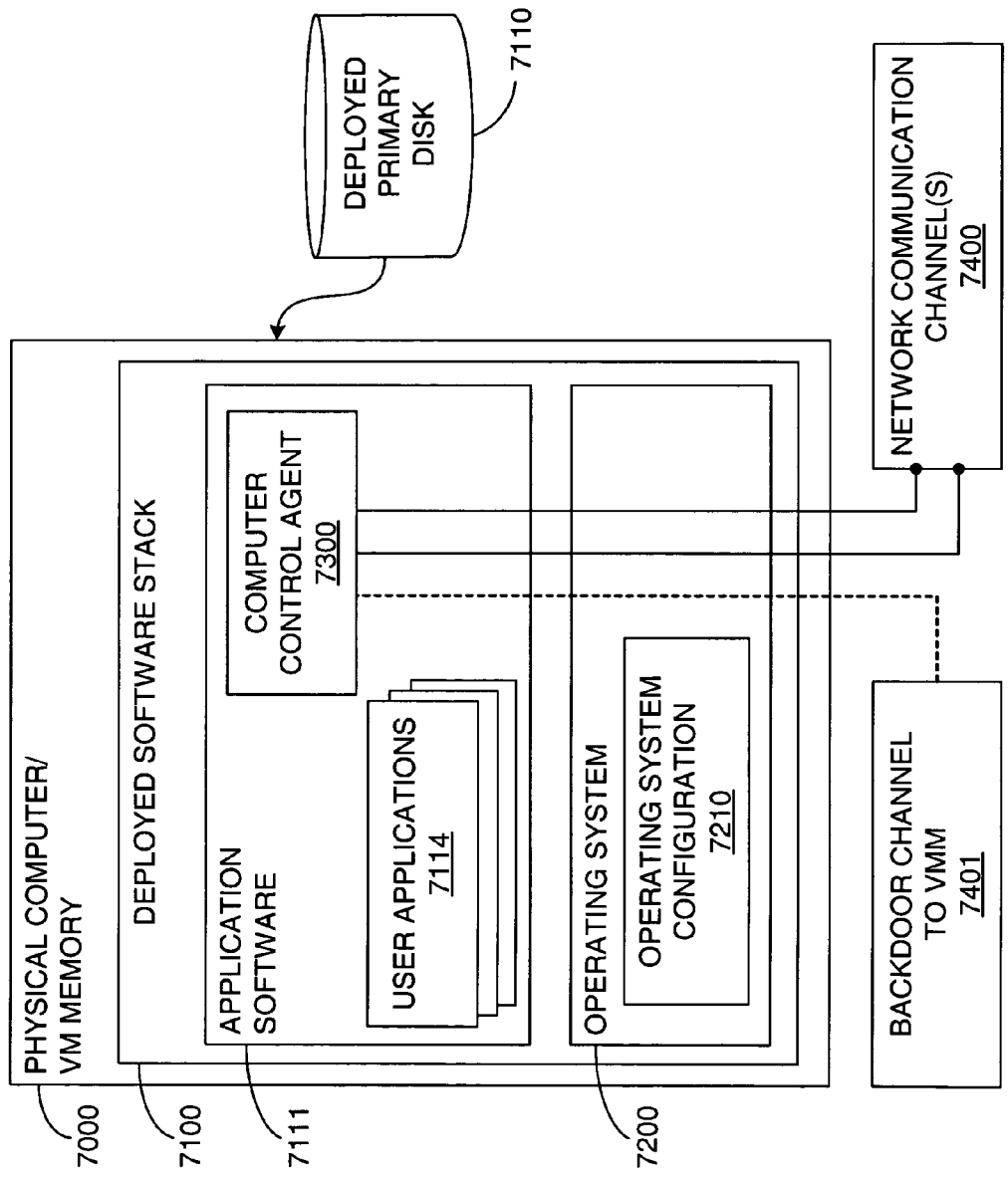
FIG. 9 illustrates certain features of a deployed software stack and alternative channels for communicating with an agent installed within the stack.

UCMS users and, in particular, a UCMS administrator, decide how many images 4020 to maintain on the UCMS server 2000, what to put in images and what images to deploy onto specific computers. A typical image encapsulates the software stack, as illustrated in FIG. 9. Furthermore, FIG. 9 shows a destination computer whose primary disk 7110 was deployed from the image. The stack 7100 contains an arbitrary operating system 7200, and application software 7111 including one or more software applications 7114 and an arbitrary set of data files (not shown).

In order to take advantage of the UCMS' automated management capabilities, the stack 7100 may also contain a computer control agent program 7300, which is referred to as the UCMS agent 7300 for simplicity. The agent 7300 allows the UCMS server 2000 to monitor and control the deployed computer 7000. As discussed in the Physical Computer Control and Virtual Machine Control sections, the UCMS can automatically initiate a disk imaging operation on a computer that was previously deployed from an image, if the computer is powered-on and is running the UCMS agent.

In order to initiate a disk imaging operation, the UCMS imaging server 2101 instructs the agent 7300 to reboot the computer 7000, if the computer is physical, or to shut it down, if the computer 7000 is a virtual machine. The server has several ways of communicating with the agent. If the computer is physical, then it must be connected to the network 3000 and reachable from the UCMS server computer 2000; in this situation the imaging server 2101 and the agent communicate using a private protocol over a standard network transport protocol, such as TCP/IP.

If the computer is a virtual machine running on a host computer, then the server can communicate with the agent using one of two channels. First, if the virtual machine is equipped with a virtual NIC and the virtual NIC is bridged with one of the host's physical NICs, then the imaging server 2101 can communicate with the agent 7300 using the same network-based communications channel(s) 7400 and methods as in the physical computer case. Most virtual machine software products allow a virtual NIC to be bridged to a physical network.

Second, if the virtual machine's NIC is not bridged, or if the virtual machine is not configured with a virtual NIC, then there will usually be another communication channel available: Most virtual machine software products implement a "backdoor" channel 7401 between a virtual machine monitor and guest software running inside of the virtual machine. This channel is typically implemented by equipping the virtual machine hardware with a special virtual device. By interacting with this virtual device, the agent can communicate with the virtual machine monitor and, through message relaying, any external program running on the host computer. The imaging server may take advantage of such a backdoor channel 7401 by connecting to the host's virtual machine monitor 6300 through the physical network and then sending messages to the agent 7300 through the virtual machine manager 6200 and the virtual machine monitor 6300, over the backdoor channel 7401.

In addition to responding to control commands, the agent 7300 can also report status and system performance information to the imaging server 2101, allowing the UCMS to detect the presence of the agent and to monitor the deployed computer's health. Before attempting to remotely control a deployed computer, for example to initiate a disk imaging operation, the imaging server 2101 must therefore check for the presence of the UCMS agent 7300 on that computer by attempting to communicate with it over one of the known channels. If the agent is not present or cannot be reached, the imaging server can alert the UCMS administrator that the deployed computer might be misconfigured and might have to be manually rebooted.

As described in the discussion on prior art, contemporary computer management systems also use agents to remotely monitor and control managed computers; the UCMS agent 7300 serves the same purpose within the UCMS management framework. An important difference, as the paragraph Image Customization will reveal, is that UCMS users don't have to bear the burden of installing and administrating the agent in image files; rather, the UCMS image customization mechanisms can automatically insert the agent into an image before deployment.

Image Organization and Management

Before a template image 4030 can be archived or used, a user must first register it in the resource database 4004 using a console user interface 2700 included in the UCMS server; the interface 2700 may be designed using any known methods. The resource database maintains one record per registered template image. An image record contains the location of the image file and a number of attributes for the image. Some of those attributes can be user-defined annotations, such as textual comments explaining what the image contains. Other attributes characterize various aspects of the image's system configuration 7210, which may include operating system type, version and elements of the hardware configuration. Recall that despite the fact that an image is not a computer, it does reflect a certain hardware configuration, based on the operating system files 1012 that were installed on the source computer 1000 from which the image was captured.

Unlike computer management solutions found in the prior art, the UCMS can automatically compute the system configuration-related attributes of an image, based on the image's contents. In fact, since those attributes can always be determined automatically, they don't really need to exist separately from the image. The reason an image record may contain such attributes is caching, which speeds up look-ups on frequently read attributes.

Certain attributes of an image, such as operating system type, version and patch level are so commonly looked up that the UCMS may pre-compute and cache them in the record when the image is registered. This allows a UCMS user to perform fast image browsing or searching based on commonly referenced attributes. Whenever a template image's contents change, possibly through reconfiguration, customization, or manual editing by a user, the UCMS may recompute the commonly used attributes and store them in the database entry for the image.

When a user browses registered template images 4020 using the UCMS user interface (UI) 2700, the UI may offer several possible views of the templates. For example, the UI could sort images by operating system type, patch level. The set of system configuration-related attributes needed for those views tend to be the ones that the UCMS pre-computes and caches in the database entries.

Similarly, the UI may offer advanced image search capabilities, based on arbitrary attributes. Images can be searched based on user-defined attributes, such as textual annotations, or configuration-related attributes that the UCMS predefines and can automatically extract. In this case, users' search patterns influence how frequently each attribute type is accessed.

Attributes are thus computed and cached on-demand. When a configuration-related attribute of an image needs to be read but is not cached in the image's database record, the UCMS server performs a temporary loop-back mount of the image file, allowing it to access the image's file system through the mapped simulated local disk. Some attributes can be determined directly by inspecting the external characteristics of certain files. For example, the uniprocessor-versus-multiprocessor attribute of an image's hardware configuration can be determined by examining the name and type of the installed kernel file.

Determining other attributes may require the UCMS to inspect the internal contents of a file. For instance, the Linux operating system stores most of its configuration settings in text files, most of them under the /etc/ directory. The UCMS could, for example, analyze the contents of the /etc/services file to determine the set of network services that the operating system embedded in the image supports.

Some operating systems, such as Windows 2000, store certain system settings in binary files whose internal data format is proprietary, that is, not directly accessible to software that does not understand the format. Fortunately, if the server operating system provides an API to decode such a file, the UCMS server can use that API to access the meaningful contents within the binary file. For instance, Windows 2000 stores most configuration settings in a set of binary files called registry hives. When the server operating system starts up, it loads its hives into the tree-like memory structure universally known as the registry. Consequently, although the Windows registry is sometimes referred to as a file, in actuality it is made up of multiple, independent hive files.

If the UCMS server software is installed on a Windows 2000 server operating system, it can read a hive belonging to a Windows 2000 image using the following procedure: The UCMS first maps the image to a simulated local (source) disk 2210 using loop-back mounting as described above and then invokes an API function called RegLoadKey( ) to load the hive from the simulated disk into a temporary subtree within the server operating system's registry and then accesses the desired registry entries under the temporary subtree using other well-known Windows 2000 API functions. Once the desired information is retrieved, the UCMS calls RegUnLoadKey( ) to unload the hive from the server operating system's active registry and then dismounts the image file.

Image Reconfiguration and Deployment

Image reconfiguration is the process of updating an image's operating system files to make it compatible with a destination hardware configuration. The UCMS detects hardware compatibility issues by comparing an image's system configuration against the hardware configuration of a destination computer prior to a deployment operation.

Deploying to Physical Computers

In order to become registered with the UCMS, a new physical computer must first boot into the UCMS secondary software stack 4100, allowing the UCMS server 2101 to detect the computer and to add a record for it in the registration database 4004 (see Physical Computer Control). The UCMS user interface 2700 can display the list of detected but unregistered computers. Through this user interface, a UCMS user or administrator can then register any unregistered computer.

The registration process causes the imaging client 1021 running from the secondary stack 4100 to analyze the computer's hardware configuration and transmit it over the network 3000 to the UCMS server 2101. The server then creates a second type of record, called hardware configuration record, in the registration database and stores the transmitted hardware configuration information in the record, unless a record describing the same hardware configuration already exists.

The server then adds to the computer record a pointer to the configuration record. In the case multiple computers are equipped with the same hardware, their corresponding computer records would all point to the same configuration record, resulting in space savings for the registration database.

The server then checks the resource database 4005 to see if the file cache 4010 has the necessary substitute system files needed to reconfigure any image to support the particular hardware configuration. For instance, consider the registration of a new computer equipped with 2 processors, an ACPI-enabled chipset, a BusLogic SCSI disk controller and a 3Com 3c509 NIC. If the UCMS supported images containing only one of two specific operating system types, such as Linux or Windows, it would need to verify that the file cache 4010 can supply the necessary Linux and Windows operating system files that are compatible with the devices specified in the hardware configuration. The number and types of files vary depending on the operating system type, but they would generally have to include a multiprocessor-capable kernel file, possibly a HAL file (on Windows), a driver for the BusLogic controller and a driver for the 3Com NIC.

If some files are missing, the UCMS server can alert users of the situation, either by displaying a message through the user interface 2700, or by logging an alert in an event database that users can inspect at a later time. The server 2101 would also set a flag in the computer entry indicating that a reconfiguration for that hardware configuration may not be possible because of unresolved file dependencies.

When a user notices the alert, he may instruct the UCMS to resolve the missing file issue immediately. Substitute system files are generally packaged in container files, such as patches, installer programs and service packs and therefore resolving the issue generally involves inserting missing container files into the UCMS file cache 4010.

The UCMS can handle the resolution process in several ways. An implementation may simply display a list of descriptions of missing containers and rely on the user to manually locate the containers on the Internet, download them and then insert them into the file cache through the UCMS user interface. A more advanced implementation may have a built-in database of common Internet download sites and attempt to automatically locate and download the containers from these sites. This approach might fail; since operating system vendors frequently change the address of their patch and driver download sites. An even more advanced implementation of the UCMS might connect to a well-known and constant Internet address maintained by the UCMS vendor itself; a patch and driver locator service would run at this address and would refer the UCMS to the most current download locations. The service itself could rely on a location database that the UCMS vendor would periodically update, thus ensuring that the site location information is always current.

A user may also ignore the alert and decide to resolve file cache dependencies later, at image deployment time. When a user instructs the UCMS to deploy an image to a registered physical computer 7000, the UCMS server first determines the hardware configuration-related attributes of the image.

Recall that despite the fact that an image is not a computer, its installed operating system files reflect a certain hardware configuration, more specifically, the configuration of the source computer from which the image was captured. The attributes of interest generally comprise the processor configuration, the chipset type, the disk controller and possibly the NIC types.

Some of those attributes may already have been cached and stored in the resource database 4005 record for the image. If some required attributes are not cached in the image record, the UCMS extracts the missing information from the image file by using the loop-back mount procedure previously described in Image Organization and Management.

Once the hardware configuration information for the image is known, the UCMS server compares it against the destination computer's hardware configuration. If they match, then the image can be deployed without modification, unless the user requests certain customizations to be performed.

If the configurations do not match, then a reconfiguration is necessary. The UCMS determines the variants and versions of the substitute system files that need to be copied to the image, based on the image's current system configuration and the UCMS's version database. The method for determining the correct substitute file set from the version database was described in detail in the Reconfiguration paragraph of the Simplified Hardware Migration using Image Reconfiguration section above.

The UCMS server 2101 then checks the resource database 4005 to determine whether the file cache 4010 has the file containers 4012 that contain the variants and versions of the required substitute files. In the case some containers are still missing, then the user is alerted and the image deployment process cannot proceed until the file cache dependencies are satisfied.

Assuming that the file cache is able to supply the required substitute files, the UCMS server reconfigures the image's contents as follows. It first locks the image file, preventing anyone or any other program from modifying or deleting it. It then preferably enables copy-on-write for the image, thus protecting the image by storing all modifications to temporary redo log. The server then performs a loop-back mount of the image, allowing it to access the image's contents through the mapped simulated source disk. It then replaces the appropriate operating system files with substitute files extracted from containers in the file cache. The reconfiguration process may also require modifying some operating system configuration files in the image, such as text files and registry hives. Registry hive entries can be accessed and edited using the method described in the section "Image Organization and Management."

The final step is to actually deploy the modified image to the destination computer. The destination computer must first boot, or reboot into the UCMS secondary software stack 4100. If the computer is currently powered-on and running the UCMS agent 7300, the UCMS server sends a message to the agent, instructing it to reboot the computer into the secondary stack. If the UCMS server is equipped with a PXE server 4002, it can download the stack over the network into the computer's memory during the reboot process.

The UCMS then connects to the imaging client included in the secondary stack. Once the connection is established, the server performs a loop-back mount of the remote physical disk 1010, thereby mapping it to a simulated destination disk 2230. The UCMS server then uses the server operating system's API or disk utility programs to partition and format the simulated destination disk with the same layout and file system format as the simulated source disk. It then copies all files and folders from the source to the destination.

When the deployment operation completes, the UCMS server dismounts the source and destination disks, then instructs the imaging client to reboot the destination computer from its newly deployed physical disk. Finally, the server destroys the temporary redo log and unlocks the image file.

As in other contexts described above, there is an alternative to modifying the template virtual disk (using copy-on-write/redo-log) and then copying the modified version to the destination host: Instead, the UCMS can copy the unmodified template to the destination host, and then perform a loop-back mount of the remote copy, making it appear as a simulated local destination disk. This then allows the imaging server to make the desired modifications directly.

Deploying to Virtual Machines

The general procedure for deploying an image to a virtual machine is mostly similar to that for a physical machine. This section describes the few differences.

Unlike a physical machine, a destination virtual machine may not initially exist and therefore may not have a record in the registration database 4004. This is, in fact, one of the benefits of virtual machine technology: Virtual computers can be created on the fly, as needed.

What does need to be registered is the destination virtual machine host 6000 on which the virtual machine is to be created. The registration database 4004 therefore contains a record for every virtual machine host that participates in the UCMS framework. A host record contains a description of the virtual machine software installed on that host. It also contains one or more pointers to hardware configuration records describing the various virtual hardware device sets that the host's virtual machine software can implement.

Some virtual machine products support exactly one type of virtual hardware configuration. For instance, VMware GSX Server 2.0 implements a virtual hardware configuration consisting of a single processor, a non-ACPI chipset, one or more BusLogic SCSI controllers and one or multiple AMD PcNET NICs. Other virtual machine products may implement more than one configuration. For example, VMware ESX Server 2.0 supports the older GSX Server 2.0-style configuration (for compatibility) and a new configuration comprising up to two processors, an ACPI-enabled chipset and one or more LSI Logic SCSI controllers.

When a user registers a virtual machine host, he may manually specify the type of virtual machine product running on the host, or the UCMS server can automatically attempt to detect the product type and version by probing the virtual machine monitor 6300 program running on the host. This is possible because a virtual machine monitor 6300 generally exposes a network interface exporting multiple API functions and one of those functions typically returns a product type, version and description.

When a host is successfully registered, the UCMS server adds the corresponding host record and hardware configuration records to the registration database 4004. The simplest way to enable a UCMS to determine the correct hardware configurations for a particular virtual machine product is to equip it with a pre-built table of supported products and a set of pre-created configuration records for all of the virtual hardware configurations supported by each product.

When a user requests the UCMS to deploy an image to a virtual machine, the user specifies a destination host and an identifier for a destination virtual machine on that host, which could be a numerical ID or file path. The UCMS server determines the set of virtual hardware configurations supported by the virtual machine software installed on the host and may give the user a choice in case there is more than one configuration. An alternative is to always select a default configuration in the case of multiple configurations. The UCMS can also allow the user to equip the virtual machine with additional non-critical devices, such as NICs and configure other device settings, such memory amount.

Once the virtual machine's hardware configuration is selected and the non-critical devices are specified and quantified, the UCMS server checks if the image requires reconfiguration, based on its current system configuration. If a reconfiguration is required, it is validated and processed in the exact same way as in the physical computer case. The remaining steps of the deployment process differ slightly from the physical computer case, as described below.

First, it is possible that the virtual machine host 6000 and the UCMS server 2000 computer are in fact the same computer; it is thus possible to install the UCMS server 2101 and a virtual machine software product on the same computer. In this case, the UCMS server can simply make a local copy the reconfigured image and that copy becomes the final active image associated with the destination virtual machine.

If the destination host is a remote computer, then the UCMS server opens a connection with the virtual machine manager 6200 running on that host and then copies the contents of the reconfigured image over the network to the host.

Another difference with the physical computer case is that the destination virtual machine does not need to boot into a secondary software stack 4100, since the virtual machine may not exist initially anyway and, more fundamentally, the UCMS treats virtual disks as images; therefore, an imaging client 1021 is never needed for imaging to and from virtual machines.

Note that either the copy-on-write or the alternative direct-modification technique (both discussed above) may be used here as well.

Image Customization

In addition to reconfiguration, another reason for modifying an image prior to deployment is customization. The customization process generally makes small changes to an image to tailor it for a particular destination computer. Customization could involve changing a software stack's computer identity, reconfiguring its network bindings, or installing software not present in the image. The concept of image customization was first introduced above in the discussion on prior art and the invention's novel contributions to customization were described under the Simplified Software Provisioning Using On-Demand Image Customization section above.

The greatest difference between the UCMS's approach to customization and the prior art is the ability to customize any image without requiring the image to be prepared in any way; in other words, the image does not need to contain any pre-installed software for the specific purpose of customization.

Existing computer management systems require images to contain a pre-installed agent in order allow the systems to control computers deployed from those images. The UCMS agent serves the same purpose, i.e., it allows the UCMS server to control physical computers and virtual machines deployed from UCMS images. The UCMS agent, however, does not need to be pre-installed in images at the time the images are created; rather the UCMS server can automatically deposit the agent into an image just prior to deployment.

By separating customization and management software from images, the UCMS mechanism according to the invention ensures that images never become obsolete, since they can always be upgraded to the latest customization or management technology at deployment time, not at image creation time.

Customization Process

Customization generally involves modifying an image's software configuration at deployment time with settings specific to the destination computer. The settings could include a computer name, a globally unique security identifier, a network domain membership and network parameters (such as IP address and protocols) for each of the computer's NICs.

The UCMS customizes an image just after the reconfiguration step (if required), while the image is still mapped to a simulated disk, but before it is deployed to a destination physical computer or copied to a destination virtual machine host. The UCMS supports two mechanisms for making the software configuration changes involved in customization: 1) use an existing customization tool from the prior art; or 2) make direct changes in the image.

Configuration Change Using Existing Customization Tools

A UCMS user may choose to use an existing customization tool because she is familiar with the tool. In this case, the UCMS mechanism according to the invention simply makes it easier to use the tool with images. On Windows operating systems, the Sysprep tool is one of the most common image customization tools. A user normally runs Sysprep on a source computer before capturing an image from the computer. At deployment time, a configuration parameters file named Sysprep.inf, which is provided on a floppy disk or automatically created and edited by a configuration management agent, supplies the customization settings specific to the destination computer.

As previously described, when Sysprep runs on a source computer, it deposits a boot-time customization agent called clsetup.exe onto the computer's file system and modifies a few registry entries to cause the agent to run at the next operating system boot. When an image captured from the source computer is deployed onto a destination computer and the destination computer boots from the deployed disk for the first time, clsetup.exe runs once and customizes the computer using the settings specified by the sysprep.inf file.

If a UCMS administrator chooses to use a familiar tool such as Sysprep to perform customizations, the UCMS can greatly simplify the process by automatically inserting the boot-time agent, creating the registry entries and creating a customized version of the configuration settings file inside the image just before deploying it.

The UCMS uses a customization script to implement customization via an external tool. The customization script, whose design will be obvious to skilled programmers, is a small program written in a high-level language (such as Perl or Visual Basic) that can access UCMS resources, such as the file cache 4010 contents and the various UCMS databases and access the contents of a mapped simulated disk 2230 prior to image deployment. When the script executes inside the UCMS server environment, the script accesses the image and the UCMS resources through a Scripting API provided by the UCMS software. This API exposes a set of UCMS-specific services and can be provided in the form of a dynamic link library (DLL) or other software component type.

A customization script typically resides on the server computer 2000 on which the UCMS server software is installed. Before a script can be selected to run at image deployment time, it must first be registered with the UCMS's resource database 4005. If the script requires access to certain files, such as the binary files belonging to a specific customization tool, the files also need to be present on the server computer and registered in the resource database 4005.

An implementation of the UCMS product may include pre-created and pre-registered scripts that can customize an image using a well-known external customization tool. For example, a UCMS product may include a script that customizes an image using Sysprep. Before that script can run, however, the UCMS administrator must first download the Sysprep distribution package from the Internet, store it in a location accessible from the server computer and register it in the resource database 4004 using the UCMS user interface 2700. The user may also instruct the UCMS to store the package in the file cache 4010, which might make it easier to manage since it would reside with other containers 4012 used during image deployment.

An image deployment operation can thus specify a customization script to run and a set of customization settings to use as input to the script. If a user manually starts a deployment operation, he has the opportunity to select the script and the settings, along with other information required for the deployment, such as a virtual machine host 6000, in case the destination computer is a virtual machine.

The UCMS can also automate certain aspects, or all aspects, of an image customization and deployment operation. For example, a user could instruct the UCMS to schedule the deployment of a selected image onto any computer belonging to a pre-defined cluster of destination computers, at a certain date and time. When the UCMS actually performs the deployment, it may automatically select a destination computer, a customization script and a set of customization settings for the operation. The destination computer could be selected in such a way to balance the workload among the cluster; the script could be pre-selected; and the customization settings could be generated in such a way to ensure that the destination computer would have a unique network identity. To ensure uniqueness, the UCMS could, for instance, generate a random computer name and configure the destination computer's NIC to dynamically obtain a unique IP address using the known DHCP protocol.

Customization scripts can be modified and added to the UCMS, which ensures that the UCMS can always be upgraded to support the latest image customization tools. This, combined with the fact that the tools need not be (and preferably are not) present in template images, since scripts can automatically insert them at deployment time, ensures that images don't become obsolete when new tools, or newer versions of tools, become available in the market.

Configuration Change Using Direct Image Changes

The alternative to external customization tools is to use a customization script that performs all the necessary software configuration changes directly in the image, without the need for a specific tool and, more fundamentally, without the need to insert a pre-boot agent such as Sysprep's clsetup.exe program into an image. This is possible because prior to deployment, the UCMS server performs a loop-back mount of the image to deploy, allowing the UCMS and any customization script, to make arbitrarily complex changes to the image's contents. A customization could thus add and modify any file or registry entry in an image. The changes preferably always take place while the image is locked and in copy-on-write mode, so that the original template image is never modified.

In summary, by separating customization and management mechanisms from images and by implementing the customization process using scripts, the UCMS enables unprecedented power and flexibility in the image customization and deployment process.

UCMS Agent Insertion

The UCMS server 2101 preferably takes advantage of the image customization step to insert the UCMS agent 7300 into the deployed image. The UCMS agent allows the UCMS to remotely monitor and control a computer deployed from an image, as explained in Deployed Software Stack.

A UCMS administrator may want to insert additional agents to allow another configuration management software system to monitor and manage deployed computers. He may easily add this capability by supplying an additional customization script to run at image customization time. This script could, among other things, insert an additional agent and any other programs or files deemed useful.

Image Deltas and Image Factory

The UCMS user interface 2700 allows a user to compute the file differences (deltas 4014) between two template images. The differences are computed by comparing files and folders belonging to each of the images. When a user instructs the UCMS to perform an image comparison, he typically selects a top-level folder to compare. The UCMS is then responsible for performing a pair-wise comparison of every file under the same folder from each of the two images. If the folder contains subfolders, then the UCMS recursively compares files from the subfolders as well. If the user specifies the file system's root folder, then the UCMS compares the entire file system tree.

Before file comparison can be performed, the UCMS server software first maps the two user-selected template images to two simulated local disks, using the loop-back mount method described above. It can then access the relevant files through the images' mounted file systems.

File Comparison Process

When the UCMS finds a particular file in a particular subfolder on the second image, it first checks if the file also exists in the first image under the same subfolder. If the file does not exist, the UCMS creates a difference record in memory indicating that the file has been added in the second image. If a file with the same name also exists in the first image, the UCMS compares the two files to check whether they are equal. Two files are equal if their external attributes—such as name, size and version—are identical and their contents are also identical. The UCMS can easily inspect the files' attributes and binary contents using the server operating system's file API.

If a file exists in both images but the two instances are found to be different, the UCMS first creates a difference record to reflect the existence of a discrepancy for the file. The record contains the file's path name and specifies the aspect of the file (i.e., attribute or contents) that differs between the two instances.

If the instances differ in their content and their internal file format is known to the UCMS and the file is relevant from a system configuration perspective, then the UCMS can optionally compare the internal contents of the two instances in order to find individual differences within sub-elements of the file.

For example, consider the comparison of the /etc directory between two images containing the Linux operating system. After mapping the two images to simulated disks, the UCMS can easily detect that the images contain a Linux operating system, based on the images' file system format and the presence of well-known system files, such as the Linux kernel, in well-known locations. By convention, Linux stores most of its system configuration settings in a set of text files under the /etc directory; the /etc/services file, which contains a list of exported network services, is an example of such a file. The UCMS could thus automatically recognize that /etc/services is a system configuration file. If the two instances' contents differ, the UCMS can perform a textual, line-by-line comparison between the instances. This would allow the UCMS to detect, for example, that the second image's instance has an additional line, specifying a new network service not exported by the operating system residing on the first image.

Similarly, when comparing two images containing a Windows operating system, the UCMS can automatically recognize the presence of registry hive files based on their well-known path (they tend to reside in the %systemroot% \system32\config folder) and compare individual registry entries between the two images. Unlike text files, registry hives use a proprietary binary file format. Fortunately, as previously described in Image Organization and Management, in the case the UCMS does not have direct knowledge of the internal hive format, it can still decode the contents of hive files using the server operating system's registry API.

When a UCMS finds differences in individual sub-elements of a system configuration file, such as text lines in a Linux configuration file, or registry entries in a Windows hive file, it augments the file difference record with one sub-record for each differing sub-element.

When the comparison operation completes, the UCMS user interface can display the detected differences, based on the difference records that the UCMS created in memory. A user can thus view which files were added, deleted, or modified in the second image, relative to the first image. Furthermore, for system configuration files that changed, the user can view the individual sub-elements that changed, such as registry entries.

Deltas

When a user instructs the UCMS to compare two images, he can optionally make the UCMS generate a delta file 4014 representing the changes from the first image to the second image. As previously described in the Advanced Configuration Management section of the Overview of Invention chapter, a delta file contains not only a description of file differences, but also the data content making up the differences. This allows the invention to create a new image by applying a delta to an existing image.

When the delta option is selected, the UCMS augments each file and sub-element difference record representing the addition of new data with a copy of the added data itself. For example, if the /etc/services file instance from a second Linux image contained an additional line not present in the instance from the first image, then the difference record for the file would contain a sub-record. This sub-record would in turn contain a description of the difference (such as the line number) and a copy of the actual line of text that was added in the second instance.

If a file from the second image is absent in the first image, the resulting file difference record contains an embedded copy of the entire file itself, including its attributes and full contents.

When the comparison operation completes, the UCMS saves the difference records from memory into a delta file. A user can then add the delta file to the file cache through the UCMS user interface, which causes the UCMS to register the delta in its resource database.

An implementation of the UCMS may support multiple delta file formats. A delta resulting from an image comparison is typically created by the UCMS, since the UCMS is the only disk imaging system in existence capable of taking the difference between images. Such a delta may be internally represented using a proprietary file format known only to the UCMS vendor. On the other hand, the UCMS may allow other types of deltas 4014 to be added to the file cache 4010 and registered. This may include deltas produced by existing tools that employ a before-and-after-snapshot approach to differencing, such as Sysdiff (see the Advanced Configuration Management section).

When a delta is added to the file cache and registered, the UCMS creates a record for it in the resource database 4005. Preferably, one of the record's elements describes the file format. When a user registers a delta created by an external tool, the UCMS attempts to automatically determine the delta's file format type by inspecting the delta's file extension, or by scanning the file's first few bytes in search of a well-known file header signature. If the UCMS fails to determine the delta's format, it may require the user to manually specify the format through the user interface.

Image Factory

From the UCMS user interface 2700, a user can create a new template image from an existing template image 4020 and a selected delta 4014 using the following process: The UCMS first makes a copy of the image and registers the copy in the resource database 4005. The new image is then mapped to a local disk using loop-back mounting, giving the UCMS full access to the image's files. The UCMS then opens the user-selected delta file and inspects the delta's difference records. The way the difference records are represented in the delta file is dependent on the delta's internal file format. The UCMS determines the delta's file format from the delta's resource database record; knowledge of the format allows the UCMS to correctly decode and interpret the delta's difference records.

The UCMS then applies the changes described by the delta's difference records to the new image's file system. This process can involve copying new files and creating or modifying sub-elements of files, such as text lines or registry hive entries. When the process completes, the UCMS dismounts the modified image.

The new image does not have to be a template image. The UCMS also allows deltas to be applied as part of image customization. In fact, customization scripts that take advantage of the UCMS Scripting API can apply deltas. The UCMS can thus reconfigure, customize and apply a delta to an image before deploying it.

Scripts that take advantage of the UCMS's Scripting API aren't required to run at customization time. In fact, a user-defined script can use the API to control the UCMS and access its databases, files and loop-back mount capabilities in order to perform arbitrarily advanced operations on images.

For example, an administrator may develop a set of scripts to add image factory capabilities to the UCMS. An image factory is a framework that can take a set of template images and a set of deltas and generate a large permutation of new images. A script within the image factory framework can automatically package a newly generated image and copy it to a distribution medium, or send it over the network for another organization to further enhance the image or deploy it.

The image factory concept can be used to create ready-to-run virtual machines that are pre-packaged on a distribution medium of choice. For example, a software consulting company that specializes in tailor-made virtual machines could use the UCMS to produce application-specific virtual machines based on customer specifications and ship those virtual machines on DVDs. A possible set-up is to have a few template images containing an operating system and a core set of common software programs. In addition, the company develops a library of deltas, with each delta describing the installation of a specific business software application. When a customer places an order for a virtual machine, the customer specifies the operating system, a desired set of applications and a set of customization settings, such as a computer name, network parameters and a domain membership. The software company can then run a custom script that creates and customizes a new image from a template image, the set of deltas corresponding to the selected applications and the specified customization settings. Once the final image is created, the script can create a virtual machine configuration file and attach the image to that file. Finally, the script can burn the two files onto a DVD and transfer the DVD to an order-fulfillment department for shipping.

Physical to Virtual Conversion Utility

The invention's Universal Computer Management System previously described is a general framework for manipulating images and transparently transferring them between physical computers and virtual machines. It is possible, however, for a UCMS software vendor to develop a scaled-down and specialized version of the UCMS for the specific purpose of solving the physical-to-virtual (P2V) conversion problem.

As virtual machine technology becomes more pervasive, IT users tend to demand a tool for easily converting an existing, functional physical computer to a virtual machine. As described in the discussion on prior art, there exist many uses of a such a tool, one of them being the consolidation of multiple physical computers onto a single virtual machine host computer, possibly resulting in reduced management costs and more efficient hardware utilization.

Historically, P2V conversions have been hampered by two obstacles: 1) the physical format difference between physical disk devices and virtual disk files; and 2) the hardware configuration differences between a physical computer and a virtual machine. The first obstacle can be overcome by running a traditional disk imaging tool inside of a virtual machine, in which case the virtual machine monitor translates the tool's sector-level disk accesses to file accesses to the virtual machine's virtual disk file. Unfortunately, this is a slow, tedious process that involves configuring and running a temporary virtual machine, which generally has to be done manually and is thus difficult to automate.

The second obstacle is the most challenging one to overcome and it has kept P2V conversion out of reach for most existing users. Solving the hardware compatibility problem for P2V, which is a special case of the general hardware migration problem between any two computers, requires a thorough knowledge of advanced operating system concepts such as the mapping between system files (such as kernel, HAL, drivers and registry entries) and critical hardware devices. Furthermore, the complication introduced by file variants, file versions and operating system patch levels significantly increase the risk of error, as explained in the Simplified Hardware Migration Using Image Reconfiguration section.

The same section also discussed how existing tools, such as Sysprep, could solve part of the problem. Those tools suffer from two main drawbacks, however. First, they require the source machine to be "prepared" by installing special software on it. This may be unacceptable to users who want to convert a physical computer without modifying the computer's state in any way, in order to prevent any accidental data corruption, or to eliminate the risk of introducing harmful software (such as computer viruses) on the computer. Second, those tools solve only a subset of the general hardware migration problem. Sysprep, for example, cannot migrate a software stack between two computers with dissimilar chipset or processor configurations.

The UCMS provides a reliable foundation for solving the P2V problem. It uses virtual disks as images and therefore it can naturally and automatically convert physical disks to virtual disk files with little user invention. Its system configuration analysis and editing capabilities, combined with its version database and the substitute system files from its file cache, also enable it to correctly reconfigure a virtual disk's contents to make the disk bootable on a selected virtual machine product.

The UCMS, however, can be too complex and costly for users that just need a simple tool for performing P2V conversions. The following paragraphs describe a scaled-down embodiment of the UCMS for the specific purpose of performing P2V conversions.

Overview of the P2V Utility

The P2V Utility is a simplified, scaled-down embodiment of the UCMS. It allows a user to convert one or multiple disks from a physical computer into the same number of virtual disks. The virtual disk that contains the operating system is then automatically reconfigured to support the hardware configuration of the selected virtual machine software product.

The P2V Utility package consists of two components: a Boot CD containing a UCMS secondary software stack 4100, which comprises a secondary operating system and an imaging client program 1021 and an application component, called P2V application, which runs on an operating system residing on a host computer.

In addition to the P2V software, the host computer can also host the destination virtual machine software, in which case a converted virtual disk can immediately be used in a virtual machine. If the virtual machine software is installed on a different computer, the user may need to transfer the virtual disk to that computer before it can be used with a virtual machine.

Application Component

The P2V application is a restricted implementation of the UCMS server 2000. It is equipped with many subcomponents also found in the UCMS server 2000: a file cache 4010, a version database 4016, an optional but preferred registration database 4004, a resource database 4005, loop-back mount components (the loop-back driver 2211, switch 4200, and the two adapters 2310, 2314) and an imaging server 2101. Other subcomponents, such as the PXE server 4002, the registration database 4004, the UCMS user interface 2700 and advanced features such as image deltas 4014 may not be needed. The user-visible portion of the P2V application is the imaging server 2101 itself; the server in this case thus provides the user interface and coordinates the conversion process.

Even though many UCMS server subcomponents are found in the P2V Application, the P2V versions of those subcomponents can be scaled down to the level of functionality needed for P2V conversions. For example, the registration database 4040 can be simplified to hold only hardware configuration records for a small set of virtual machine products that the utility supports; it does not need to hold physical computer or virtual machine host registration records. Similarly, the file cache 4010 can be simplified to handle only substitute files needed for the reconfiguration process, but not general image customization.

On the other hand, a vendor may equip a more advanced version of the P2V Utility product with image customization capabilities, allowing a physical computer to be converted and customized in one step. Software vendors using UCMS technology to develop and sell a P2V Utility product line thus have the flexibility to configure the subcomponents to attain a desired balance between ease-of-use and functionality. This allows the vendors to sell multiple versions of the product, each targeting a specific market segment with its own price level and feature set.

Conversion Process

The P2V conversion process is simply a specialized version of the general UCMS image capture process. See FIG. 7 once again. In order to initiate a conversion task, a user reboots the chosen physical computer from the Boot CD 4100, causing the imaging client 1021 to load and run on the computer 1000. The client detects the computer's hardware 5200 and then lets the user bind a temporary network address to one of the computer's NICs 5204. The user can select a hard-coded address, such as a fixed TCP/IP address, or can choose to have the address automatically assigned by another computer on the network, such as a DHCP server. The client then displays the NIC's address on the screen and then awaits a connection request by the P2V application.

The user then starts the P2V application on the host computer, causing the imaging server 2101 to load and its user interface (UI) to appear. The UI can be structured as a sequence of screens, commonly called a Wizard. The first screen may ask the user to enter the network address of the physical computer, for example.

When transitioning to the next screen, the application connects to the imaging client 1021 and retrieves the list of physical disks (of which only the source disk 1010 is shown, for simplicity) attached to the computer 1000. The application can be designed to convert a single disk at a time, or entire group of disks. For each physical disk to be converted, the UI prompts the user to enter a file name and path for the destination virtual disk file. The file can reside on disk local to the host computer or a network-mapped directory from another computer or storage server.

The per-disk conversion process then proceeds using the same sequence as a UCMS image capture operation: the P2V application maps the remote physical disk to a simulated local source disk (through the network loop-back adapter 4220), creates a blank virtual disk file, maps the virtual disk to a simulated local destination disk (through the local loop-back adapter 2314 and then formats the destination disk with the same partition layout and file system format as the source disk.

Before populating the destination disk with files from the source disk, the application first checks whether the source disk contains an operating system. The application can detect the presence of an operating system by checking for the presence of specific files installed by an operating system. For instance, a disk containing a Windows operating system generally consists of at least one disk partition marked active and that partition holds a file system containing a boot.ini file specifying the location of the operating system, expressed as a path name to a system folder. The P2V application could determine the system folder from the boot.ini file and then inspect the system files and registry hives under that folder to determine the operating system's system configuration, including type, version, patch level and hardware configuration.

If a known and supported operating system is found on the source disk, the P2V application must reconfigure the destination disk after the file copy phase completes, in order to make the disk bootable in a virtual machine. Before copying files, however, the application must ensure that reconfiguration is possible.

As a scaled down version of the UCMS server, the P2V application naturally uses the UCMS's approach for preparing and validating a system reconfiguration. First, a destination hardware configuration must be selected from the application's built-in registration database 4004. If the application supports one unique virtual machine software product, then its registration database would contain exactly one record describing the virtual hardware configuration implemented by that virtual machine software.

If the application supports more than one virtual machine product, or multiple versions (i.e., generations) of the same product, then multiple records would exist, each one describing a different virtual hardware configuration. In this situation, the application's UI may ask the user to select the desired destination virtual machine product from a list of choices.

Once the destination hardware configuration is known, the application analyzes both the source disk's system configuration and the destination hardware configuration and then looks up information from the version database 4016 in order to determine the set of substitute system files required by the reconfiguration process.

If the file cache 4010 does not contain the necessary substitute files or file containers 4012, then the application can prompt the user to download the required patch, service pack, or system file from the Internet into a specified location in the cache. A more advanced implementation of the application could attempt to automatically download the needed files or containers from known Internet locations.

Once the file cache dependencies are satisfied, the application proceeds with the file copy phase. Next, the application then reconfigures the operating system files on the destination disk using the substitute files and finally dismounts the remote physical disk and the destination virtual disk.

The application can optionally create a virtual configuration file defining a new virtual machine and attach the virtual disk to the configuration file. The result would be a complete and ready-to-use virtual machine.

In summary, the P2V Utility leverages the UCMS's methods and subcomponents to implement a reliable, yet easy-to-use tool for converting a physical machine to a virtual machine. The utility automatically handles the format conversion between physical disks and virtual disk files. Moreover, its reconfiguration process is reliable and correct because it is based on an exact knowledge of the source and destination configurations and uses a version database to determine the correct types and versions of substitute system files to use. Unlike existing solutions, the P2V Utility is non-intrusive and risk-free, since it never modifies physical disks; all reconfiguration changes are performed on the virtual disks produced by the conversion process.

Detection of Incompatible Software

The software stack installed on a physical computer's primary disk may contain programs, such as drivers, that misbehave when transplanted onto another computer. A manufacturer-specific driver could, for example, assume that the computer contains a hardware device that is specific to that computer, i.e., not found on computers from other manufacturers. For instance, some existing Compaq personal computers ship with a pre-installed software stack that includes an operating system and a set of hardware monitoring programs that work only with Compaq hardware. If the software stack were migrated to another computer, or a virtual machine, in the case of a P2V conversion, then the hardware-dependent program could cause the software stack to fail in various ways on the new computer, possibly resulting in serious system crashes.

The P2V application can attempt to detect such incompatible software by examining a converted virtual disk's files and system configuration. Drivers and software applications are generally registered in a central configuration file, such as a Windows registry hive, or they can reside at well-known locations in the file system, such as /bin, /usr/sbin, /usr/bin and /lib/modules under Linux.

The application can thus scan a converted virtual disk for software that is either unknown to the application, or known to be incompatible with the selected destination virtual machine hardware. The application can display a list of such detected programs in the UI and give the user the option of disabling or removing some of those potentially harmful programs.

Virtual to Virtual (V2V) Conversions

The P2V Utility can be used, or extended, to convert a virtual machine from a first virtual machine software product to a virtual machine designed for another virtual machine product. The utility can also perform a similar conversion that migrates a virtual machine between two virtual hardware generations and thus configurations, belonging to the same virtual machine product family. For instance, a user may want to convert an existing uniprocessor/non-ACPI virtual machine designed for VMware Workstation 3.0 to a multiprocessor/ACPI virtual machine for VMware ESX Server 2.0. At least two issues may need to be resolved in virtual-to-virtual (V2V) conversions, however: hardware configuration differences and virtual disk format differences.

The P2V/V2V Utility can naturally handle the hardware configuration differences using the reconfiguration process. As long as the registration database 4004 has a record describing the destination virtual hardware configuration and the file cache 4010 can supply the required substitute files, the utility can correctly reconfigure the final virtual disk to make it bootable in the destination virtual machine.

This leads to a discussion of the virtual disk format issue. If the source and destination virtual machine products use a different virtual disk file format, then the conversion process must translate the disk contents between the two formats. There are several factors that determine the best format conversion solution, resulting in four different situations.

1) If the vendor of the P2V Utility has access to the specification for both formats, it can simply include additional local loop-back adapters with the application component, one per supported virtual disk format. Recall that when a virtual disk file is mapped to a simulated local disk using loop-back mounting, a local loop-back adapter translates the host operating system's sector-level accesses to the appropriate file accesses in the virtual disk file. Multiple local adapters could thus allow the utility to manipulate multiple virtual disks of different formats.

In this scenario, the P2V application can directly open the source virtual disk and map it to a simulated source disk, using the local loop-back adapter that understands the source virtual disk's format. The source disk is said to be accessed in direct file mode, which means that the source disk is a file, not a remote physical disk. Direct file mode requires the source virtual machine to be powered off, thus preventing it from modifying the source virtual disk while the P2V application accesses it. Note that the Boot CD is not needed, since the P2V application can access the source disk directly.

The application then creates, maps and initializes the destination virtual disk in the usual way, using the second local loop-back adapter. The image capture and reconfiguration process than proceeds normally. At the end of the conversion process, the two virtual disk files are dismounted.

2) If the P2V Utility has a local loop-back adapter for the destination virtual disk format, but not the source format, then a solution still exists. This solution is identical to the traditional P2V scenario, with the exception that physical computer is actually the source virtual machine.

The user first has to power on the source virtual machine using the source virtual machine product and configure the virtual machine to boot from the Boot. The virtual machine's NIC also has to be bridged to a network accessible by the host computer running the P2V application. The imaging client eventually loads and runs from within the source virtual machine's memory and communicates with the P2V application component over the bridged network. The imaging client thus accesses the source virtual disk indirectly through the secondary operating system and the source virtual machine software is responsible for translating the operating system's sector-level accesses to the appropriate file accesses within the source virtual disk.

3) If the P2V application has a local loop-back adapter for the source virtual disk format, but not the destination format, then the solution is more complex and requires some explanation:

The P2V application can open the source disk in direct file mode, since it has a local loop-back adapter that understands the source format. However, it cannot create a virtual disk of the destination format directly. The solution requires the P2V application to implement one additional feature, that is, the ability to select an actual physical disk as the destination disk instead of a virtual disk mapped to a simulated destination disk. This type of selection is called direct device mode, because it causes the application to copy data to a disk device directly attached to the computer during the imaging process. The following discussion describes the conversion process using direct device mode.

First, the source virtual machine must remain powered off, so that the P2V application can safely open and mount the source virtual disk file. The file must also reside on a shared directory that can be accessed by other computers on the network.

Second, the P2V application must run from within a temporary virtual machine, called virtual host computer, using virtual machine software of the destination type. The virtual host must be configured with a bridged NIC and two virtual disks: a primary disk with a software stack containing a host operating system and the P2V application and a second, empty virtual disk to serve as the destination disk. The virtual host must also be powered on.

From within the virtual host, the user first maps the shared network folder containing the source virtual disk and then starts the P2V application. The user instructs the application to use the source virtual disk as the input to the conversion operation; this causes the application to open the source virtual disk in direct file mode and map to a simulated source disk.

The user then specifies that the output of the conversion process is the second physical disk, using the direct device method. Since the destination disk is already a real disk from the virtual host's perspective, the P2V/V2V application does not need to perform any loop-back mounting.

The image capture and reconfiguration process then proceeds normally. When the application formats and populates the destination disk, the operating system running inside the virtual host writes to the disk at the sector level, thinking that it is a physical disk. In actuality, the disk is a truly a virtual disk and it is the destination virtual machine software that translates the sector operations into the appropriate file accesses in the destination virtual disk format.

Once the conversion process completes, the P2V application needs only to dismount the source virtual disk, since the destination disk appears to be "real" and never had to be loop-back mounted. The user finally shuts down the virtual host and then detaches its second virtual disk. This disk can then be used in a stand-alone destination virtual machine representing a copy of the source virtual machine.

4) The final scenario is when the P2V application does not have the appropriate local loop-back adapters for either the source or destination virtual disk formats. The solution for this situation is a combination of 2) and 3): run the source virtual machine from the Boot CD and run the P2V application inside of a virtual host using the destination virtual machine software. The two virtual machines must be able to communicate over a bridged or virtual network. The source disk is accessed normally, i.e., through the network, using the network loop-back adapter, while the destination disk is accessed in direct device mode.

Virtual to Physical (V2P) Conversions

The P2V Utility can be used or extended to perform a conversion in the reverse direction, i.e., from a virtual machine to a physical computer, using the following process.

A user first reboots the destination physical computer from the Boot CD and then uses the P2V application to connect to the imaging client and initiate a V2P (virtual to physical) conversion process. This situation is identical to the P2V process, with the difference being that the virtual disk is mapped to the simulated source disk, while the remote physical disk is mapped to the simulated destination disk; also, the disk imaging operation is technically a deployment, not a capture.

Another difference is that the destination hardware configuration is the configuration of the physical computer, which may not be known (i.e., not present in the registration database) before the conversion process.

There are two solutions for solving the destination hardware configuration issue. First, the P2V application can instruct the imaging client to analyze the computer's hardware configuration and send it to the host for analysis. This is similar to the physical computer registration process within the UCMS framework.

The second solution is for the P2V application to ignore the hardware configuration problem and shift part of the reconfiguration responsibility to the user. This is a reasonable solution if the virtual machine's hardware configuration is mostly identical to that of the physical computer. In particular, if the two computers have similar processors and chipsets, but different disk controllers, then the user can use an external tool, such as Sysprep, to solve the disk controller mismatch. Recall that Sysprep can pre-install a set of disk drivers specified in a Sysprep.inf file and create the corresponding registry entries on a computer for the purpose of deploying that computer's image onto other computers that may have a dissimilar disk controller. A user could run Sysprep in the source virtual machine and then power it off and then use the P2V/V2P Utility to deploy the virtual disk to a physical computer.

The P2V/V2P Utility can actually make the process simpler by automatically performing an image reconfiguration that mimics the effects of Sysprep. Specifically, the application component of the utility can read a user-supplied Sysprep.inf file and then automatically install the specified drivers and create the necessary registry entries in a local copy of the image before deploying it. The application thus follows the UCMS's philosophy of separating reconfiguration and management software from images, a philosophy that provides more flexibility and is less intrusive than existing solutions. In this specific scenario, the reconfiguration changes are performed on a copy of the source virtual disk and more specifically, a redo log of the source virtual disk. Once the conversion process is complete, the redo log can be discarded, which implies that the source virtual disk is never modified.

What is claimed is:

1. A method of deploying a system disk from a first machine to a second machine, the method comprising:
    reading a source image from a data storage device, the source image containing hardware configuration information and installed software, the installed software including at least an installed operating system, the installed operating system being configured to be executed by the first machine;
    creating a destination image;
    mounting the destination image in a computer system, the destination image being mounted in loop-back mode using a destination loop-back driver such that the destination image functions as a simulated local destination disk, and appears as a physical disk to the operating system of the computer system;
    copying the files and directories from the source image to the destination image;
    mounting a disk image defined by the logical image onto the second machine.

2. The method of claim 1, wherein:
    the first machine is a physical computer system;
    the source image is defined by data present on a physical disk of the first machine;
    the second machine is a virtual machine, the virtual machine comprising a software abstraction of a physical computer system, the mounting of the logical image comprising creating a full size copy of the logical image to create a modified source image, and attaching the modified source image to the virtual machine; and
    the method further comprises modifying the destination image so that the installed operating system is configured to be executed by the second machine.

3. The method of claim 2, further comprising modifying the destination image to introduce an installed application to the destination image, wherein the installed application includes files and configuration settings.

4. The method of claim 3, wherein the configuration settings are contained in a registry maintained by the installed operating system.

5. The method of claim 2, wherein the reading of the source image further comprises:
    booting the first machine with a secondary operating system, the secondary operating system being supplied by one of a removable medium or over a network;
    launching an imaging client in the first machine, the imaging client having read and write access of the physical disk of the first machine; and
    installing a source loop-back driver on the computer, the source loop-back driver forwarding in/out (I/O) requests from an operating system running on the server computer to the imaging client, the I/O requests comprising sector-level addresses for reading from sectors and writing to sectors.

6. The method of claim 5, further comprising a network loop-back adapter interposed between the source loop-back driver and a the network, the network loop-back adapter being configured to receive the I/O requests from the source loop-back driver, translate the I/O requests into network requests, and sends the network requests to the imaging client.

7. The method of claim 5, wherein the imaging client does not contain a decoder for translating requests for directory or file to sector read requests.

8. The method of claim 2, further comprising:
    identifying the virtual machine product and version providing the virtual machine;
    retrieving from a database hardware configuration information corresponding to the virtual machine product; and
    modifying the destination image using the hardware configuration information to configure the installed software to operate with the virtual machine.

9. The method of claim 1, further comprising:
    identifying the second machine;
    retrieving destination hardware configuration information of the second machine from a database;
    modifying the destination image using the hardware configuration information to configure the installed software to operate with the second machine.

10. The method of claim 1, wherein the second machine is a virtual machine and the destination image is a virtual disk with a capacity at least as large as the source image, the mounting of the disk image onto the second machine comprising attaching the destination image to the virtual machine to form a virtual machine with an active disk image.

11. The method of claim 1, wherein the second machine is a physical computer and the destination loop-back driver is configured to transmit the write requests to an imaging client executing on the second machine, the imaging client being configured to execute the write request to a physical disk of to the second machine, the mounting of the disk image onto the second machine comprising copying the destination image to the physical disk of the second machine using the destination loop-back driver.

12. The method of claim 1, wherein the first machine is a virtual machine, the source image being a file containing an image of a virtual disk of the first machine.

* * * * *